(12) United States Patent
Vasylyev

(10) Patent No.: US 8,824,050 B2
(45) Date of Patent: Sep. 2, 2014

(54) DAYLIGHTING FABRIC AND METHOD OF MAKING THE SAME

(71) Applicant: Sergiy Vasylyev, Elk Grove, CA (US)

(72) Inventor: Sergiy Vasylyev, Elk Grove, CA (US)

(73) Assignee: SVV Technology Innovations, Inc., Elk Grove, CA (US)

( * ) Notice: Subject to any disclaimer, the term of this patent is extended or adjusted under 35 U.S.C. 154(b) by 0 days.

(21) Appl. No.: 13/855,665

(22) Filed: Apr. 2, 2013

(65) Prior Publication Data

US 2013/0265642 A1    Oct. 10, 2013

Related U.S. Application Data

(60) Provisional application No. 61/621,332, filed on Apr. 6, 2012, provisional application No. 61/691,264, filed on Aug. 21, 2012, provisional application No. 61/775,678, filed on Mar. 10, 2013.

(51) Int. Cl.
| | | |
|---|---|---|
| *G02B 17/00* | (2006.01) | |
| *F21S 11/00* | (2006.01) | |
| *G02B 19/00* | (2006.01) | |
| *B29D 11/00* | (2006.01) | |

(52) U.S. Cl.
CPC ...... *G02B 19/0042* (2013.01); *B29D 11/00605* (2013.01); *F21S 11/00* (2013.01); *B29D 11/00663* (2013.01); *G02B 19/0038* (2013.01); *G02B 19/0028* (2013.01)
USPC .......................................................... 359/595

(58) Field of Classification Search
CPC .................................................... F21S 11/002
USPC .......................................... 359/595, 598, 592
See application file for complete search history.

(56) References Cited

U.S. PATENT DOCUMENTS

| | | | | |
|---|---|---|---|---|
| 596,883 | A | * | 1/1898 | Jacobs .......................... 359/595 |
| 693,088 | A | * | 2/1902 | Wadsworth .................. 359/596 |
| 737,979 | A | | 9/1903 | Wadsworth |
| 2,689,387 | A | * | 9/1954 | Carr ................................ 160/90 |
| 3,940,896 | A | | 3/1976 | Steel |
| 4,509,825 | A | | 4/1985 | Otto et al. |
| 4,557,565 | A | | 12/1985 | Ruck et al. |
| 4,673,609 | A | * | 6/1987 | Hill ............................... 428/187 |
| 4,699,467 | A | | 10/1987 | Bartenbach et al. |
| 4,989,952 | A | | 2/1991 | Edmonds |
| 5,009,484 | A | * | 4/1991 | Gerritsen ...................... 359/569 |
| 5,285,315 | A | | 2/1994 | Stiles |
| 5,295,051 | A | | 3/1994 | Cowling |

(Continued)

FOREIGN PATENT DOCUMENTS

WO        WO 9904195 A1 *   1/1999   ................ F21V 7/04

*Primary Examiner* — Christopher Mahoney

(57) ABSTRACT

A flexible sheet-form optical system, referenced to as a daylighting fabric, which has a fabric-like behavior and light redirecting properties. The daylighting fabric comprises a soft and flexible sheet of optically transmissive material, such as plasticized polyvinyl chloride. A surface of the flexible sheet includes a plurality of parallel slits having spaced-apart walls configured to reflect light by means of a total internal reflection. At least a portion of daylight incident onto the sheet is internally redirected at angles other than the angle of incidence which is exploited to enhance daylight harvesting and illumination of a building interior. Disclosed also are a method and apparatus for making the daylighting fabric. The method includes steps of mechanical slitting of the flexible sheet with a blade, elastic stretch-elongation of the sheet along a direction perpendicular to the slits, and making at least a portion of the sheet elongation irreversible.

15 Claims, 28 Drawing Sheets

(56) References Cited

U.S. PATENT DOCUMENTS

| | | | |
|---|---|---|---|
| 5,461,496 A * | 10/1995 | Kanada et al. | 359/592 |
| 5,609,938 A * | 3/1997 | Shields | 428/138 |
| 5,650,875 A | 7/1997 | Kanada et al. | |
| 5,802,784 A | 9/1998 | Federmann | |
| 5,880,886 A | 3/1999 | Milner | |
| 6,239,910 B1 | 5/2001 | Digert | |
| 6,311,437 B1 | 11/2001 | Lorenz | |
| 6,367,937 B2 | 4/2002 | Koster | |
| 6,424,406 B1 | 7/2002 | Mueller et al. | |
| 6,437,921 B1 | 8/2002 | Whitehead | |
| 6,538,813 B1 * | 3/2003 | Magno et al. | 359/443 |
| 6,542,303 B1 | 4/2003 | Oyama | |
| 6,580,559 B2 | 6/2003 | Doll et al. | |
| 6,616,285 B2 | 9/2003 | Milner | |
| 6,700,716 B2 * | 3/2004 | Sejkora | 359/834 |
| 6,714,352 B2 | 3/2004 | Rogers et al. | |
| 6,980,728 B2 | 12/2005 | Ladstatter et al. | |
| 7,070,314 B2 | 7/2006 | Edmonds | |
| 7,410,284 B2 | 8/2008 | Edmonds | |
| 7,416,315 B2 | 8/2008 | Blumel | |
| 7,872,801 B2 | 1/2011 | Kojima et al. | |
| 8,107,164 B2 | 1/2012 | Tsai | |

* cited by examiner

DAYLIGHTING FABRIC AND METHOD OF MAKING THE SAME

CROSS-REFERENCE TO RELATED APPLICATIONS

This application claims priority from U.S. provisional application Ser. No. 61/621,332 filed on Apr. 6, 2012, incorporated herein by reference in its entirety, U.S. provisional application Ser. No. 61/691,264 filed on Aug. 21, 2012, incorporated herein by reference in its entirety, and U.S. provisional application Ser. No. 61/775,678 filed on Mar. 10, 2013, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates to improving natural lighting within buildings and more particularly to daylight harvesting for building interior illumination. More particularly, this invention relates to daylighting elements of a building such as glazed wall openings, windows, roof windows and skylights, as well as to various devices and glazing structures used for admitting and distributing daylight into the interior of a building, such as light shelves, light redirecting blinds or louvers, prismatic films and panels, and transparent plates and light guides employing total internal reflection surfaces.

2. Description of Background Art

Various optical structures for redistributing daylight into building interiors are known. At least some of such prior art devices employ planar transparent plates of glass or plastic materials which include reflective surfaces embedded between the opposing sheet surfaces and configured to reflect light by means of a total internal reflection (TIR). The use of TIR structures generally allows for much larger bend angles compared to refractive structures such as prismatic sheets or films. Large bend angles are particularly important for redistributing daylight in the interior of a building so that at least a portion of the incident daylight could be directed towards the upper portions of the interior, such as the ceiling of a room.

For example, one such light redirecting structure employing internal TIR surfaces is disclosed in U.S. Pat. No. 737,979 which shows a glass plate including a series of slots made in its body. The angle of these slots is such that daylight coming from any given principal direction from outside is reflected from the surface of the slot and is hereby redirected from its original propagation path. Another light redirecting structure is disclosed in U.S. Pat. No. 6,424,406 which describes optical diffuser plates made from transparent plastics and employing either thin strips of another plastic or hollows in the respective plates to deflect light.

U.S. Pat. No. 7,416,315 discloses a faceted reflector which includes a plurality of prismatic reflectors embedded in a carrier and reflecting light by total reflection at a part of the cavity interfaces. In U.S. Pat. No. 6,616,285, total reflection surfaces are formed by merging two optical bodies each having surface groves which interpenetrate into one another when such bodies are placed face-to face. U.S. Pat. No. 5,880,886 shows V-section grooves formed in a major face of a substantially flat and planar optical element. U.S. Pat. No. 4,557,565 discloses a planar solid transparent light deflecting panel or plate for transmitting sunlight into the interior of a building. The panel or plate is formed of a plurality of parallel identically spaced apart triangular ribs on one face. The ribs have specially selected slopes to totally internally reflect light when such panel or plate is placed over an opening such as window.

On the other hand, various methods of making the light redirecting TIR structures in such transparent plates have been proposed. For example, U.S. Pat. No. 4,989,952 discloses a method for producing a transparent light deflecting panel comprising making a series of parallel cuts in a sheet of transparent solid material with a laser cutting tool. Such panel can be positioned in an opening in the facade of a building to deflect incident daylight towards the ceiling thereby improving the natural lighting within the building. The transparent sheet is commonly acrylic and the laser tool is a carbon dioxide ($CO_2$) laser.

$CO_2$ laser cutting of rigid PMMA panels has generally demonstrated its ability to form relatively narrow channels suitable for TIR and light redirection purposes. However, it is fairly difficult to make the width of the channels less than 150 micrometers ($\mu m$) or so, given the finite diameter of the beam of $CO_2$ lasers, fundamental and practical limitations of beam-focusing optics and hard-to-control excessive material evaporation in the process of ablative material removal. Since the minimum attainable width of the laser cut channels relates to the minimum acceptable thickness of the acrylic panel, due to the optical efficiency and structural considerations, such panels are more practical in thicknesses of 6 mm or more. However, a 6-mm acrylic panel can be fairly heavy for the typical sizes of wall windows which can translate into substantial material costs and difficulties in fixing the panel in a suspended position near the window.

U.S. Pat. No. 6,580,559 describes a method of forming internal TIR structures in transparent panels made from glass-like thermoplastic material such as PMMA by inducing parallel crazes in the thermoplastic material. An organic solvent is applied on the panel surface while a tensile stress is applied to a panel which results in generation of wedge-shaped deformations (crazes) which propagate within the material. However, such method of forming internal TIR structures offers little control over the spacing, depth and extent of the crazes, as well as can substantially compromise the structural integrity or rigidity of the panel.

Mechanical surface slitting of a sheet-form material using razor-sharp blades can be one way of making TIR channels or facets within the bulk material of an optically clear sheet. However, slitting of hard and brittle optical plastics such as polycarbonate, polystyrene, rigid PVC or polycarbonate with a blade is generally unfeasible considering the lack of sufficient plasticity of such materials and is usually ruled out for daylighting devices employing TIR surfaces. The blade penetration into such materials induces material chipping and/or smearing which makes it nearly impossible to form a smooth and narrow cut suitable for TIR functionality even assuming the ideal sharpness of the blade. Additionally, the blade thickness brings its own limitations on the minimum width of the cut in a rigid material.

The use of rigid transparent plates or panels as a substrate in which TIR surfaces can be formed is also deficient in that such devices are inherently inflexible which makes them difficult or impractical to be utilized in lightweight and compact daylighting systems. It is also difficult or impractical to incorporate rigid sheets or plates in retractable window coverings or use them for lamination onto a window pane or other substrates used in glazing.

Many daylighting systems would benefit from employing a sheet-form light redirecting TIR structure that can be sufficiently thin and flexible, resembling the behavior of a fabric, and that can be bent to tight radii or laminated onto a surface. Furthermore, many daylighting applications would also benefit from an efficient and low-cost method of making such flexible TIR sheet-form structures.

Accordingly, prior efforts have failed to provide a practical and cost-effective solution for admitting daylight into building interiors and providing uniform and efficient natural illumination using a relatively thin sheet material. These needs and others are met within the present invention, which provides an improved sheet-form structure for illuminating building interiors with sunlight and also provides a method of making the same. The improved sheet-form structure employs internal TIR surfaces to efficiently redirect light and is also thin, flexible and has a fabric-like behavior, all of which finds utility in various daylighting devices and systems.

BRIEF SUMMARY OF THE INVENTION

The present invention solves a number of daylight harvesting and distribution problems within a thin and flexible sheet-form optical system which has a fabric-like behavior. Apparatus and method are described for directing and distributing daylight within building interior using an optically clear flexible sheet material in which light redirecting functionality is provided by an array of deep and narrow slits formed in a surface of the material. Daylight passes through the sheet-form material configured with internal TIR surfaces and is redirected into building interior at high deflection angles with respect to the incident direction.

A daylighting fabric including a soft and flexible sheet of optically clear material is described. The flexible sheet comprises a parallel array of deep and narrow slits formed in a broad-area surface of the sheet material. Each slit comprises two parallel or near-parallel walls permanently separated from each other by a layer of air. At least one of the walls of the slit is configured to reflect light by means of total internal reflection (TIR) in specular or near-specular regime. The surface of the wall may have a surface roughness which does not exceed a predetermined value.

A method of making the daylighting fabric and several embodiments of an apparatus for implementing such method are also described. The method includes a step of mechanical slitting a broad-area surface of the flexible sheet using a sharp blade or razor. The method further includes a step of stretching the flexible sheet along a direction which is perpendicular to the longitudinal axis of the slits. Such stretching results in the elongation of sheet material in the areas of the slits. The method of making the daylighting fabric further includes a step of irreversible separation of the opposing walls of the slits.

The invention is amenable to being embodied in a number of ways, including but not limited to the following descriptions.

At least one embodiment of the invention is configured as a daylighting fabric for illuminating a building interior with sunlight, comprising: (1) a soft and flexible sheet of optically transmissive material and (2) at least a first plurality of parallel slits formed in a surface of said sheet. Each of the slits includes a first wall and an opposing second wall extending generally parallel to the first wall. The first wall of each slit is spaced apart from the respective second wall by a predetermined distance and at least one of the first and second walls is configured for reflecting light by means of a total internal reflection. The device operates in response to daylight received on a surface of the sheet being angularly redirected by the plurality of slits and distributed from the opposing surface of the sheet into the building interior. In at least one implementation, the daylighting fabric is configured to intercept at least a portion of the incident beam and redirect such portion at a bend angle which is about two times of the incidence angle. In at least one implementation, the bend angles may exceed 90° for at least some incidence angles onto the surface of the sheet. In at least one implementation, the sheet of daylighting fabric is selected so that a parallel beam of light passing through the sheet can be split into two or more beams propagating generally into opposing directions from a normal to a sheet surface. In different implementations, either broad-area surface of the sheet may be configured for light input while the opposing surface may be configured for light output.

In at least one implementation, the soft and flexible sheet of optically transmissive material is made from a plasticized polyvinyl chloride (PVC). Such material is preferably optically clear or translucent and has a sheet thickness between 0.5 mm to 3.2 mm. In at least one implementation, the sheet of the daylighting fabric has a generally square or rectangular shape defined by a first broad-area surface and an opposing broad-area surface. In at least one implementation, the flexible sheet is configured for a generally unimpeded light passage along at least a direction which is perpendicular or near-perpendicular to the surface of the sheet. In at least one implementation, the flexible sheet is configured for a see-through appearance. In at least one implementation, the flexible sheet is configured for a see-through appearance and a privacy function.

Each slit formed in the flexible sheet is preferably deep and narrow and, according to an aspect, forms a high aspect ratio void in a surface of the sheet. In at least one implementation, each slit 6 extends through more half of the thickness of the sheet. In at least one implementation, each slit does not reach at the opposing surface of the sheet and extends into the sheet material to a depth which is 50% to 95% of the thickness of the sheet.

In at least one implementation, the first and second walls of the slits are separated from each other by a layer of ambient air. According to an aspect, each of the slit walls defines a TIR interface between the material of the sheet and the ambient air. According to another aspect the plurality of the slits may be viewed as a plurality of thin, two-sided TIR reflectors formed between opposing surfaces of the daylighting fabric. In at least one implementation, at least one of the first and second walls of each slit is configured to reflect light by a total internal reflection in a specular or near-specular regime.

In at least one implementation, the opposing walls of each slit are generally planar and extending generally parallel to each other and also perpendicular to a surface of the flexible sheet within a predetermined angular accuracy. In various implementations, the parallelism of the opposing walls of each slit should be within a few degrees, more particularly, within about six degrees, within two degrees and within one degree. In at least one implementation, each slits extends into the material of the flexible sheet generally perpendicular to the surface of the sheet. In at least one implementation, at least some slit extend into the material of the flexible sheet at a constant angle with respect to a surface normal of the sheet. In at least one implementation, at least some slits extend into the material of the flexible sheet at a variable angle with respect to a surface normal of the sheet. In at least one implementation, the distance between the opposing walls of the slits are preferably within a 5 μm to 100 μm range, and more preferably, within a 10 μm to 50 μm range.

In at least one implementation, the plurality of the slits is configured to provide a controlled spread of the parallel beam incident onto the light input surface of the flexible sheet.

In at least one implementation, each of the opposing broad-area surfaces of the flexible sheet is generally smooth. In at least one implementation, at least one of the opposing broad-area surfaces includes a plurality of surface relief features. In at least one implementation, such surface relief features are configured for diffusing light passing through the respective surface. In at least one implementation, the surface relief features are selected from the group of elements consisting of prism arrays, arrays of prisms, prismatic grooves, lens arrays, engineered surfaces, and surface relief types commonly referred to as "frosted-glass", "prismatic", "sanded", "pebble", "ice", "matte", "microprism", and "microlens". In at least one implementation, at least one of the surfaces of the flexible sheet includes an image print or pattern. Such print or pattern may have light diffusing and/or decorative functions.

In at least one implementation, at least a portion of the surface of the walls of the slits has a non-negligible surface roughness. According to an aspect, the surface roughness may be represented by a plurality of surface relief features formed in the respective wall of the slit. According to an aspect, the surface roughness may be characterized by a root-mean-square (RMS) roughness parameter $R_q$. In various implementations of daylighting fabric, the RMS roughness parameter $R_q$ is selected to be within a predefined range. In one implementation, it may be preferred that the RMS surface roughness $R_q$ of at least a substantial portion of the surface of the slits is in the range between 0.01 μm (10 nm) and 0.1 μm (100 nm). In an alternative implementation, it is preferred that $R_q$ is generally less than 0.05 μm and even more preferred that $R_q$ is less than 0.03 μm. According to an aspect, it may be preferred that the sampling lengths for measuring such $R_q$ parameter of the surface of slits are within the range of 20 μm to 100 μm. According to another aspect, it may be preferred that the surface profile roughness $R_q$ does not exceed the prescribed values along a line which is either perpendicular to the longitudinal axis of the respective slit or is disposed at a relatively low angle with respect to such axis.

In at least one implementation, each of the slits is formed mechanically using a sharp blade or razor. In one implementation, the radius of the curvature of the tip of such blade or razor in a transversal cross-section should preferably be on a sub-micron scale. In one implementation, it may be further preferred that such radius of curvature is less than 50 nanometers.

In at least one implementation, each of the slits formed in the flexible sheet extends substantially through the entire width of the sheet material. In at least one implementation, the length of each of the slits formed in the flexible sheet is less than the width of the sheet material. In at least one implementation, the plurality of slits is arranged in staggered rows and columns where each row is shifted relatively to the adjacent rows. In each row, the adjacent slits are separated by a spacing area of the uncut bulk sheet material.

In at least one implementation, the soft and flexible sheet further comprises a second plurality of parallel slits formed in a surface of the sheet and extending generally perpendicular to the first plurality of parallel slits. In alternative implementations, the second plurality of parallel slits can be formed in either the same surface as said first plurality of parallel slits or in the opposing surface. According to an aspect, the two pluralities of slits crossed at the right angle to each other forms a plurality of light-channeling cells. In at least one implementation, each of the light-channeling cells is configured to redirect and redistribute at least some off-axis rays entering onto a surface of the sheet.

The daylighting fabric may be operated in a number of ways. In at least one implementation, a sheet of the daylighting fabric is suspended within or in proximity of an opening in a building façade. In different implementations, such sheet may be positioned in a horizontal orientation, in a vertical orientation or at an angle with respect to the horizontal plane. In at least one implementation, a sheet of the daylighting fabric is laminated onto a surface of a window pane. In at least one implementation, a sheet of the daylighting fabric is positioned in an opening of a roof window or a skylight. In at least one implementation, a sheet of the daylighting fabric is configured to redirect daylight onto a ceiling of a room. In at least one implementation, a sheet of the daylighting fabric is stretched along a direction which is perpendicular to the longitudinal axis of the linear slits.

In at least one implementation, the surface of the sheet in which the plurality of slits is formed is facing the building interior. In at least one implementation, such surface is facing the source of daylight. In at least one implementation, the flexible sheet is positioned within a building interior above the eye height of the building occupants.

In at least one implementation, the flexible sheet includes one or more additional layers. Such layers may include light diffusing features, light filtering features, protective layers, or color filtering or tint features.

In at least one implementation, the sheet is adapted for being retained in either a planar configuration or in bent and/or rolled configurations. In at least one implementation, the sheet is adapted for being retained in a stretched state.

At least one embodiment of the invention is configured as a sheet-form light-redirecting structure employing a plurality of internal optical interfaces within the structure. Each of the optical interfaces is configured to reflect light by means of TIR and is defined by a surface which includes surface irregularities and can be characterized by an RMS surface profile roughness parameter. The RMS surface profile roughness parameter should preferably be measured along a reference line which is parallel or near-parallel to the plane of reflection. The roughness parameter of at least a substantial part of the surface area should be generally between 10 nanometers and 100 nanometers at a sampling length between 20 and 100 micrometers. In at least one implementation, each of the surfaces is generally planar and extends generally perpendicular to the prevailing plane of the sheet-form structure. In at least one implementation, each of the surfaces is generally planar and is disposed at an angle other than normal to the prevailing plane of the sheet-form structure. In at least one implementation, at least some of the surfaces have a curvilinear shape. According to an aspect, each of the TIR surfaces within the structure may be configured to reflect light in a specular or near specular while having a non-negligible surface roughness. According to another aspect, the light redirecting structure may be configured to redirect light by means of TIR while providing light diffusing function.

At least one embodiment of the invention is configured as a method for redirecting light comprising: (a) propagating the light in an optically transmissive material; (b) reflecting light by a total internal reflection at a plurality of optically-irregular surfaces distributed within the material; and (c) extracting the reflected light from a light output surface of the material. In at least one implementation, an RMS surface profile roughness parameter characterizing the relief of the optically-irregular surfaces is generally between 10 nanometers and 100 nanometers at a sampling length between 20 and 100 micrometers. In at least one implementation, the light output surface includes a plurality of surface relief features.

At least one embodiment of the invention is configured as a method for making a light-redirecting fabric from a flexible sheet of optically clear material comprising: (a) a step of forming a parallel array of slits in a surface of the flexible sheet by means of at least one blade or razor; (b) a step of elastic elongation of the sheet along a direction perpendicular to the slits; and (c) a step of making at least a portion of the elongation irreversible. In at least one implementation, the step of making at least a portion of the elongation irreversible includes elongation of the sheet in a plastic deformation mode. In at least one implementation of the method, the step of making at least a portion of the elongation irreversible includes annealing of the sheet at an elevated temperature. In at least one implementation, the elevated temperatures may be in the range between 60° C. and 150° C. In at least one implementation of the method, the blade or razor is of a rotary type. In at least one implementation, the method for making the light-redirecting fabric further includes a step of heating at least a surface portion of the sheet to a predetermined temperature. In at least one implementation, the relative irreversible elongation of the sheet does not exceed 10% of the original sheet length. In at least one implementation, the relative irreversible elongation of the sheet does not exceed 5% of the original sheet length. In at least one implementation, the elongation of the material in the areas of the slits during the step of making at least a portion of the elongation irreversible exceeds 100%.

At least one embodiment of the invention is configured as an apparatus for making a light-redirecting fabric from a flexible sheet of optically clear material comprising: (a) means for stretching the flexible sheet along a first direction and (b) means for mechanical slitting of a surface of the sheet along a second direction. In at least one implementation, the apparatus for making the light-redirecting fabric further includes a heat source configured for heating at least a portion of the sheet to a predetermined temperature. In at least one implementation, the means for mechanical slitting includes at least one slitting blade or razor. According to an aspect, each of the slitting blades or razors is configured to form slits which surface has a roughness below a predetermined threshold value. In at least one implementation, the means for mechanical slitting includes at least one rotary slitting blade. In at least one implementation, the rotary blade has the thickness of 0.3 mm or less. In at least one implementation, the means for mechanical slitting includes a plurality of blades arranged in one or more packs. The blades may be arranged within each pack at a constant spacing distance which is a predetermined factor of the nominal slit spacing.

In at least one implementation, the slitting blade or the pack of slitting blades is provided with a linear motion system which prevailing motion axis is positioned along the intended slitting direction. In at least one implementation, each of the blades or razors is positioned perpendicular to the surface of the sheet. In at least one implementation, one or more slitting blade or razor is positioned at an angle with respect to a normal to the surface of the sheet. In at least one implementation, the apparatus for making a light-redirecting fabric is provided with means for varying the tilt of the blade with respect to the surface of the sheet.

In at least one implementation, the means for stretching the flexible sheet include at least one roller or roll. In at least one implementation, the means for stretching the flexible sheet include at least two rollers disposed parallel to each other. In one implementation, the two rollers are made movable with respect to each other. In at least one implementation, at least one of the rollers is provided with a drive configured for rotating the roller in predefined angular increments. In an alternative implementation, the means for stretching the flexible sheet include one or more clamping bars.

In at least one implementation of the apparatus for making a light-redirecting fabric, the first and second directions are generally parallel to each other. In at least one implementation of the apparatus for making a light-redirecting fabric, the first and second directions are generally perpendicular to each other.

The present invention provides a number of beneficial elements which can be implemented either separately or in any desired combination without departing from the present teachings.

An element of the invention is an apparatus and method of collecting light over a given area and traveling in a first direction, and redirecting at least a portion of such light into a second direction which can have any desired angular relationship with the first direction.

Another element of the invention is the use of a soft and flexible sheet of an optically transmissive material which can also be transparent or translucent.

Another element of the invention is the use of plasticized polyvinyl chloride (PVC) material in a sheet-form which can have a fabric-like behavior.

Another element of the invention is the use of a thin and flexible sheet which has a light redirecting function and which can be positioned within or in a vicinity of an opening in a building façade.

Another element of the invention is the use of a thin and flexible sheet which has a light redirecting function and which can be positioned within or at the exit aperture of a daylighting device or structure.

Another element of the invention is the inclusion of distributed deflecting means within the interior of the soft and flexible sheet.

Another element of the invention is the use of reflective means operating within the sheet and configured to reflect light by means of a total internal reflection.

Another element of the invention is the use of a parallel array of slits formed in a surface of the sheet to make the reflective means.

Another element of the invention is the use of slits which opposing walls are spaced apart from each other and separated by a layer of ambient air.

Another element of the invention is the use of a linear array of slits which span the surface of the sheet, or a portion thereof.

Another element of the invention is the use of total internal reflection surfaces which are irregular by optical standards.

Another element of the invention is the inclusion of surface relief features into at least one surface of the sheet to extract and/or diffuse the redirected light.

Another element of the invention is an apparatus for making a light redirecting system from a sheet of soft and flexible material.

Another element of the invention is the use of a blade or razor to form light reflecting surfaces in a sheet of optically transmissive material by means of creating linear slits.

Another element of the invention is the use of a blade or razor with a high edge quality to minimize the surface roughness of the slits.

Another element of the invention is the use of a blade or razor having a cutting edge with a tip radius (in a cross-section) on a submicron scale.

Another element of the invention is the use of a mechanical stretching of the sheet along a direction perpendicular to the slits to separate the opposing walls of the slits from each other.

Another element of the invention is the use of heat to aid the separation of the opposing walls of the slits.

A still further element of the invention is the use of slits is a surface of the sheet to form deep and narrow voids in the material of the sheet.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus and method generally shown in the preceding figures. It will be appreciated that the apparatus and method may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

The present invention particularly seeks to provide illumination components capable of receiving daylight entering building interiors through various openings, such as wall windows, roof windows, doors and skylights and redistributing such daylight for an improved daylighting efficiency, more uniform spatial distribution and reduced glare. Daylight is generally referred to both the direct and indirect sunlight striking the respective openings in buildings during the daytime. The direct sunlight represents a quasi-parallel beam from the sun and the indirect sunlight represents the diffuse solar radiation scattered out of the direct beam by the sky and various outdoor objects. While the operation of the following embodiments is primarily described by example of the direct sunlight, it should be understood that this invention may also be applied for admitting and redistributing the diffuse component of sunlight within a building interior.

The following embodiments of the present invention are generally directed to a flexible sheet-form optical article or system which may be configurable for light redirecting operation in response to the incident daylight and further configurable for a fabric-like behavior in response to its handling. Therefore, such optical article or system is hereinafter referred to as a "daylighting fabric". It is noted, however, that the term "fabric" should be understood broadly, without particular regard to specific types of fabric produced by weaving or knitting textile fibers, as it mostly reflects the relatively soft and flexible feel of such sheet-form optical article and not its texture or composition. Accordingly, the term "fabric" should not be construed as limiting this invention in any way. As it will be understood from the following description, the term "fabric" may be particularly relevant in the context of the present invention considering that the disclosed optical articles and systems may be formed from various unwoven soft and flexible materials, such as, for example, sheets of flexible vinyl, that are commonly referred to as "fabric" in the art.

Figure 1:
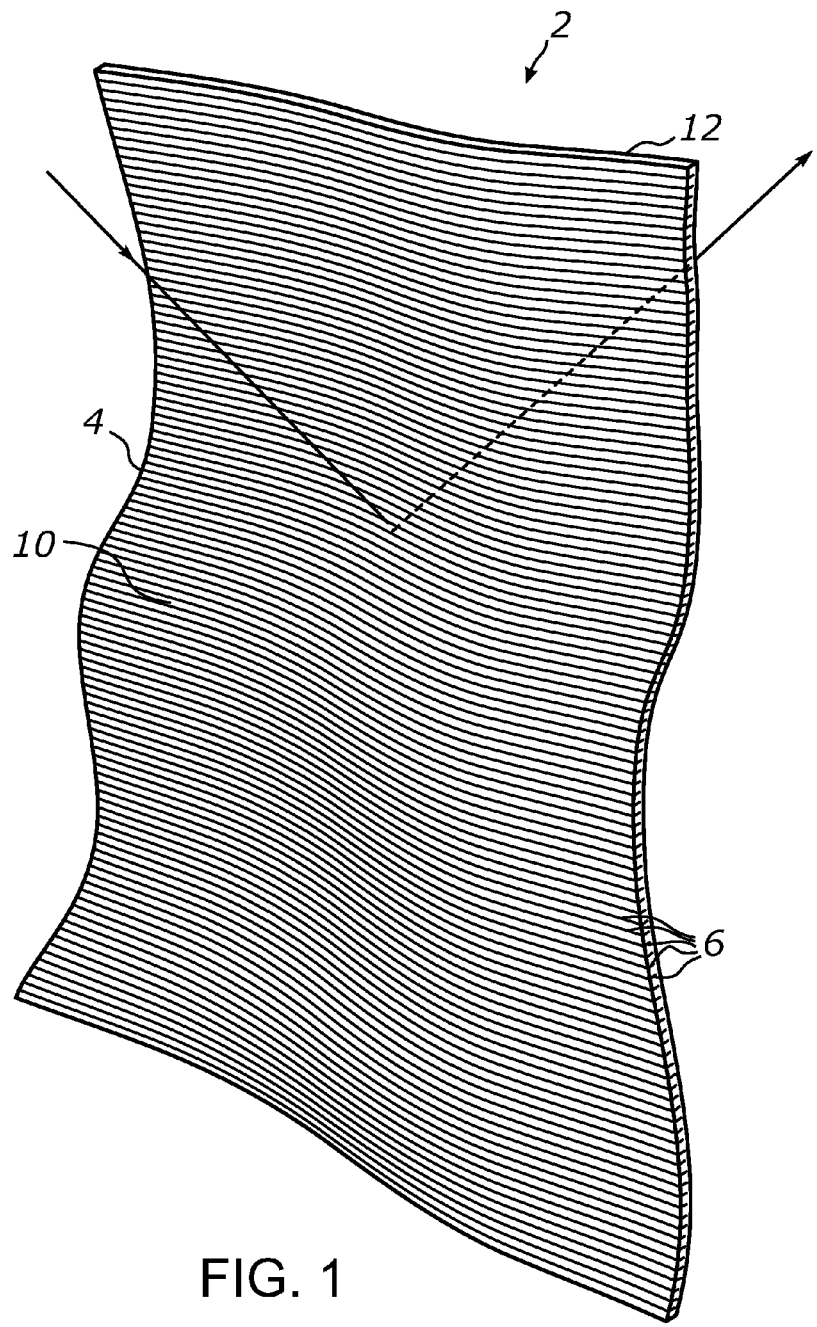
FIG. 1 is a schematic perspective view of a rectangular sheet of a daylighting fabric, according to at least one embodiment of the present invention.

FIG. 1 illustrates a first embodiment 2 of a daylighting fabric. In this embodiment, daylighting fabric 2 is formed by a relatively thin, soft and flexible sheet 4 of optically transmissive material. The material should preferably be clear or translucent so that sheet 4 can transmit light incident onto its surface without substantial losses. Sheet 4 has a generally rectangular shape defined by a first broad-area surface 10 and an opposing broad-area surface 12. The material of sheet 4 is exemplified by optically transmissive, plasticized polyvinyl chloride (PVC). The plasticized polyvinyl chloride is commonly referred to as soft vinyl, flexible vinyl, soft PVC, flexible PVC, plasticized PVC, and PVC-P. Such terms are often used interchangeably in the art with respect to plasticized polyvinyl chloride so that they may also be used interchangeably in the following description in reference to this material.

In contrast to the rigid (unplasticized) PVC which is a semi-crystalline polymer with a relatively high glass transition temperature and tensile modulus, soft PVC contains considerable amounts of plasticizing entities which lower its tensile modulus and also lower the glass transition temperature of the material to below room temperature which makes soft PVC to feel slightly rubbery.

There are currently hundreds of known PVC plasticizers and at least several dozens of suppliers. Some of the common chemical families used in plasticizing PVC include dialkyl orthophthalates, alkyl benzyl phthalates, dialkyl tere-phthalates, epoxides, aliphatic carboxylic diesters, polyester-type polymerics, phosphate esters, trimellitate esters, benzoate and dibenzoate esters, alkyl sulphonic esters of phenol and cresol, and miscellaneous-type plasticizers.

Other entities commonly added to PVC may also include stabilizers, pigments, fillers, lubricants, fire retardants, UV-stabilizers, antistatics additives, and the like. While pigments are often used in various PVC-based products, a pigment-free, clear formulation of PVC-P is preferred for sheet 4.

Clear and flexible PVC-P materials which may be suitable for sheet 4 are commonly available in the form of large-area sheets or rolls. Suitable material thicknesses may include the range from a fraction of a millimeter to several millimeters.

By way of example and not limitation, sheet 4 may be made from one of the several types of commercially available clear vinyl sheeting used for window glazing, tent windows, awnings, boat windows, totally transparent or slightly tinted curtains and the like. Since the plasticized vinyl available in thin flexible sheets possesses rubber-like flexibility, can be sewn and resembles fabric or cloth in its behavior, it is also often referred to as vinyl fabric. Sheets made from clear and flexible vinyl fabric and processed according to the teachings of at least some embodiments of the present invention may thus also exhibit the fabric-like feel and behavior. Accordingly, in the context of the present invention, the term "fabric" is particularly directed to include a flexible sheetform of soft and tough material, such as plasticized PVC sheeting, and more particularly include soft vinyl sheet material in the thickness range from 0.5 mm to 3.2 mm.

For instance, sheet 4 can be cut to size from a 30-, 40-, or 60-gauge (0.8 mm, 1 mm and 1.5 mm, respectively) clear vinyl fabric commercially available by the yard or by the roll from online retailers such as MyTarp.com, onlinefabricstore.net, or fabricscentral.com. In another non-limiting example, the material suitable for making sheet 4 may include flexible PVC sheeting and fabrics manufactured/distributed by Win Plastic Extrusions of Cuyahoga Falls, Ohio, Plastic Film Corporation of Romeoville, Ill., Robeco of Garden City, N.Y., etc. In a yet further non-limiting example, sheet 4 may be made from coated flexible PVC sheeting such as the product marketed by Strataglass of Fort Lauderdale, Fla. under name Crystal Clear 20/20. Many of such clear and flexible vinyl sheeting products are made for outdoor use and are hence provided with UV inhibitors in the PVC formulation. Therefore, considering the intended exposure of the daylighting fabric to sunlight, such UV-treated compositions of clear and flexible PVC may be advantageously selected for making sheet 4.

It is noted, however, that suitable materials of sheet 4 are not limited to plasticized PVC. Any other suitable clear and flexible thermoplastic material having properties similar to PVC-P may be used for sheet 4. Particularly, such material should desirably share such properties of PVC-P as the combination of softness and toughness, relatively easy stretch, high degree of recovery, optical clarity, and resistance to sunlight. For instance, some formulations of polyethylene, polyolefin and other materials may potentially be used for making sheet 4. The material should be particularly suitable for mechanical slitting in a manner such that that the walls of the slits can obtain a relatively smooth and glossy surface when at least some types of slitting blades or razors are used.

Certain rigid and optical clear thermoplastic polymeric materials other than PVC may also be modified by plasticizers to change their processing characteristics and potentially make a clear, strong, tough and flexible material which is also suitable for slitting and obtaining a gloss surface finish within the slits. Such materials may particularly include but are not limited to PMMA (acrylic), polycarbonate, and polystyrene. The plasticization of such rigid polymers may conventionally include mixing the respective polymeric resin with a compatible plasticizer at elevated temperature and then allowing the mixture to cool to a temperature at which the material hardens and can be further processed. The plasticizers should preferably be selected so that the plasticized polymer will have a glass transition temperature lower than the room temperature. Alternatively, the respective plasticized polymer may be heated to above the glass transition temperature for processing so that it becomes suitable for mechanical slitting.

Sheet 4 comprises a plurality of deep and narrow slits 6 formed in surface 10. Slits 6 extend parallel to each other and also should preferably extend parallel to an edge of sheet 4. The spacing between slits 6 can be made constant so that the plurality of such slits forms an ordered parallel array. Slits 6 thus form periodic and narrow interruptions in otherwise smooth surface 10 and such interruptions are alternating with relatively broad spacing areas. Each slit 6 extends through more than half of the thickness of sheet 4 but does not reach at the opposing surface 12 which remains generally smooth and uninterrupted by the slits. Each slit 6 has a high aspect ratio which may be defined as the ratio between the depth of the slit and width of the slit at its base in surface 10. The aspect ratio of slits 6 should generally be greater than five and, more preferably, at least ten or more.

Figure 2:
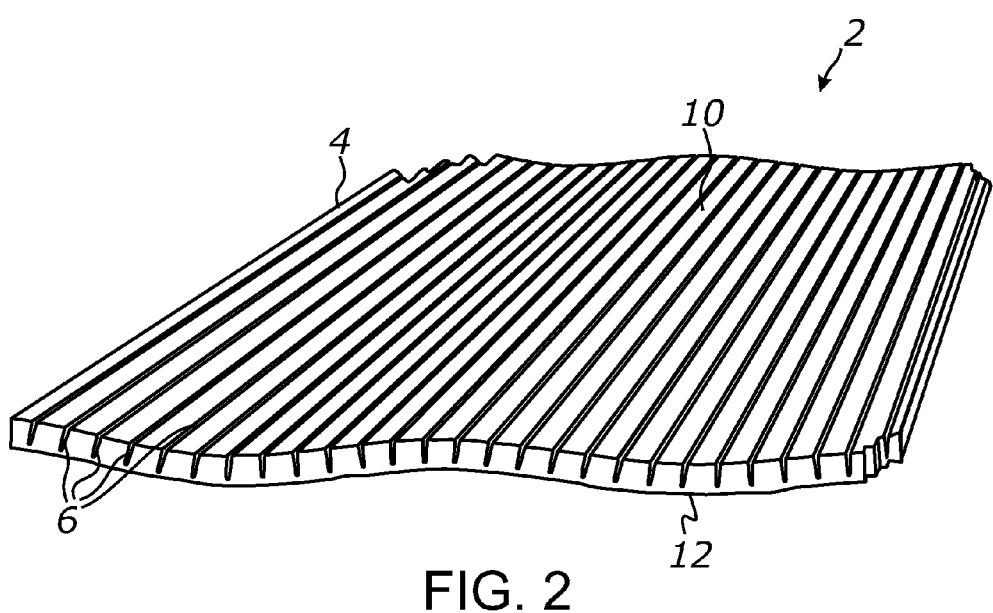
FIG. 2 is a schematic perspective view of a portion of a daylighting fabric, showing a plurality of slits formed in a surface of a flexible sheet material, according to at least one embodiment of the present invention.

FIG. 2 shows a portion of sheet 4 of FIG. 1 in a further detail. Referring to FIG. 2, each slit 6 has a pair of non-contacting walls which are opposing each other and separated by a relatively small distance. The opposing walls of each slit are generally planar and extending generally parallel to each other and also perpendicular to surface 10. The parallelism of the opposing walls of each slit should be within a few degrees, more particularly, within about six degrees. In one embodiment, the opposing walls of each slit 6 are preferably parallel to each other within two degrees. In one embodiment, it may be preferred that the opposing walls of each slit 6 are parallel to each other within one degree. Thus, each slit 6 forms a deep and narrow void with parallel or near-parallel walls in the material of sheet 4, which is in contrast to V-shaped notches or grooves commonly found in prior-art light redirecting and/or waveguiding optical components. Such void may be conventionally allowed to be naturally filled with the ambient air.

The distance between the opposing walls of each slit 6 is substantially less than the distance between adjacent slits. Such distance should also be preferably made as small as practically possible. At the same time, the opposing walls should not be touching each other in order to prevent optical contact between them. The distance between the opposing walls, which defines the thickness of the layer of air in between, should preferably be within a 5 µm to 100 µm range, and more preferably, within a 10 µm to 50 µm range. It is generally preferred that slits 6 are self-supporting when sheet 4 is deployed into a planar or nearly-planar form. To put it differently, it is preferred that sheet 4 should not generally require applying a constant external force to keep the slits from closing.

Sheet 4 may be made in the form of a large-format sheet or wound to a roll. It may also be cut to any size or shape using any suitable fabric cutting technique. In an end-use product, sheet 4 may conventionally have a rectangular or square shape and a generally flat, planar configuration during operation as a light redirecting component.

Figure 3:
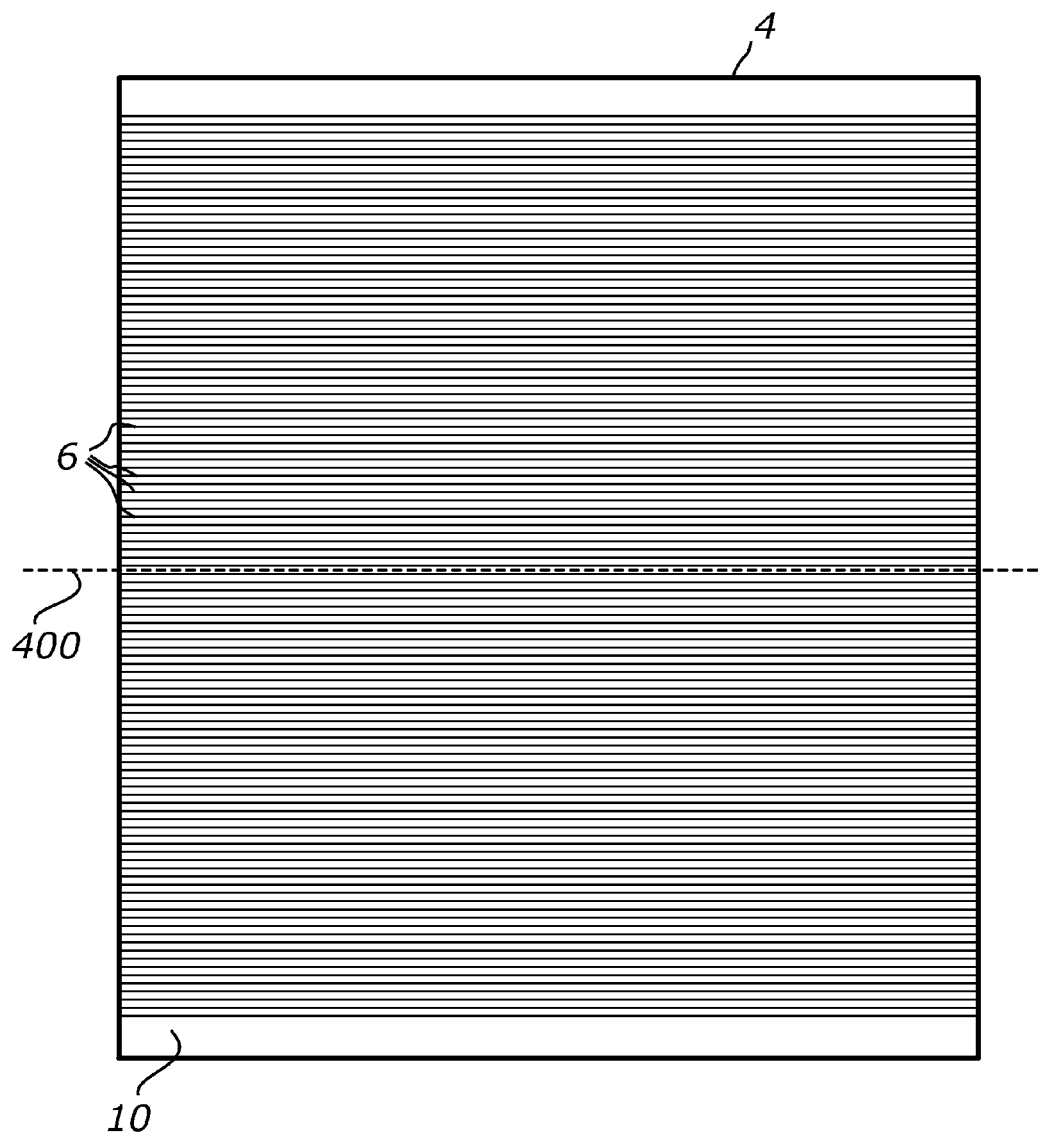
FIG. 3 is a schematic top view of a flexible sheet having a plurality of slits extending parallel to a reference line, according to at least one embodiment of the present invention.

An example of a planar rectangular configuration of sheet 4 is shown in FIG. 3 in which slits 6 extend parallel to a reference line 400 and perpendicular to a longer dimension of the sheet. Reference line 400 which indicates the alignment direction of linear slits 6 in sheet 4 is hereinafter referred to as a longitudinal axis of slits 6. It should be understood that sheet 4 may be configured to have any other rectangular shape with any other proportions between respective dimensions. Slits 6 may also be configured to extend parallel to the longer dimension of the respective rectangle or at an angle to the sides of the respective rectangle.

Slits 6 may be conventionally formed in all of the available area of surface 10 so that they are uniformly distributed in parallel rows through the entire span of sheet 4, as shown, for example, in FIG. 1. For some applications, however, it may be advantageous to leave some border areas on one or more side of sheet 4 which will be free from slits 6. A non-limiting example of such border areas provided at the opposing terminal edges of a rectangular sheet is illustrated in FIG. 3.

Slits 6 may also be formed in surface 10 according to any other suitable pattern. For example, the spacing between slits 6 may be varied according to a predetermined sequence or pattern. In a non-limiting example, two or more areas of surface 10 having slits 6 may be separated from each other by one or more relatively broad spacing areas to form a striped pattern of slit and non-slit areas in sheet 4.

It is noted that suitable configurations of sheet 4 are not limited to square or rectangular shapes and may include any other shapes such as circular, oval, triangular, polygonal, and freeform shapes. It is also noted that, since sheet 4 is soft and flexible, it may also be bent to any suitable shape, wrapped around objects, etc.

A sheet of daylighting fabric 2 cut to the appropriate size and shape may be conventionally positioned in an immediate proximity of an opening in a building façade, such as a wall or door window. It may be positioned inside or outside of such opening, provided that at least a portion sheet 4 can be exposed to daylight. The inside location has an advantage of better protection of the material of the fabric from soiling and minimizing the material degradation from sunlight and elements. On the other hand, the outside location may be advantageous for intercepting more sunlight and potentially for more efficient daylight harvesting.

In order to be able to harvest the direct component of natural daylight, daylighting fabric 2 should be used in a part of the building façade which is illuminated by the direct sunlight during at least a portion of the daytime. Accordingly, unobstructed east, south and west facades may be generally suited for using daylighting fabric 2 for harvesting the direct sunlight. For maximum daylight capture, south, south-east and south-west facades may be more preferable.

In non-limiting example, by taking an exemplary case of the opening in a building façade being a vertical wall window, sheet 4 may be a suspended in a vertical position in front of the window and may cover the entire window area. Such sheet 4 may be conventionally attached to the top of the respective window frame or to the top of the respective opening in the wall. It should be understood, however, that sheet 4 may also be positioned at any other location of the respective window and cover only a portion of its area.

Figure 4:
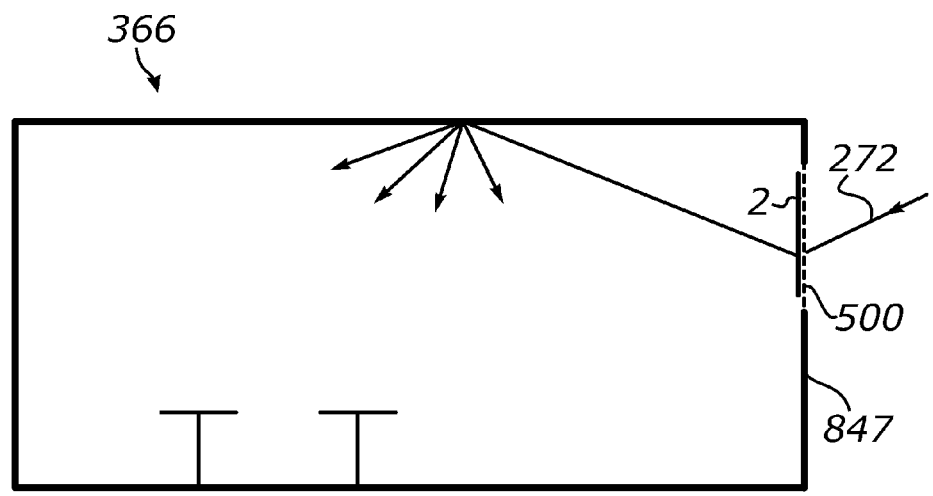
FIG. 4 is a schematic view showing the operation of a light redirecting sheet of a daylighting fabric disposed in a vertical orientation in an opening of a building facade, according to at least one embodiment of the present invention.

FIG. 4 schematically shows an example of the operation of daylighting fabric 2 which admits light into a building interior and distributes light within the interior. The building interior is exemplified by a room 366 having a rectangular configuration and a window opening 500 in its external wall 847. The incident daylight is represented by a ray 272 passing through window opening 500 into the room. Ray 272 may particularly exemplify the direct sunlight or diffuse skylight which naturally propagates in a downward direction and therefore tends to directly illuminate only the floor area in a vicinity of the window or various objects nearby.

A large-area sheet of daylighting fabric 2 disposed in the path of ray 272 deflects such ray from its natural downward propagation direction and redirects it onto a ceiling of room 366. There are numerous ways of how daylighting fabric 2 may be positioned within or in a close proximity to such opening 500. For instance, it may be fixed in a suspended position by attaching the top edge of the respective sheet 4 to wall 847 above opening 500, laminated onto a window pane, stretched between two opposing rollers or bars, etc. The ceiling further scatters and redistributes daylight deflected by daylighting fabric 2 within room 366.

Redirecting daylight onto the ceiling has a number of advantages. For instance, considering that the incidence direction of daylight changes in a very broad angular during the daytime and seasonally, the large area of the ceiling and its typically uniform light scattering characteristics across the surface ensures that ray 272 is intercepted and properly scattered. Furthermore, since the ceiling is often painted white or in relatively light colors, it may generally have a higher albedo (reflection coefficient) than the floor or various objects in the room interior. As a result, the light energy of ray 272 may be scattered by the ceiling with a relatively low loss compared to scattering from other surfaces in room 366 and thus ensure a more complete sunlight harvesting for daylighting purposes. Additionally, it may be appreciated that the surface of a ceiling typically has very good light diffusing properties. Therefore, the reflection of light rays from the ceiling will be primarily of a diffuse type which may result in a relatively homogeneous light distribution in the room and in a reduced glare. A yet further advantage of redirecting daylight to the ceiling or upper portions of the room interior is that such redirection effectively creates a diffuse source of daylight within the room well above the eye height rather than allowing the direct daylight to reflect or scatter from the lower surfaces and produce blinding glare. A yet further advantage will be apparent when room 366 includes partitions or various tall objects which may partially or totally obstruct daylight penetration deep into the room interior if such daylight is not redistributed via the ceiling.

Accordingly, it will be appreciated that positioning daylighting fabrics 2 in a close proximity or within opening 500 may provide at least partial shading of the room interior and its occupants from the direct sunlight while using the ceiling to convert a substantial portion of the direct beam into diffuse daylight emanated from an overhead location and thus enhancing the overall daylighting level and improving light distribution in the room interior.

Figure 5:
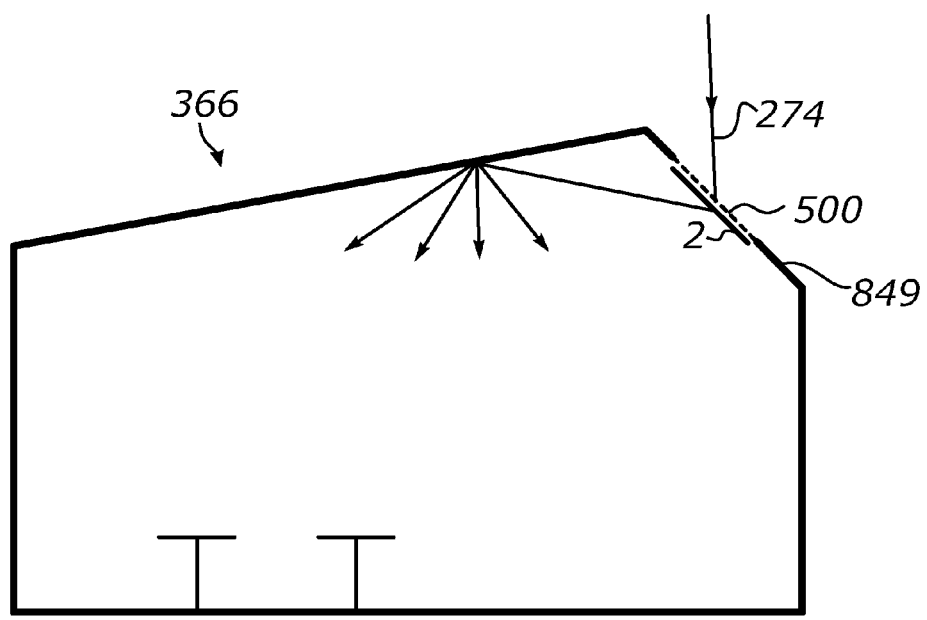
FIG. 5 is a schematic view showing the operation of a light redirecting sheet of a daylighting fabric disposed an angle to a vertical direction in a vicinity of a roof window or skylight of a building, according to at least one embodiment of the present invention.

FIG. 5 illustrates using a sheet of daylighting fabric 2 to redirect and redistribute light incident onto a sloped section of a roof 849 of room 366 having a different configuration compared to FIG. 4. Opening 500 of FIG. 5 may represent a conventional daylighting element such as a roof window or a skylight. The sheet of daylighting fabric 2 is positioned parallel to opening 500 and in a close proximity to it. By way of example and not limitation, the sheet of daylighting fabric 2 may be mounted within the frame of the respective roof window or skylight or otherwise attached to such frame. Daylighting fabric 2 may be disposed in a stretched state, laid down on an optically transmissive plate or laminated onto a planar light-transmitting surface. Such surface may be a part of a daylighting component associated with opening 500, such as, for instance, a window pane or diffusing panel of a skylight.

In operation, referring to FIG. 5, a ray 274 exemplifying direct and/or diffuse sunlight propagating from a zenith direction and incident into room 366 through opening 500 strikes daylighting fabric 2 and is redirected onto the ceiling of room 366. Due to utilizing TIR, daylighting fabric 2 is capable of redirecting such ray 274 by a large bend angle which may exceed 90°. The redirected ray 274 is then scattered and/or diffused by the ceiling which provides improved daylighting conditions and reduced glare compared to the case when room 366 is illuminated directly through opening 500 and without the aid of daylighting fabric 2.

Figure 6:
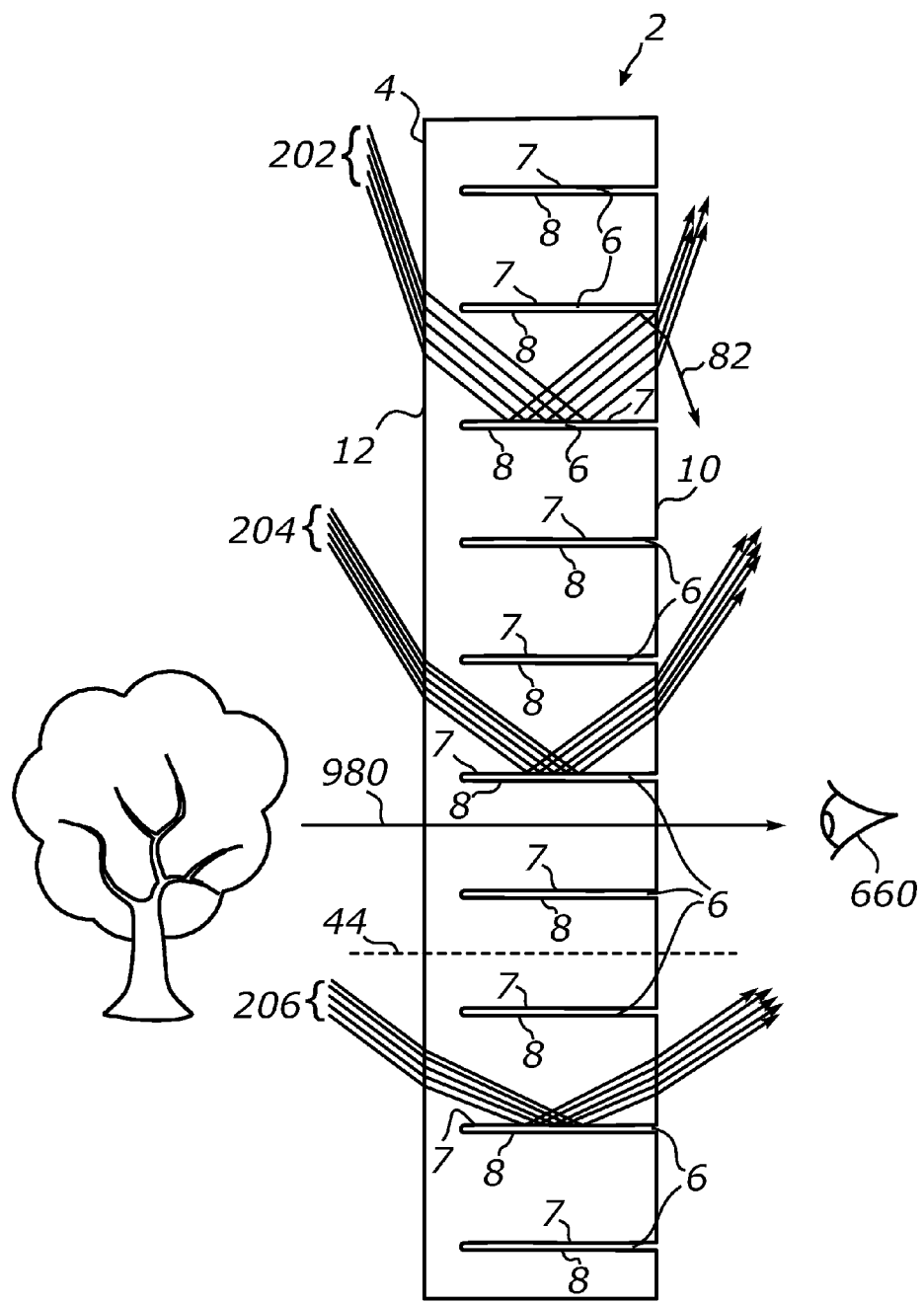
FIG. 6 is a schematic cross section view and raytracing of a daylighting fabric portion, according to at least one embodiment of the present invention.

FIG. 6 shows a schematic cross-section of a portion of sheet 4 and illustrates the operation of daylighting fabric 2 in more detail. As depicted in FIG. 6, each slit 6 includes a pair of opposing parallel walls 7 and 8 which define internal TIR optical interfaces within sheet 4. Each of such optical interfaces is characterized by a stepped change in the refractive index of the medium as defined by the optical properties of plasticized PVC material and ambient air.

Each of walls 7 and 8 are configured to have a relatively smooth and glossy surface which is capable of reflecting light by means of total internal reflection (TIR) when the incidence angle of light rays onto the surface exceeds the critical TIR angle characterizing the material of sheet 4. Thus, each slit 6 forms a pair of internal TIR surfaces within sheet 4 and can be configured to redirect light at relatively high bend angles using TIR. Since the transversal width of slits 6 can be made very thin in comparison to the width of the spacing areas between adjacent slits, the light receiving aperture of such slits will primarily be defined by the TIR surfaces of their walls. Accordingly, according to one aspect, the plurality of slits 6 may be viewed as a plurality of thin, two-sided TIR reflectors formed between surfaces 10 and 12 of sheet 4.

When daylighting fabric 2 is used in conjunction with a vertical wall opening, the orientation of sheet 4 should be such that slits 6 extend generally parallel to the horizontal plane. In the embodiment illustrated in FIG. 6, the smooth and uninterrupted surface 12 is facing outside and is configured as a light input surface of sheet 4. Surface 10 in which slits 6 are formed is facing towards the building interior and is configured as a light output surface of sheet 4. It is noted, however, that, according to one embodiment, sheet 4 may also be positioned in a reverse orientation in which surface 10 is facing towards the source of daylight (outside) and is configured for light input while the opposing surface 12 can be facing inside and configured for light output.

In operation, referring further to FIG. 6, a quasi-parallel ray bundle 202 illustratively exemplifies a direct beam of sunlight striking the light input surface 12 of sheet 4 when the sun is situated at a relatively high elevation angle with respect to the horizontal plane. More particularly, ray bundle 202 may exemplify a mid-day direct beam of sunlight in geographical areas having relatively low latitudes.

Ray bundle 202 refracts at surface 12 and enters the optically clear material of sheet 4. Since the refractive index of sheet 4 is greater than that of the ambient air, each ray in the ray bundle 202 undergoes a positive refraction and further propagates at a lower angle with respect to a normal 44 to surfaces 10 and 12.

As ray bundle 202 further propagates through the optically transmissive material of sheet 4, it strikes the surface of horizontally disposed wall 7 of one of the slits 6. Since wall 7 forms and optical interface between the high-index plasticized PVC material and low-index air, it may act as a TIR reflector for light rays striking its surface at an incidence angle greater than the critical TIR angle.

It may be shown that for the refractive indices typical for PVC material (n>1.5) and for the light path geometry illustrated in FIG. 6, the angle of incidence of ray bundle onto the surface of wall 7 will always be greater than the critical TIR angle at the PVC/air interface. Accordingly ray bundle 202 will undergo virtually lossless TIR at such wall 7.

Referring further to FIG. 6, the operation of daylighting fabric 2 is illustrated for the case where both surfaces 7 and 8 are configured to reflect light by means of TIR in a specular regime. The specular reflection of electromagnetic waves, and particularly light, is generally referred to as a mirror-like reflection from a surface in which a light ray or a beam of light incident from a single incoming direction is reflected into a well-defined, single outgoing direction. Specular reflection is generally distinct from diffuse reflection in which an incident light ray or beam of light is reflected into a range of directions.

For the purpose of this invention, the term "specular reflection" should be understood broadly and generally includes the type of reflection in which the reflected rays are distributed within a narrow angular range from the specular reflection angle. Accordingly, the specularly reflected light beam may include diffuse light rays which are deflected from the "ideal" direction of the specular reflection by a relatively small angle.

As ray bundle 202 reflects from the surface of wall 7 by means of TIR in a specular regime, the angle of reflection will be equal to the angle of incidence onto said surface. The spacing between adjacent slits 6 is such that most rays in the reflected ray bundle 202 can reach the light output surface 10 without being intercepted by an adjacent slit 6. Such rays can thus undergo refraction at surface 10 and emerge from the surface at a relatively high angle with respect to the horizontal plane. It will be appreciated that in the case of parallelism of surfaces 10 and 12 and when the respective wall 7 is perpendicular to such surfaces, the propagation direction of redirected rays will generally mirror the natural propagation direction of the beam of direct sunlight relatively to the horizontal plane.

According to one aspect of the operation of daylighting fabric 2, each wall 7 may act as a functional equivalent of a mirrored surface positioned parallel to the horizontal plane. The plurality of refractive walls 7 distributed within sheet 4 along a vertical direction may thus be viewed as an array of distributed reflectors inverting the propagation direction of daylight with respect to the horizontal plane. Therefore, when such daylighting fabric 2 is positioned in a vertical orientation on a path of the direct sunlight entering a room in a building, at least a portion of such beam may be redirected onto the ceiling of such room (see, e.g., the discussion in reference to FIG. 4).

The use of TIR for redirecting ray bundle 202 by sheet 4 ensures a high bend angle and directing the beam of sunlight towards the ceiling rather than towards the floor which may be difficult to achieve using, for example, refractive-type light redirecting structures. Thus, in addition to the improved daylighting condition in the room, the glare and exposure of the unwanted parts of the interior to the direct sunlight may also be reduced with the use of daylighting fabric 2.

It is noted, however, that the spacing of slits 6 may be so selected that at least a portion of the high-elevation-angle beam may be allowed to continue propagate along the natural propagation direction upon exiting from surface 10. This is illustrated in FIG. 6 by the example of a ray 82 which is intercepted by wall 8 of the above slit 6 and can be redirected differently. Since the angle of incidence of the ray 82 onto wall 8 is the same as the incidence angle of the other rays of ray bundle 202 onto wall 7 and since walls 7 and 8 are generally parallel, the TIR conditions are also met for such ray at wall 8 and the reflection angle is also the same as the angle of incidence. However, since ray 82 undergoes an additional reflection from a parallel TIR reflector compared to the rest of the ray bundle 202, it continues following the original propagation direction of the respective beam.

Such splitting of the parallel beam of direct sunlight onto at least two beams diverging from each other may be advantageously utilized to further improve the distribution of daylight in the building interior and reduce glare. The angle between the main bulk of rays in ray bundle 202 and ray 82 define the total beam spread of light emerging from sheet 4. It will be appreciated that such beam spread may be fairly broad, particularly for the direct sunlight incident from high elevation angles. By varying the relative distance between slits 6, the ratio between the intensity of the beam redirected upwards and the intensity of the beam directed downwards may be changed to a desired proportion for a given solar elevation angle thus providing additional control over daylight distribution.

In one embodiment, the relative density of slits 6 may be made sufficiently low to enable the passage of at least some rays through sheet 4 without any interaction with walls 7 or 8. In a non-limiting example, illustrating a rather extreme variation of daylighting fabric 2, slits 6 may be so sparsely populated in surface 10 that only a relatively small portion of the incident sunlight will be redirected onto the ceiling and most the incident light may pass through sheet 4 unaltered.

Conversely, in one embodiment, the relative density of slits 6 may also be made sufficiently high to cause multiple reflections from walls 7 and 8 for at least some rays propagating through sheet 4. Thus, the respective pairs of opposing walls 7 and 8 of adjacent slits 6 may act as short-distance waveguides for such rays. The multiple interactions of light rays with walls 7 and 8 may randomize the emergence angles from surface 10 thus homogenizing the light admitted into the building interior. It will be appreciated that any imperfections of the surfaces of walls 7 and 8, such as waviness or surface microrelief features may cause some spreading of the initially parallel beam over an angular range thus providing yet additional beam homogenization and further reducing glare.

Referring yet further to FIG. 6, a ray bundle 204 exemplifies direct sunlight at a lower solar elevation angle compared to the previously discussed ray bundle 202. The lower incidence angle of ray bundle 204 with respect to a normal to light input surface 12 causes the respective rays to emerge at lower angles to the horizontal plane and thus penetrate generally deeper into the room's interior, resulting in somewhat different light distribution inside.

A ray bundle 206 exemplifies the direct sunlight at even lower solar elevation angle and may represent, for example, clear-sky outdoor daylighting conditions in winter time in the northern hemisphere or late morning/early evening hours at low- and mid-latitude geographic locations. The low-angle ray bundle 206 is redirected into the building interior at a relatively oblique angle with respect to the horizontal plane and can penetrate considerable depth into the building. It will be appreciated that even relative low solar elevation angles, the direct beam is still directed towards the upper portions of the building interior including walls and/or the ceiling thus resulting in a generally improved daylighting condition compared to the case when sunlight directly illuminates the floor area.

It will be appreciated that, while sheet 4 may be configured to efficiently redirect and redistribute the direct component of sunlight, it may also operate according to the same principles to admit and redistribute the diffuse (indirect) daylight into the building. Daylighting fabrics 2 may therefore be utilized to improve daylighting levels in building interiors even in overcast sky conditions.

The use of TIR to redirect at least a portion of light entering into the building interior through daylighting fabric 2 allows for a broader angular distribution of light compared to refractive diffusers and can help naturally illuminate portions of the building interior than would not otherwise be possible. It will be appreciated that, since TIR is practically lossless, sheet 4 may have fairly high light transmission which may be comparable to the transmission of a raw sheet of the same material.

It is noted that daylighting fabrics 2 may be configured for a see-through appearance. The combination of the thin form factor of slits 6, the transparency of the PVC-P material of sheet 4 and the parallelism and smoothness of surfaces 10 and 12 may provide for a generally interrupted passage of light along a direction perpendicular or near-perpendicular to the surface of the sheet.

This is illustrated in FIG. 6 by the optical path of a light ray 980 which traverses sheet 4 without appreciable attenuation or deflection. Ray 980 may particularly exemplify light scattered or otherwise emanated by various outdoor objects that may be visible from the inside of the building through the respective opening. Since sheet 4 may be configured for a generally unimpeded light passage at least perpendicularly to its surface, it may have a relatively good visual transparency despite the presence of slits 6. Accordingly, an observer 660 inside the building may be able to see such outdoor objects with sufficient clarity. A see-through configuration of daylighting fabric 2 may be advantageously selected for applications where the aesthetic considerations and transparency of the respective light-admitting structure are important.

On the other hand, since walls 7 and 8 of slits 6 are reflective, light rays passing through sheet 4 at certain angles may undergo one or more reflections from such walls. Accordingly, images viewed through sheet 4 at a sufficiently high angle from the horizontal plane may appear be somewhat distorted or otherwise may be visible with a reduced clarity. Accordingly, daylighting fabric 2 may also be configured to provide privacy for the occupants. In order to enhance the privacy function, sheet 4 may be further configured to distort the appearance of objects behind fabric 2 even more appreciably.

Design parameters that can be varied to control the see-through or privacy functionality of daylighting fabric 2 may include but are not limited to the width and/or depth of slits 6 relatively to the thickness of sheet 4, the density of slits 6 on surface 10, angles at which slits 6 extend into the material and surface roughness of the slits.

When an increased level of privacy is desired, any of the surfaces 10 and 12 may be patterned. Such pattern may be random or ordered and may also carry a decorative content such as images, silhouettes, geometric shapes or the like. Suitable patterns may be formed using conventional methods including but not limited to molding, calendering, microreplication, embossing, imprinting, extrusion and the like.

In a further alternative, a pigment may be added to the material of sheet 4 in order to alter its color or transparency. Particularly, the material of sheet 4 may be made translucent so that at least some image details of the objects behind the sheet can be masked and/or blurred. In a yet further alternative, sheet 4 may include or used in conjunction with an external translucent privacy film or screen.

For decorative purposes, any suitable image or pattern may be printed on either surface of sheet 4. Suitable techniques may include but are not limited to digital printing, screen printing, stencil-printing, selective dyeing and painting. The print may be opaque in which case its total area should preferably occupy relatively small fraction of the surface of sheet 4 in order to not disrupt its daylighting operation. The print may also be made using transparent or semitransparent inks or dyes in which case the area of the print may be larger, up to the entire area of sheet 4. Various shapes may also be cut out of sheet 4 in order to provide a distinct ornamental appearance to daylighting fabric 2.

Referring yet further to FIG. 6, it will be appreciated by those skilled in the art that the reflection of light by walls 7 and 8 in a specular or near-specular regime generally requires a fairly high optical quality of the surface. Ideally, the surface should be optically smooth and resembling the surface of optical mirrors and lenses. Conventionally, for optics and polished mirror surfaces, the calculated (or measured) values of RMS surface profile roughness do not generally exceed an upper limit of about 100 Å (10 nanometers).

Obviously, a conventional cutting blade or razor generally cannot slit materials such as flexible PVC while producing the surface quality comparable to the optical mirrors and lenses, regardless of the blade sharpness. The conventional polishing techniques are neither available nor practical for improving the finish of the slit walls, considering the softness of the PVC-P material, the extremely narrow air space between walls 7 and 8 and the large number of slits 6 that may be formed in sheet 4. Therefore, the surfaces of walls 7 and 8 will rather have appreciable roughness and highly irregular microstructure compared to the optical-quality surfaces. Such microrelief may become readily evident when examining the surface of an individual slit with a microscope under 50×-1000× magnification.

Yet, it may be shown that, when special requirements are met for the slitting blade or razor and when appropriate slitting techniques are used, the surface roughness and other surface irregularities may be reduced to a level at which the surface will exhibit specular or near-specular TIR properties sufficient for the proper operation of the daylighting fabric. The importance of establishing the acceptable levels of surface roughness may be appreciated not only from the point of view of light directing functionality and optical efficiency but also from the point of view of finding the proper balance between the surface quality and the cost of tooling for making the daylighting fabric 2. For example, on one hand, inadequate quality of the slitting blade may create light diffusing surfaces lacking sufficient specular TIR properties of slits 6 and may thus impede their light redirecting operation. On the other hand, setting too stringent criteria for the material and edge sharpness of the blade may be cost prohibitive and thus impractical for processing sheet 4 on the industrial scale.

It will be appreciated by those skilled in the art that, if a reflective surface is illuminated with a parallel beam of light, the reflectance may be divided into two components, one of which arises from specular reflection and the other from diffuse reflection or scattering. It is generally believed that a substantially smooth reflective surface will exhibit a predominantly specular reflection while a rough surface will scatter light in a diffuse regime.

While there is no firmly established criterion of an optically smooth surface, the so-called Rayleigh smooth surface criterion is often used in the field of optics. The Rayleigh criterion is given as $$\left(\frac{4\pi R_q \cos\theta_i}{\lambda}\right)^2 \ll 1,$$

where $R_q$ is the root mean square (RMS) roughness of the surface, $\lambda$ is the wavelength of the electromagnetic wave and $\theta_i$ is the angle of incidence. The roughness parameter $R_q$ commonly expresses a 2D roughness profile taken along a reference line across a portion of the surface.

In (J. Stover, Optical Scattering, Measurement and Analysis, 2nd ed., SPIE Press, 1995, p. 79), it is argued that the term "much less than" in the Rayleigh criterion should mean 0.01 for electromagnetic spectrum from UV to the mid-IR. For 0.5 µm wavelength and for the most part of the expected range of incidence angles, this would translate into the requirement of RMS roughness to be well below 10 nanometers (nm). Such surface roughness requirement is common for conventional optical mirrors, lenses and polished surfaces but is hardly feasible for mechanical slitting the soft PVC material of sheet 4 using blades or razors. A more conventional meaning of the term "much less than" of about 0.1 would yield maximum $R_q$ values of around 40 nm. In (T. Vorburger, et al., Appl. Opt. 32(19), 3401-3408, 1993), the smooth surface regime was arbitrarily defined as $R_q/\lambda<0.05$, which translates into $R_q$ values of less than 25 nm for a 0.5 µm wavelength. While there are clear indications in the art that the surface must meet certain maximum roughness criteria in order to be considered optically smooth, the significant bias between different estimated and the vagueness of the optically smooth surface definition still leave some uncertainty regarding the acceptable roughness levels.

In order to more accurately define the requirements for surface roughness that can be accepted for the TIR walls of slits 6, we now turn to defining the specular regime of reflection.

It is well known that the surface rms roughness is related to the amount of specularly reflected light. The relationship governing this may be found, for example in (P. Beckmann and A. Spizzichino, The Scattering of Electromagnetic Waves from Rough Surfaces, Artech, Norwood, Mass., 1987, Chaps. 3-5) and can be written in the following form:

$$P_{Spec} = P_{Tot} e^{-\left(\frac{4\pi R_q \cos\theta_i}{\lambda}\right)^2}, \quad \text{(Eq. 1)}$$

where $P_{Spec}$ is the flux reflected in the specular direction and $P_{Tot}$ is the total reflected flux. The total reflected flux is a sum of $P_{Spec}$ and $P_{Scat}$, the latter being the light scattered away from the specular direction by the surface roughness irregularities: $P_{Tot}=P_{Spec}+P_{Scat}$.

Considering that TIR is practically lossless, Eq. 1 can be rewritten in the following form for the case of the total internal reflection from walls 7 and 8 of slit 6:

$$P_{Spec}\% = 100\% \ e^{-\left(\frac{4\pi R_q \cos\theta_i}{\lambda}\right)^2}, \quad \text{(Eq. 2)}$$

where $P_{Spec}\%$ is the specular TIR reflectivity expressed as a percentage of the incident flux. Accordingly, $$P_{Scat}\% = 100\% - P_{Spec}\%. \quad \text{(Eq. 3)}$$

Figure 7:
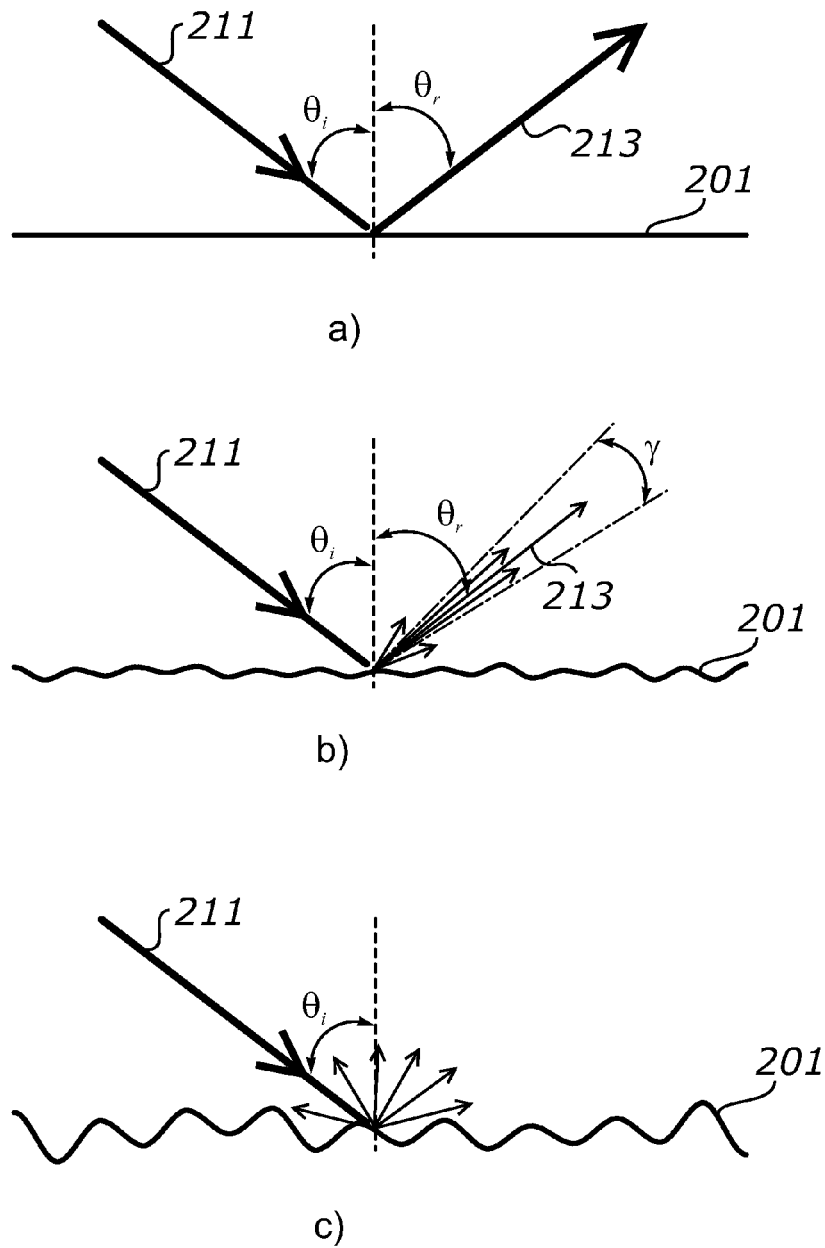
FIG. 7 is a schematic view showing raytracing diagrams and illustrating various regimes of light reflection from a surface.

FIG. 7 schematically illustrates the effects of surface roughness on the reflection from a reflective surface 201. While it shows a rather qualitative and general example which can be applied to many types of surfaces, the same type of reasoning can be applied to the case of TIR reflection from a wall of slit 6.

In FIG. 7a, a ray 211 exemplifies a parallel beam of light incident onto surface 201 at an incidence angle $\theta_i$. A ray 213 exemplifies the reflected beam which has a reflection angle $\theta_r$. Surface 201 of FIG. 7a exemplifies an idealized optically smooth surface which reflects ray 211 entirely in a specular regime where $\theta_r=\theta_i$ as a matter of optics.

In FIG. 7b, surface 201 has some non-negligible roughness and the reflected light has both the specular component, exemplified by ray 213, and a diffuse component exemplified by several rays distributed over a range of reflection angles. It will be appreciated that, according to Eq. 1, the relative contribution of the specular and diffuse components to the total reflected beam intensity will depend on the wavelength, incidence angle $\theta_i$ and RMS surface roughness $R_q$.

Referring further to FIG. 7b, at least some scattered light may be distributed around ray 213 within a relatively narrow angular cone having an angular size $\gamma$. Moreover, as it will be appreciated by those skilled in the art, when rms surface roughness is below a certain threshold, a substantial part of the beam energy may be confined within such narrow angular cone. The reflection distributed within a very narrow angle is generally referred to as a specular spike and the diffuse-type reflection which has a sharply asymmetric angular distribution with the peak intensity in the direction of the specular reflection is commonly referred to as a specular lobe.

FIG. 7c illustrates the case of extreme, from the optical point of view, roughness of surface 201 where all reflected light is diffuse and there is no well defined specular component.

Obviously, the TIR walls of slits 6 formed by mechanical slitting generally cannot have ideally smooth surfaces operating strictly in the specular regime of reflection of FIG. 7a. On the other hand, the light redirecting operation of slits 6 in a specular or near-specular TIR mode generally precludes extreme surface roughness of the type illustrated in FIG. 7c.

Accordingly, the case illustrated in FIG. 7b may qualitatively describe the type of surface roughness applicable to the walls of slits 6 more closely. Since light rays in the spectral spike generally maintain the propagation direction of the light beam reflected in the "ideal" specular regime, such rays may generally be considered as being a part of the specular component of the reflection for the purpose of this invention. Such light rays may thus also be included in the consideration when estimating of the acceptable levels of surface roughness based on the specular reflection criteria.

While the spectral lobe may have a considerably broader angular spread compared to the specular spike, at least a portion of its rays may still be confined within a relatively low angular range from the specular reflection direction. Although such rays may have a different propagation path compared to the rays reflected in a specula regime, the relatively low deflection angle may still permit for their redirection in a manner similar to the specular rays. Moreover, admitting such diffusely reflected light into a building interior may contribute to the overall beam spread and may thus further improve the overall daylighting conditions inside.

Accordingly, daylighting fabric 2 may be configured so that the surface of slits 6 includes regions having surface roughness resulting in a specular spike and a relatively narrow spectral lobe. In view of the above-described considerations, daylighting fabric 2 may be configured with the surface roughness of slits 6 being such that at least a substantial part of the light beam reflected from walls 7 and 8 is distributed within an narrow cone having a predetermined angular value $\gamma_{MAX}$. Angle $\gamma_{MAX}$ may be defined from various considerations including but not limited to the geometry of the TIR channels formed by opposing walls 7 and 8 of the adjacent slits 6, refractive index of the material of sheet 4, the desired angular distribution of daylight to be admitted into the building interior, the relative proportion of light energy that daylighting fabric 2 may be allowed to reject, the anticipated range of solar elevation angles, etc.

Figure 8:
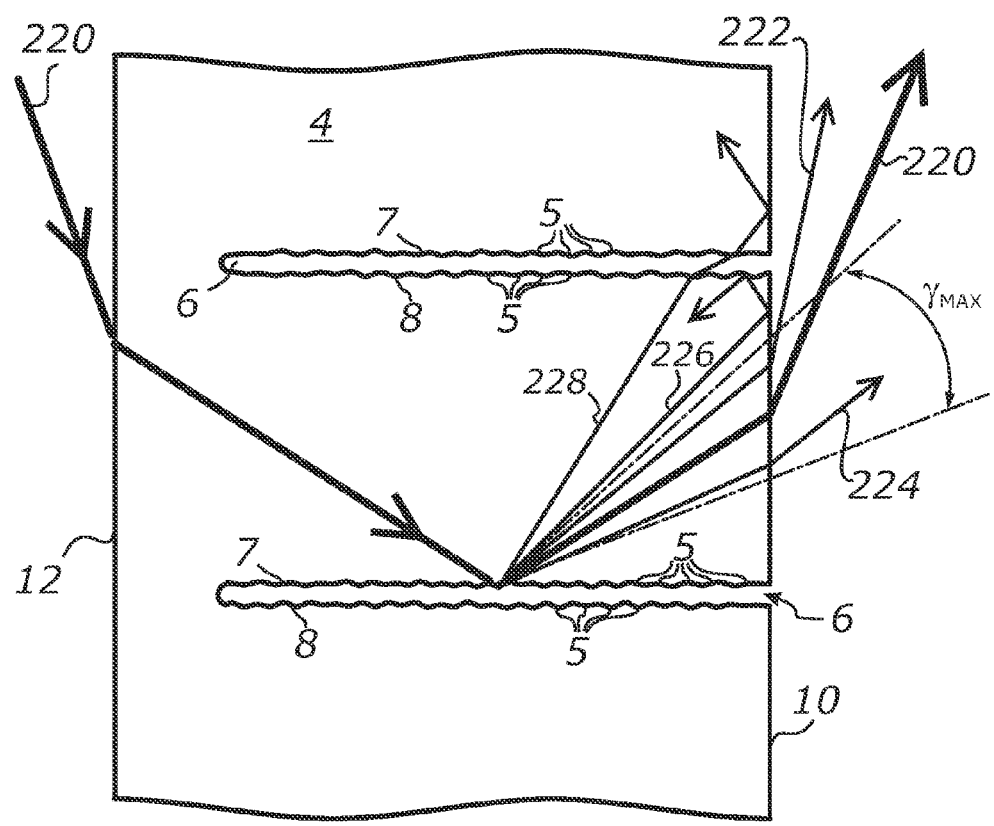
FIG. 8 is a schematic view and raytracing of a portion of a daylighting fabric, showing light rays reflected from a wall of a slit in various reflection regimes, according to at least one embodiment of the present invention.

An example of defining angle $\gamma_{MAX}$ based on the consideration of minimizing the incident light rejection by sheet 4 is schematically illustrated in FIG. 8 which shows a portion of sheet 4 including a pair of adjacent slits 6 formed in surface 10. The surfaces of each of the walls 7 and 8 of slits 6 include surface relief features 5. Such surface relief features 5 may have a random nature and may manifest themselves as non-negligible surface roughness from the optical standpoint. Both surfaces 10 and 12 of FIG. 8 are smooth and generally void of any substantial microrelief except for the voids formed in surface 10 by slits 6.

Referring further to FIG. 8, a ray 220 exemplifies a parallel beam of sunlight entering sheet 4 from a relatively high angular elevation. Ray 220 enters sheet 4 through its light input surface 12 and strikes wall 7 of the bottom slit 6. The incidence angle of ray 220 onto the horizontal surface of the wall 7 is greater than the critical TIR angle which causes a total internal reflection of such ray from the surface. Surface relief features 5 of the respective wall 7 cause a first portion of the energy of ray 220 to reflect in a specular or near-specular regime (as indicated by the continued path of ray 220) and causing a second portion of the ray's energy to reflect in diffuse regime over a broader angular range. Rays 222, 224, 226, and 228 exemplify energy portions of ray 220 which are deflected or scattered from the specular reflection path at various deflection angles.

Ray 222 is deflected by a relatively small angle and exits from the light output surface 10 of sheet 4 slightly above the exit point of ray 220 and at a different emergence angle than ray 222. Despite the difference in the light path from the specular beam, however, ray 222 still enters the building interior and is directed towards the ceiling area, albeit at a steeper angle to the horizontal plane compared to ray 220.

Ray 224, which is also deflected from the prevailing direction of ray 220, emerges from surface 10 at a lower point and at a lower angle with respect to the horizontal plane than the ray 220. Similarly, however, despite being deflected from the "ideal" direction, ray 224 also enters the building interior and is propagated towards a direction favorable for illumination purposes.

Accordingly, although rays 222 and 224 do not exactly follow the specular reflection direction of ray 220, their propagation paths generally conform to the intended operation of daylighting fabric 2. Additionally, such rays contribute to the angular spread of the beam admitted into the building and thus help reduce glare and promote a more uniform daylight distribution.

In contrast, ray 226 deviates from the path of beam 220 more considerably than, for example, ray 222. Ray 226 also strikes surface 10 at an angle greater than the critical angle of TIR at said surface which causes unwanted reflection back towards the light input surface 12. It will be appreciated that, unless ray 226 is eventually redirected back to surface 10 at a below-TIR incidence angle, at least a portion or even all of its energy may be lost due to attenuation in the material of sheet 4 or due to exiting towards the wrong side of the sheet.

Similarly, ray 228 is deflected by an even greater angle from the specular path of ray 220. Ray 228 encounters wall 8 of the adjacent top slit 6 and strikes its surface at an incidence angle which is lower than the TIR angle at said surface. Ray 228 may thus traverse the respective top slit 6 after which it may be reflected from surface 10 in the TIR mode and directed back towards the light input surface 12. Obviously, such ray may also be lost if not redirected back again to the light output surface 10 at an incidence angle that would permit ray passage into the building interior.

Based on the principles discussed in reference to FIG. 8, angle $\gamma_{MAX}$ may be selected to include at least rays 220, 222 and 224 as well as any other rays which have sufficiently low deflection angles from the path of ray 220. The surfaces of each wall 7 may be configured so that their respective surface relief features 5 disperse light within a limited angular cone and that most of the reflected flux is distributed within the selected angular range $\pm\gamma_{MAX}/2$. Accordingly, the relative contribution of non-functional diffuse rays having high scattering angles may be minimized by limiting the amplitude and/or slope angles of surface irregularities of slits 6 to the values which would produce sufficiently narrow angular distribution of the reflected beam. In other words, angle $\gamma_{MAX}$ may be selected to include at least the specular spike and at least a portion of the specular lobe of the reflected light distribution. In such a case, slits 6 having surface relief features 5 and reflecting light in both specular and diffuse TIR regimes may be configured to redirect light in a manner similar to slits 6 configured for TIR in specular regime only. Since the presence of the diffuse component in the beam reflected from the respective wall 7 will introduce certain angular spread to the beam of redirected sunlight emerging from the light output surface 10 of sheet 4, such redirected beam will be significantly softened and not as intense as the incident one. Thus, according to one embodiment, slits 6 may be advantageously configured to provide a controlled spread of the parallel beam and further improve the ability for daylighting fabric 2 to redistribute at least the direct component of sunlight over a broader area.

It may be appreciated that, since the amount of the specular component and the narrowness of angular distribution of the diffuse component strongly depend on the surface roughness of slits 6, selecting the appropriate range of RMS surface roughness parameter $R_q$ is important for daylighting fabric 2 to operate properly.

Referring to Eq. 2 and FIG. 8, the incidence angle $\theta_i$ onto the TIR walls of slits 6 depends mostly on the incidence angle of light onto the light input surface 12 and the refractive index of the material of sheet 4. Unplasticized PVC has the refractive index of about 1.54. The refractive index of phthalate plasticizers typically used to make flexible PVC sheets range between 1.48 and 1.50. Therefore, depending on the content of plasticizers in the flexible PVC, the reflective index of sheet 4 may conventionally be in the approximate range from 1.5 to 1.53.

Assuming the reflective index of plasticized PVC used for making sheet 4 of about 1.52 and considering that walls of slits 6 are generally perpendicular to surface 12, it can be shown that the minimum incidence angle $\theta_i$ of light onto the TIR surfaces of the slits will be about 49°. In other words, the TIR surfaces of slits 6 can be expected to operate only in the incidence angle range from 49° to 90°. Since sheet 4 is further expected to operate only in the visible range of the electromagnetic spectrum corresponding to that of the daylight, the useful range of wavelengths may also be defined. Accordingly, the maximum roughness acceptable for the walls of slits 6 can now be estimated using Eq. 2.

Figure 9:
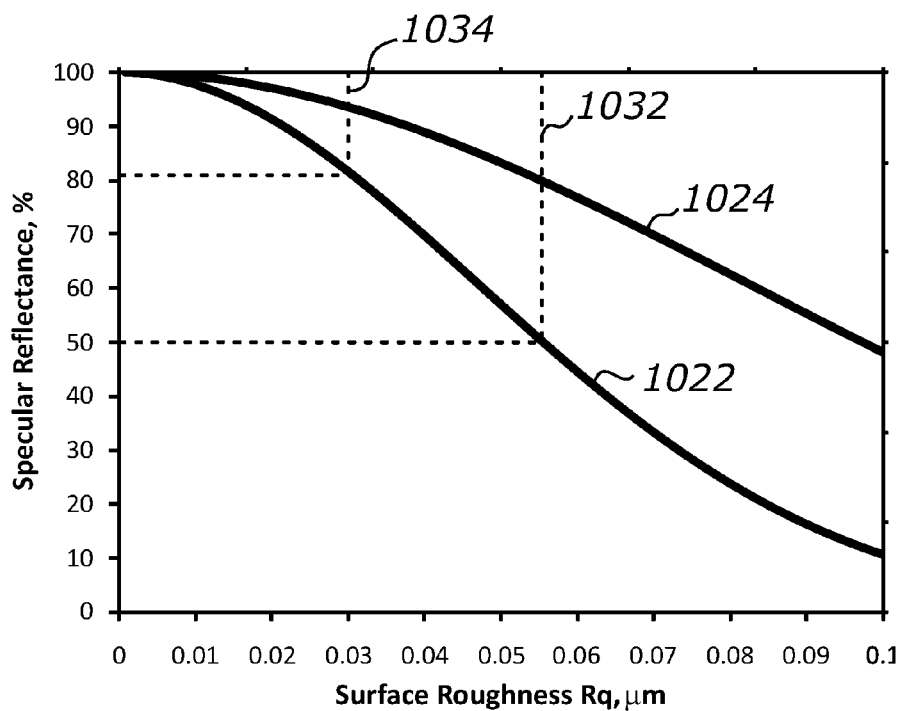
FIG. 9 is a graph showing calculated exemplary dependencies of specular reflectivity from a root-mean-square roughness of a surface.

FIG. 9 shows calculated dependence of the specular TIR reflectivity $P_{Spec}\%$ of Eq. 2 on RMS surface roughness $R_q$ at different incidence angles $\theta_i$ and at 0.55 μM wavelength which is near the maximum daylight sensitivity of the human's eye. A curve 1022 of FIG. 9 corresponds to $\theta_i=49°$ (minimum expected incidence angle) and a curve 1024 corresponds to $\theta_i=68°$. It can be shown that the relative difference of 19° between the incidence angles onto wall 7 representing curves 1022 and 1024 corresponds to a difference in the incidence angles onto surface 12 of approximately 46°. It will be appreciated by those skilled in the art that 46° is the maximum change of sun's elevation angle during the year due to the obliquity of the ecliptic.

As it is indicated by a reference threshold line 1032, a TIR surface which has RMS surface roughness $R_q$ of about 0.055 which is $\frac{1}{10}^{th}$ of the wavelength, reflects only about 50% of light in a specular TIR regime at 49° incidence angle. It can further be seen that at $R_q$ below 0.03 μm (30 nanometers), as indicated by a reference threshold line 1034, more than 80% of light is reflected in the specular regime and less than 20% is hereby scattered or diffused. When $R_q$ approaches 0.02 μm (20 nanometers), the efficiency of specular TIR becomes 90% or more for the entire range of the expected incidence angles onto the surface of slits 6.

It is noted that curve 1022 represents some of the lowest expected incidence angle $\theta_i$ of light rays onto the surface of slits 6 and hence some of the worst possible (from the point of view of light reflection in a specular regime) reflection condition. Such a low incidence angle $\theta_i$ may correspond, for example, to illumination of the light input surface of sheet 4 with a direct sunlight when sheet 4 is disposed vertically and when the sun is near its zenith. At higher incidence angles $\theta_i$ which may correspond, for example, to lower elevation angle of the sun, the relative amount of light reflected in a specular regime increases, as follows from Eq. 2. This can be illustrated by comparing curve 1024 ($\theta_i=68°$ to curve 1022 ($\theta_i=49°$) in FIG. 9.

Referring to curve 1024 of FIG. 9, it can be seen that the 50% threshold of specular reflectivity at 68° incidence angle corresponds to RMS roughness of about 0.1 μm, as follows from Eq. 2, and that the 80% threshold corresponds to about 0.055 μm ($\frac{1}{10}^{th}$ of the wavelength), respectively. Accordingly, it will be appreciated that the walls of slits 6 may be configured to reflect light by means of TIR in a specular regime even if their surfaces are rough by optical standards.

The acceptable roughness may now be defined based on the estimates using Eq. 2 for the expected angular position of sheet 4 with respect to the incident sunlight. For example, when the daylighting fabric 2 employing sheet 4 in going to be used in a vertical orientation at higher latitudes (hence at lower solar elevation angles), the acceptable level of surface roughness may be higher than in the case of operating it at lower latitudes (and higher sun's elevations) since the specular reflectance grows with the growth of the incidence angles $\theta_i$ of light rays onto the surface of slits 6.

It is noted that, when determining the acceptable levels of surface roughness, the angular distribution of the diffuse component of the reflected light may also be taken into account. Particularly, even though the actual rms surface roughness of sits 6 may exceed a certain threshold based on estimates obtained from Eq. 2, at least a portion of the diffuse light may be distributed within a relatively narrow angular cone with respect to the direction of a specular reflection. Such portion of diffuse component may still be further directed by sheet 4 into the building interior in generally the same manner as the direct component. Moreover configuring the TIR surfaces of slits 6 to produce such narrowly-distributed diffuse light component may be preferred in at least some embodiments in order to homogenize the incident daylight and reduce glare (see, e.g., discussion in reference to FIG. 8).

Accordingly, in one embodiment, it may be preferred that the RMS surface roughness $R_q$ of at least a substantial portion of the surface of slits 6 is in the range between 0.01 μm (10 nm) and 0.1 μm (100 nm). In one embodiment, it may be preferred that $R_q$ is generally less than 0.05 μm and even more preferred that $R_q$ is less than 0.03 μm.

When measuring the surface roughness parameter $R_q$, it is preferred that the sampling length is substantially greater than the wavelengths of the daylight. Particularly, it is preferred that the sampling length is at least 10 μm. On the other hand, it will be appreciated that macroscopic irregularities of the surface may have a certain impact on the measured roughness but may not necessarily influence the surface reflectance in a specular regime. In this view, selecting too long sampling lengths, in comparison to the size of the characteristic microstructures causing diffuse reflection, may potentially result in overestimating $R_q$ for the purpose of calculating the specular reflectance due to the increased role of such macro irregularities. Accordingly, especially when macro-irregularities are present on the surface of the walls of slits 6, it may be preferred that surface roughness parameter $R_q$ is measured over a sampling length which minimizes the impact of such non-indicative macro-relief and yet provides statistically meaningful results. Particularly, it may be preferred that the sampling lengths for estimating the characteristic $R_q$ of the surface of slits 6 are selected to be within the range of 20 μm to 100 μm.

Figure 10:
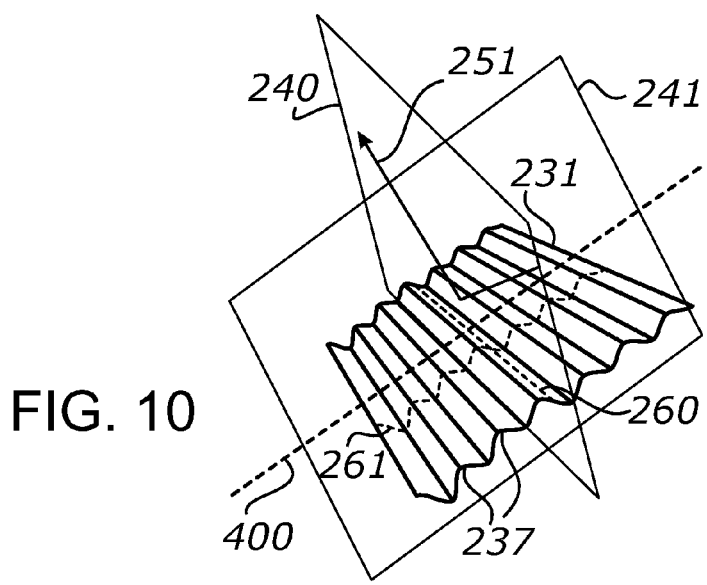
FIG. 10 is a schematic perspective view of a surface portion illustrating different amplitude of surface roughness in orthogonal planes and also showing a ray reflection in a specular regime.
Figure 11:
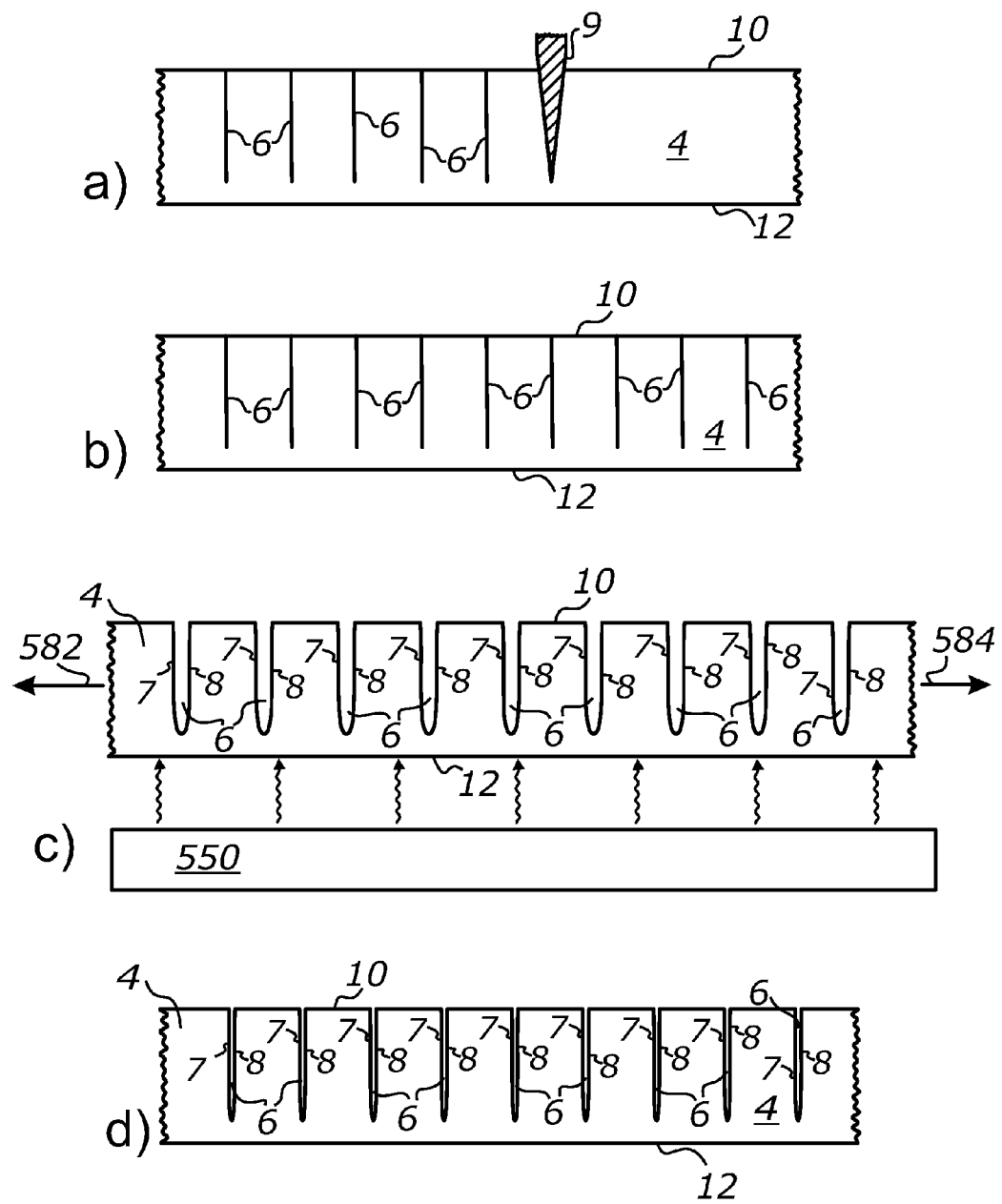
FIG. 11 is a schematic view illustrating a method of making a daylighting fabric, showing steps of slitting a sheet of flexible material using a blade or razor and slit walls separation, according to at least one embodiment of the present invention.

It is noted that the above criteria of surface roughness generally apply to the measure of the surface micro-irregularities in the plane of reflection. It will be appreciated that the roughness measured in an orthogonal plane may have less impact on the angular distribution of the reflected light in the plane of reflection, particularly for the case when the surface irregularities are greater than the wavelength of the incident light. This is illustrated in FIG. 10 which depicts an TIR surface 231 and a reflection of a ray 251 from such surface. Surface 231 may exemplify a portion of the surface of one of the walls of an individual linear slit 6 and ray 251 may exemplify a light ray reflecting from such wall in a reflection plane 240 which is perpendicular to the longitudinal axis 400 of such linear slit 6. A line 260 indicates the intersection line of reflection plane 240 with surface 231. A plane 241 which is perpendicular to surface 231 and parallel to the longitudinal axis 400 of the respective slit 6 crosses surface 231 at line 261.

Referring further to FIG. 10, the roughness of surface 231 in the plane of reflection 240 may be sufficiently low to enable TIR in a specular regime. At the same time, the roughness of surface 231 in the orthogonal plane 241 may be much greater, as illustrated by a plurality of parallel undulations 237 which affect the profile of line 261 but have no impact on the profile of line 260. In other words, the two-dimensional profile along line 261 is much more irregular than the 2D profile along line 260, which can be reflected in a significant difference in $R_q$ when measured along the respective lines.

Undulations 237 may exemplify surface irregularities formed by a slitting blade or razor used to produce slits 6 in the material of sheet 4. While the amplitude of such irregularities may be such that the RMS roughness measured along line 261 exceeds the maximum preferred roughness values, it should be understood that the roughness measured along line 260 is more relevant for determining the surface quality for the intended operation of the respective slit 6. Accordingly, in one embodiment, it may be preferred that the surface profile roughness $R_q$ does not exceed the prescribed values along a line which is either perpendicular to the longitudinal axis 400 of the respective slit 6 or is disposed at a relatively high angle with respect to such axis.

It will be appreciated that the minimum requirements for the surface smoothness of slits 6, albeit significantly more relaxed compared to conventional optics, put fairly strict requirements on the hardware and the process used to produce such slits. Limiting the RMS surface roughness to only a few tens of nanometers requires a relatively high quality of the slitting blades or razors that may be used to produce such slits. Particularly, the cutting edge of the slitting blade should preferably be extremely sharp, finely polished or honed and essentially burr-free. The blade or at least its cutting edge area should also preferably be made from a stiff and hard material such as hardened carbon steel, tungsten carbide, diamond, certain ceramics, and the like. Hard coatings such as amorphous diamond, diamond-like carbon-(DLC) material, nitrides, carbides, oxides or ceramics may also be used to improve the hardness and strength of the blade's edge. In some implementations, the cutting edge of the slitting blade may also be provided with an outer layer of low-friction material, such as Polytetrafluoroethylene (PTFE), in order to reduce the cutting friction of the blade with the material of sheet 4. If the tip of the slitting blade is rounded (in a transversal cross-section), the radius of the curvature of the tip in said cross-section should preferably be on a sub-micron scale. It may be further preferred that such radius of curvature is less than 50 nanometers.

FIG. 11(a) through FIG. 11(d) schematically illustrate an embodiment of a method of making daylighting fabric 2, more particularly illustrating steps of forming the parallel array of slits 6 in sheet 4 and separating the opposite walls of the slits from each other.

Referring to FIG. 11(a), which depicts a step of such method, slits 6 are initially formed in surface 10 of sheet 4 using a relatively thin and sharp blade 9. Blade 9 penetrates relatively deep into the soft PVC-P material of sheet 4 and makes the cut by wedging the material out to the sides on its way. The elasticity and easy deformability of the soft PVC material permit for a relatively easy cut formation. The material deforms elastically and relatively easily yields under the cutting pressure, leaving a clean cut without chipping, crazing or irregular tearing.

As discussed above, blade 9 should preferably be extremely sharp (with a sub-micron curvature radius of the tip), burr-free and made from a hard material. The walls of blade 9 at least near the cutting edge should also be highly polished to a very low level of surface roughness. In one embodiment, the RMS surface roughness of blade 9 near the cutting edge should preferably be below 100 nanometers and, even more preferably, below 50 nanometers.

Since such slitting does not generally result in material removal from the slit areas and since plasticized PVC generally has a high degree of recovery, the opposing walls of the newly formed slits 6 may tend to close upon each other after blade 9 is removed. Closing slits 6 may result in the opposing walls of such slits coming into an intimate optical contact with each other thus frustrating the total internal reflection which is required for light redirecting operation of daylighting fabric 2. In other words, even though the structure of sheet 4 may be significantly altered in the areas where slits 6 are formed (left of FIG. 11(a)), such sheet may still generally lack the sufficient light redirecting properties and optically behave somewhat similar to the uncut portion of the sheet (right of FIG. 11(a)).

Referring to FIG. 11(b), which shows the portion of sheet 4 of FIG. 11(a) after the slitting process is complete, slits 6 remain closed with the opposing walls of each slit 6 disposed in an intimate contact with each other. The opposing walls of each slit need to be separated in order to provide the basic light-directing functionality of daylighting fabric 2. The main purpose of such separation is forming narrow, self-supporting voids which can be naturally filled with the ambient air thus enabling TIR interfaces for light redirection. Additionally, the permanent separation of slits 6 soon after slitting is done may generally prevent forming an unwanted bond between the slit walls during a prolonged storage. This may be particularly important for the flexible PVC materials which are known for a slow release of plasticizers from the surface (the so-called leaching). Such leaching may cause migration of plasticizers into slits 6 and further strengthening the bond and optical contact between their walls which may potentially complicate the subsequent wall separation and forming quality TIR surfaces.

Referring to FIG. 11(c), the wall separation of slits 6 may employ a step of stretching sheet 4 along a direction which is perpendicular to the longitudinal axis of the slits, according to an embodiment of the method of making daylighting fabric 2. This step may involve applying a load to sheet 4 along directions 582 and 584 which causes stretch elongation of the sheet along such directions.

It will be appreciated that, since the effective thickness of sheet 4 in the areas below slits 6 is substantially less than in the spacing areas, the elongation of sheet 4 will be highly disproportional along the stretch direction. The portions of sheet 4 having smaller thickness will generally experience greater stress levels and greater elongation than the thicker portions of the sheet. Accordingly, the elongation of sheet 4 will occur primarily due to the stretch deformation of the material in the areas of slits 6 and particularly in the areas below the tips of each slit 6. As a result, the distance between walls 7 and 8 of each slit 6 will increase in accordance with such elongation thus allowing the ambient air to fill the respective void.

In order to make the separation of walls 7 and 8 permanent, sheet 4 may be annealed at an elevated temperature. Such thermal annealing may at least partially relieve the stresses related to stretch elongation and can may therefore make at least a portion of the elongation irreversible. Such step is further illustrated in FIG. 11(c) which also shows a heat source 550 positioned underneath sheet 4 in proximity of surface 12. Heat source 550 is configured to heat at least the bottom portion of sheet 4 where the low-thickness regions below the tips of slits 6 are located. The elevated temperature usually causes a reduction in the thermoplastic material's elasticity and its ability to recover from the stretch deformation. The temperature of the material of sheet 4 and the duration of exposure of sheet 4 to heat source 550 should be sufficient to reduce the internal stresses in such regions to a point where at least a part of the stretch deformation becomes irreversible. It is noted that the combined effect of elevated temperature and stretch deformation of sheet 4 in this step may also cause some plastic deformation of the material of sheet 4 in the areas of slits 6 which. Depending on the temperature of the respective portions of sheet 4, the amount of applied load as well as the length of processing time, the flow of the material of sheet 4 in the plastic deformation regime under such load may contribute to or even be the main factor in the irreversible separation of walls 7 and 8 from each other.

FIG. 11(d) schematically depicts the final step of making daylighting fabric 2 in which the tension load and heat source are removed and sheet 4 generally returns to its original shape while leaving deep and narrow channels or voids in surface 10 corresponding to slits 6. The permanent elongation of the material of sheet 4 in the areas just below each slit 6 prevents walls 7 and 8 of each slit from contacting each other and thus preventing the slits to close. Since the voids in the material of sheet 4 become self-supporting, a minimum distance and a minimum air gap between walls 7 and 8 required for TIR operation may now be maintained without an external load.

Considering that the processing step of FIG. 11(c) causes at least some irreversible elongation of the material of sheet 4 in the areas of slits 6, the residual length of sheet 4 after the load is removed in the step of FIG. 11(d) may become slightly greater than the original length of the sheet. However, since slits 6 occupy only a small fraction of the surface of sheet 4 and since the sheet material in the wide spacing areas between slits 6 may remain generally intact, the relative irreversible elongation of the entire sheet 4 can be approximately equal to the sum of the final widths of all slits 6. In one embodiment, it may be preferred that the relative irreversible elongation of sheet 4 does not exceed 10% of the original sheet length. In one embodiment, it may be preferred that such elongation is less than 5% of the original length. It is also important that stretching of sheet 4 in the plastic deformation mode should be controlled in order to prevent overextending the sheet, avoid material tearing as well as prevent the formation of too wide or distorted slits 6.

Figure 12:
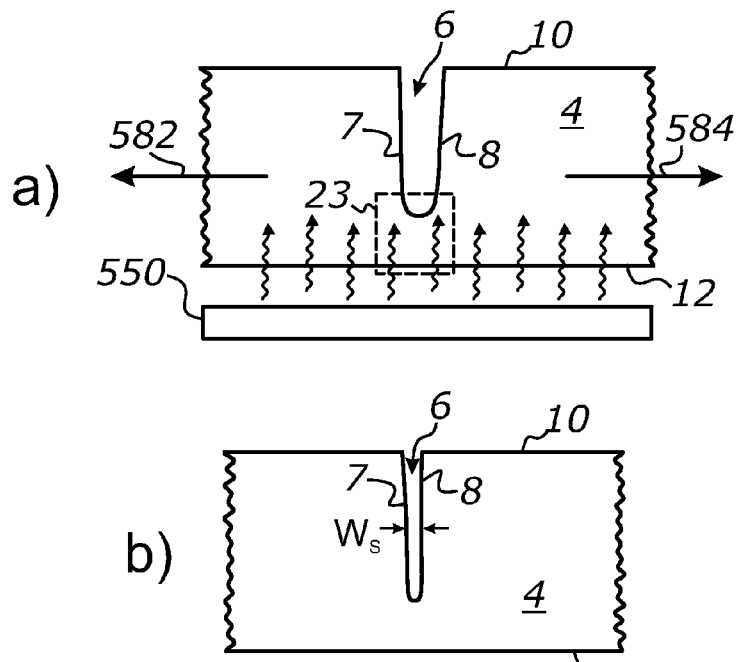
FIG. 12 is a schematic view showing further details of individual steps of a method of making a daylighting fabric, according to at least one embodiment of the present invention.

FIG. 12 depicts the above-discussed process of slit wall separation in a further detail by showing an example of irreversible widening of an individual slit 6 by forming an individual self-supporting void in sheet 4 in the area of such slit. A portion of sheet 4 of FIG. 12a including a single slit 6 is initially stretched along directions 582 and 584 which are perpendicular to the prevailing plane of slit 6. Since flexible PVC is inherently elastic, sheet 4 may be stretched primarily in the elastic mode by applying a suitable load. It will be appreciated that the elastic elongation of sheet 4 will be generally proportional to the applied load.

The term "elastic elongation" in relation to a stretch-tensioned sheet material is directed to mean a temporary elongation of the sheet as a result of pull stress in a particular direction. Once the stress is removed, the sheet may return to its original shape and length along such direction. The elastic elongation is also directed to mean that the applied stress is less than the elastic limit of the sheet material.

An area 23 immediately underneath slit 6 is characterized by a significantly reduced thickness of sheet 4 compared to the areas of the sheet between the slits. The reduced thickness translates into a reduced area of a cross-section of the material in a plane perpendicular to the force direction. Therefore, at a given stretch load, the stress applied to the material of sheet 4 in area 23 and the elongation of the sheet material in such area will be much greater than in the surrounding areas. At a certain combination of heat applied to area 23 by heat source 550 and the tension force applied to sheet 4 along directions 582 and 584, the material in area 23 may begin to flow in the plastic deformation mode along such directions, thus causing irreversible widening of slit 6.

Figure 13:
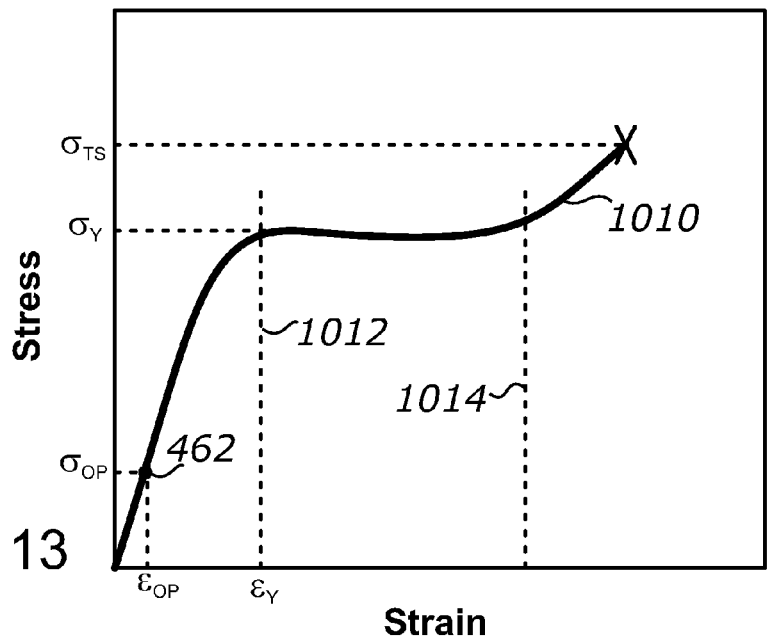
FIG. 13 is a schematic graph illustrating a stress-strain curve of a plastic material.

FIG. 13 depicts a generalized schematic stress-strain curve 1010 of a thermoplastic material which can also be applied to describing the behavior of sheet 4 under stretch loads. The strain due to elongation is usually expressed in terms of L/l, where L is the original length of the material and l is the elongation length. The stress $\sigma$ is usually measured in terms of F/A, where F is the applied forth and A is the area of a cross-section of the material in a plane perpendicular to the force direction. $\sigma_Y$ indicates a yield strength of the material and $\sigma_{TS}$ indicates its tensile strength at which point the material may break. Various formulations of plasticized PVC allow for 40% to 300% elongation until the material can break.

The stress-strain curve of thermoplastic materials including flexible PVC typically features a plastic region, represented by a portion of curve 1010 between threshold lines 1012 and 1014, where the material draws and extends in a plastic deformation mode. "Plastic deformation" is the deformation that remains after a load is removed from the material. In contrast to the elastic deformation, plastic deformation is permanent and generally non-recoverable.

Accordingly, referring back to FIG. 12(a), heating the bottom portion of sheet 4 in the presence of stretch load along directions 582 and 584 may cause plastic deformation in area 23 thus making the material elongation in such area at least partially irreversible. This may be achieved by applying a pull force sufficient to cause the material strain and stress above the respective $\epsilon_Y$ and $\sigma_Y$ for the effective thickness of sheet 4 material in area 23.

At the same time, it is preferred that the pull force is substantially less than the force needed to exceed the yield stress $\sigma_Y$ of the respective plasticized PVC material at a nominal sheet thickness in order to avoid irreversible deformation in the spacing areas between slits 6. In other words, the elongation of sheet 4 in space areas between slits 6 should remain substantially elastic. A point 462 on curve 1010 of FIG. 13 schematically indicates an operational point which corresponds to operational values of strain $\epsilon_{OP}$ and stress $\sigma_{OP}$ of the uncut portions of sheet 4 so that $\sigma_{OP} \ll \sigma_Y$ and $\epsilon_{OP} \ll \epsilon_Y$. Since most elastic materials have a characteristic linear elastic region on the stress-strain curve where stress is roughly proportional to the strain (Hooke's Law), point 462 may be advantageously selected to be within such region.

It is noted that the appreciable viscous flow of material in areas 23 is not necessarily required to permanently separate walls 7 and 8 of slits 6. As discussed above in reference to FIG. 11(c), the elevated temperature in areas 23 may simply provide stress relaxation (annealing) for the existing elastic deformation and still result in irreversible changes of the material in such areas. The stress relaxation is directed to mean the progressive loss of stress (load) over time under constant strain (deformation), usually at elevated temperatures.

In other words, the elevated temperature may be used to convert the elastic elongation of the material in areas 23 into a plastic elongation without exceeding the respective $\epsilon_Y$ and $\sigma_Y$ values in such areas. Accordingly, in one embodiment, sheet 4 may be stretched in the elastic mode under a constant load and then heated to a predetermined temperature and annealed for a period of time to complete the slit widening process. In one embodiment, the annealing temperatures may be in the range between 60° C. and 150° C.

In a different implementation of the method of making the daylighting fabric 2, the step of permanent separation of the walls of slits 6 may employ additional stretching of sheet 4 along directions 582 and 564. Particularly, instead of using heat source 550 to lower the yield strength $\sigma_Y$ of the material of sheet 4 at a given strain, sheet 4 may be further stretched beyond its yield strength $\sigma_Y$ in areas 23 at a constant temperature. The stretch load applied to sheet 4 should still be less than the breaking point $\sigma_{TS}$ (see FIG. 13) of the material in areas 23, however. Obviously, this may also result in plastic deformation in the "thin" areas 23 while the rest of the area of sheet 4 may remain unaffected due to the much greater thickness of the material between the slits.

In one embodiment, the viscoelastic behavior of plasticized PVC at large deformations may also be exploited. For instance, it was found that flexible PVC sheets may undergo a permanent deformation without appreciable material flow when strained past 100% or so. Accordingly, stretching the material of sheet 4 in areas 23 beyond such threshold may also be used for enabling plastic deformation in said areas and permanent widening of slits 6.

The amount of the desired widening of slits 6 depends on the required distance between walls 7 and 8 of the slits and may be controlled by the tension force, the amount of heat applied to sheet 4 and the duration of stretching in the plastic deformation or annealing mode. Since each area 23 may only need to be heated for a brief period of time at a constant tension, a series of areas 23 may be heated and/or annealed in a continuous process as the respective portions of sheet 4 are moved across the heat source 550. Such operation maybe performed during the slitting process or as a separate step following the slit formation.

The temperature regime and the tension of sheet 4 may be so selected that the planar shapes of surfaces 10 and 12 remain mostly unaltered and the material deformation is localized in relatively compact areas 23. It will be appreciated that when the elongation of sheet 4 in areas 23 is sufficiently small, only small portions of walls 7 and 8 near the tip of the respective slit 6 will experience distortions by the plastic deformation while the rest of their surfaces may substantially retain the planar shape and perpendicular orientation with respect to the surfaces 10 and 12 of sheet 4.

Referring to FIG. 12(*b*), the removal of stretch load from sheet 4 may result in some recovery of the material in area 23 and partial recovery of the shape of slit 6 due to the material elasticity. However, since at least some of the stretch elongation in area 23 was made irreversible in the step of FIG. 12(*a*), walls 7 and 8 remain separated from each other by at least a small distance thus providing TIR interfaced for light redirecting operation and allowing for a thin layer of ambient air to form between such walls.

A width $W_S$ of an individual slit 6 may be defined as the distance between walls 7 and 8 measured at a particular depth of the slit in a transversal cross-section (see FIG. 12(*b*)). It is generally preferred that $W_S$ is made fairly small along the entire active area of the slit 6 so that walls 7 and 8 can be nearly perpendicular to surfaces 10 and 12 and also parallel to each other. It may also be preferred that $W_S$ does not exceed a certain maximum value $W_{S\_MAX}$. In one embodiment, $W_{S\_MAX}$ may be selected to be less than 10% of the thickness of sheet 4. According to one embodiment, it is also preferred that the average value of width $W_S$ is substantially less than the thickness of the blade used to produce the respective slit 6. In a non-limiting example, the slitting blade may be 0.3 mm thick and the width $W_S$ of slits 6 of the finished daylighting fabric may be in the range between 0.01 to 0.1 mm.

It is noted that the amount of relative stretching of sheet 4 in the elastic mode may have a very minimum impact on the width $W_S$ of slits 6, if any, due to the high recovery of at least some formulations of plasticized PVC. Therefore, slit width $W_S$ will be defined by the manner in which the step of permanent slit separation is performed.

The minimum practical value of width $W_S$ of slits 6 depends on several factors. One such factor is the requirement of maintaining the TIR interfaces between the material of sheet 4 and air at walls 7 and 8 of slits 6 and preventing the contact of the walls with each other. Additionally, it may be preferred that a minimum air gap between the walls 7 and 8 is maintained to prevent the frustrated total internal reflection which may result from the penetration of an evanescent wave from the material of sheet 4 into air. It will be appreciated by those skilled in the art of optics that TIR may be frustrated due to the passage of the evanescent wave through an extremely thin air gap even if the adjacent TIR surfaces are not physically contacting each other. The penetration depth of the evanescent wave depends on the wavelength and the angle of incidence and is usually of the order of the wavelength.

An additional factor which may influence the selection of the desired minimum width of slits 6 is the possible unevenness and/or non-parallelism of walls 7 and 8. For example, if either one or both walls exhibit macroscopic surface irregularities, the minimum width should accommodate the height of such surface irregularities.

Yet additional factors requiring consideration for determining the minimum desired width of slits 6 may include the environment associated with the subsequent use of the formed sheet 4. For example, the thermal expansion or contraction of the material of sheet 4 or flexing the sheet as a whole may potentially cause distortions which can bring walls 7 and 8 in contact with each other during normal use if the width of slits 6 is inadequate.

Accordingly, in one embodiment, it may be preferred that the minimum width of each slit 6 is at least 5 μm to 10 μm. However, it should be understood that this estimate is not prescriptive and should not be construed as limiting this invention in any way. The actual width $W_S$ may also be influenced by a number of other factors, particularly those related to the manufacturing process, tolerances, material properties of sheet 4, etc., and may generally exceed such minimum width. As a practical consideration, according to one embodiment, the minimum width of the active portion of each slits 6 may be preferred to be generally greater than 10 μm.

Figure 14:
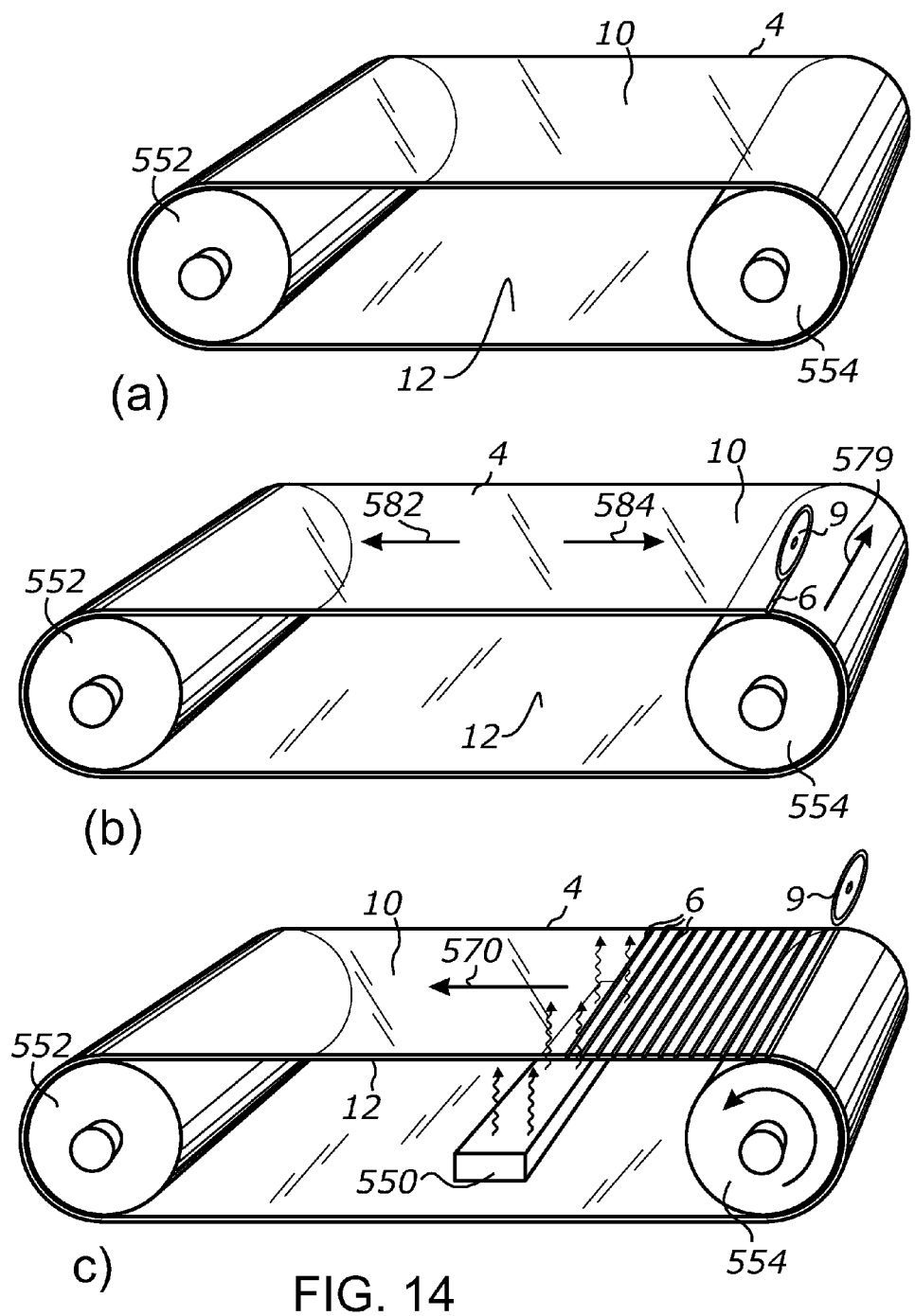
FIG. 14 is a schematic perspective view of an exemplary apparatus for making a daylighting fabric, showing various steps of processing a flexible sheet material, according to at least one embodiment of the present invention.

FIG. 14 illustrates an exemplary implementation of a method of making daylighting fabric 2. It also shows an embodiment of an apparatus for slitting sheet 4 and separating the opposing walls of the respective slits 6.

Referring to FIG. 14(*a*), elongated rectangular sheet 4 of optically clear, flexible PVC is formed into a closed loop by connecting and seaming its two opposing edges together. The edges may be connected together by any suitable means, including but not limited to a tear-resistant adhesive tape, thermal welding, vinyl cement or other type adhesive. The loop of sheet 4 is stretched between two opposing parallel rollers 552 and 554.

A next step illustrated in FIG. 14(*b*) includes elastic stretch tensioning of sheet 4 along a direction perpendicular to the intended slitting direction in order to build sufficient internal stress in such direction. Due to the elasticity of the PVC-P material, sheet 4 may normally undergo elastic elongation along the direction of the applied stress. The amount of stretch load which should be applied to sheet 4 depends on many factors which may include enabling the additional elongation of sheet 4 in areas 23 of slits 6 to be formed, preventing the slippage of the sheet material in place during the cut operation, removing excess sag of sheet 4, reducing the friction between a cutting blade and the sheet, reducing the required slitting pressure that should be applied to the blade, improving wall separation of slits 6 and other considerations.

Various methods may be used for such tensioning. One method may include elongation of sheet 4 by moving rollers 552 and 554 further apart from each other, as indicated by directions 582 and 584. For instance, roller 554 may be fixed in a stationary position and the tension can be provided by moving roller 552 away from roller 554. It will be appreciated that, when at least some initial tension is applied, the total elongation of sheet 4 will be generally proportional to the increase in the distance between the rollers and the stress on sheet 4 will be defined by the pull force applied to roller 552.

Other methods of elastic stretch tensioning of sheet 4 may include employing an additional tensioning roller or a section of a web in which different tension can be created in said section compared to the rest of the web. It may be preferred that the method used for tensioning sheet 4 provides means for keeping the tension approximately constant regardless of the additional elongation of sheet 4 during the subsequent processing.

Referring further to FIG. 14(*b*), blade 9 of a rotary type is provided to make parallel cuts in the material of sheet 4. Such rotary blade 9 is positioned above roller 554 with its plane parallel to the axis of the roller and is made movable across the entire width of sheet 4. A linear sliding rail system with a stepped drive (not shown) may be provided to effectuate the reciprocal motion of blade 9 across sheet 4. The cutting process starts by moving blade 9 parallel to the roller 554 across the material of sheet 4, as indicated by a direction 579. The movement of blade 9 along direction 579 continues until a full-length individual linear slit 6 is formed in sheet 4.

The penetration depth of blade 9 into sheet 4 is primarily defined by the desired depth of the slits 6 to be formed in the sheet. According to one embodiment, the slitting depth should be more than 50% and less than 95% of the thickness of the sheet material. Among different factors that may determine the desired cut depth can be the consideration of the residual stiffness and tear resistance of sheet 4. By way of example and not limitation and considering that the self-supporting large-area sheets of vinyl films in the thickness range of 2 to 10 mil (1 mil is 0.001 of an inch) are quite common, the depth of the cut may be up to 75-90% of the thickness of the sheet material if sheet 4 is at least 0.5 mm thick, so that at least 0.05 mm to 0.25 mm of the material remains available for holding the sheet together.

Roller 554 may be optionally provided with a heating element so that the heat can be transferred to the slitting area of sheet 4 in order to additionally soften the material in the respective area and aid the slitting process. A liquid lubricating agent may be optionally sprayed onto sheet or otherwise applied to surface 10 of sheet 4 or to the cutting edge of blade 9 in order to reduce the friction between the blade and the sheet material and to further promote the slitting process. The stretch tension applied along directions 582 and 584 may help pull the material apart in the area of the cut thus reducing the friction with blade 9 and further assisting the slitting process.

Referring to FIG. 14(*c*), roller 554 may be provided with a stepped drive (not shown) which rotates the roller by a small predetermined angle after each slit 6 is formed so that the top surface of sheet 4 makes periodic feed movements along a direction 570. The drive of roller 554 can be synchronized with the linear drive that moves blade 9 so that the reciprocal slitting operation of the blade is alternating with the short feed increments of sheet 4. Accordingly, referring further to FIG. 14(*c*), such process can form an array of parallel slits 6 in the surface of sheet 4 at specific intervals. The process may continue until all of the available surface 10 of sheet 4 is processed.

The distance between slits 6 can be controlled by the feed increments provided by the respective drive of roller 554. In one embodiment, such feed increments can be made constant thus forming an array of slits 6 having a constant pitch. In one embodiment, the drive or roller 554 may be configured to provide variable feed increments thus varying the spacing between slits 6.

Referring yet further to FIG. 14(*c*), heat source 550 is positioned in the space between rollers 552 and 554 and configured to heat a portion of sheet 4 in which slits 6 are already formed. Heat source 550 may include any suitable heating elements or heat sources that can be used for heating a specific portion of sheet 4 by means of radiant heat transfer, thermal conduction or convection. It may also include an air blower unit to deliver such heat to the sheet surface. Alternatively, heat source 550 may include a heat transfer roller which can be pressed against sheet 4 and heat a narrow portion of the sheet to the required temperature.

In one embodiment, heat source 550 may be particularly configured to heat the material of sheet 4 to a temperature at which the elasticity limit at a given strain in the thinned areas of sheet (such as areas 23 of FIG. 12(*a*)) is exceeded in order to cause the material of sheet 4 to yield in a plastic deformation mode in such areas. As explained in reference to FIG. 11(*c*) and FIG. 12(*a*), due to the lower thickness of the material in the areas of slits 6 compared to the spacing areas, the plastic deformation of sheet 4 will primarily occur in the immediate vicinity of the tips of the slits, thus permanently widening the voids formed by the slits. When the stretch load is removed, slits 6 will thus retain at least a part of their deformation of the stretched state. In other words, the uneven thickness of sheet 4 due to the presence of slits 6 creates uneven stress and plastic elongation of the sheet in the thinnest areas. The plastic elongation in the areas of slits 6 is considerably greater than that in the uncut areas of the sheet which makes it possible to widen the slits by a predetermined amount without the undue distortion of the main bulk of the sheet material and without appreciable distortion of its surfaces.

In one embodiment, heat source 550 may be configured to provide temperature sufficient for at least partial stress relaxation in areas 23 of sheet 4 and making at least a part of the elastic elongation in such areas permanent without an appreciable material flow. In one embodiment, heat source 550 and the feed rate of sheet 4 may be configured to provide the temperature and heating time for the respective portions of sheet 4 so as to cause both plastic deformation and thermal annealing of sheet 4 in the respective areas 23.

Accordingly, upon the completion of the process of forming slits 6 and heating the areas of such slits under a constant tension, an array of self-supporting voids in surface 10 of the sheet may be formed. Each of such voids formed by the respective slit 6 may thus be naturally filled with the ambient air and provide a pair of TIR interfaces suitable for light redirecting operation of sheet 4. The connected ends of the loop of sheet 4 may now be separated so that the sheet can take a generally planar form or can be wound into a roll for storage.

Example 1

A rectangular sheet of 40-gauge (around 1 mm-thick) clear flexible vinyl (PVC) was formed into a loop and elastically stretched between two spaced apart, parallel rollers at a constant tension. A straight-edge rotary blade made from tungsten tool steel and manufactured by OLFA was used to produce an array of parallel slits in the flexible PVC sheet. The blade had the diameter of 28 mm and the thickness of around 0.3 mm (OLFA product number RB28). The blade was positioned perpendicular to the stretch direction on a linear guiding rail system and the slitting action was performed by a reciprocal movement of the blade through the entire width of the vinyl sheet using a linear actuator. The feed of the flexible vinyl sheet was performed by rotating the feed roller in small angular increments using a stepped drive coupled to the roller's axis. The depth of blade penetration into the sheet material was 0.75 mm which produced linear slits with nearly vertical walls and the depth of around 0.75 mm. The pitch or the slits was made constant with spacing between adjacent slits being around 0.5 mm.

The subsequent stretching and annealing the vinyl sheet in plastic deformation mode at an elevated temperature has permanently opened the slits by forming narrow, air-filled gaps between the walls of each slit. The slits remained open after the stretch load and the source of heat removed were removed.

The processed sheet was suspended in a window opening inside a room of a south-facing building façade and exposed to a beam of direct sunlight. The sheet has produced an extended bright spot on the ceiling of the room while casting a well defined shadow on the floor.

The processed sheet was then separated along linear slits in several areas selected for sampling which exposed the TIR surfaces of respective slits. The surface roughness of the slit walls was measured using Zeta 200 optical microscope/surface profiler from Nanoscience Instruments. The RMS surface roughness $R_q$ parameter was measured along a profile direction which is perpendicular to the longitudinal axis of the respective slit. The measurements were made at 50 μm and 100 μm sampling lengths at different locations of the slit surface. The RMS roughness parameter $R_q$ was found to be varying generally between 0.011 μm (11 nm) and 0.030 μm (30 nm) from sample to sample.

Example 2

A rectangular sheet of 40-gauge clear flexible vinyl was prepared and processed in much the same manner as in Example 1 except that another cutting blade was used. The new blade was a 28-mm rotary tungsten steel/carbon steel blade manufactured by Kai Industries (part #C-280BL). Such blades yielded the RMS surface profile roughness parameter $R_q$ in the range between 0.012 μm (12 nm) and 0.025 μm (25 nm), corresponding to the calculated specular TIR reflectivity of the slit surfaces of at least 85% for the entire targeted range of incidence angles $\theta_i$ (from 49° to 90°). When exposed to direct sunlight, the processed sheet has produced a similar bright spot on the ceiling by redirecting the respective beam form the original propagation direction.

Figure 15:
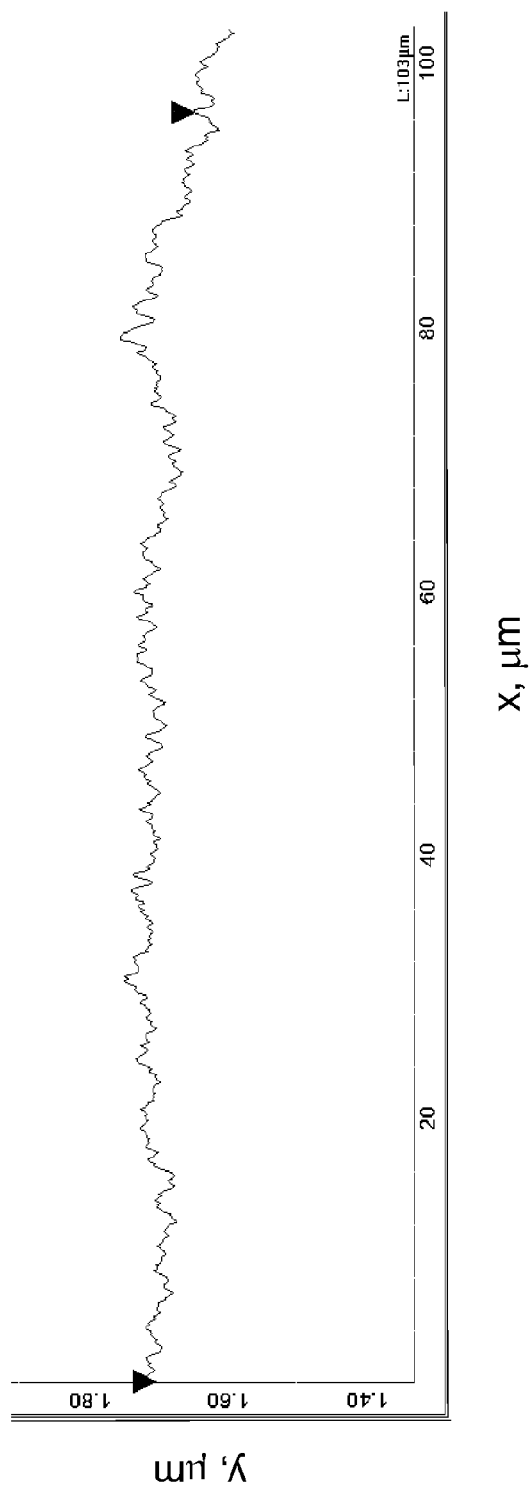
FIG. 15 is an exemplary measured surface roughness profile of a slit formed in a flexible PVC sheet.

FIG. 15 depicts an exemplary surface profile measured for a wall of one of the slits made in Example 2 above. The X coordinate shows a local linear coordinate on the surface of the slit wall measured along the perpendicular to the longitudinal axis of the respective slit. The Y coordinate shows the vertical step-heights of the profile as measured by the profiling instrument. As it may be seen, the surface of the slit wall exhibited some measurable surface roughness in the form of random relief characterized by alternating peaks and valleys of various heights. However, as indicated by the measured RMS roughness parameter $R_q$, the scale of such roughness being in low tenths of nanometers generally favored the specular TIR from the surface at least at the targeted incidence angles.

Figure 16:
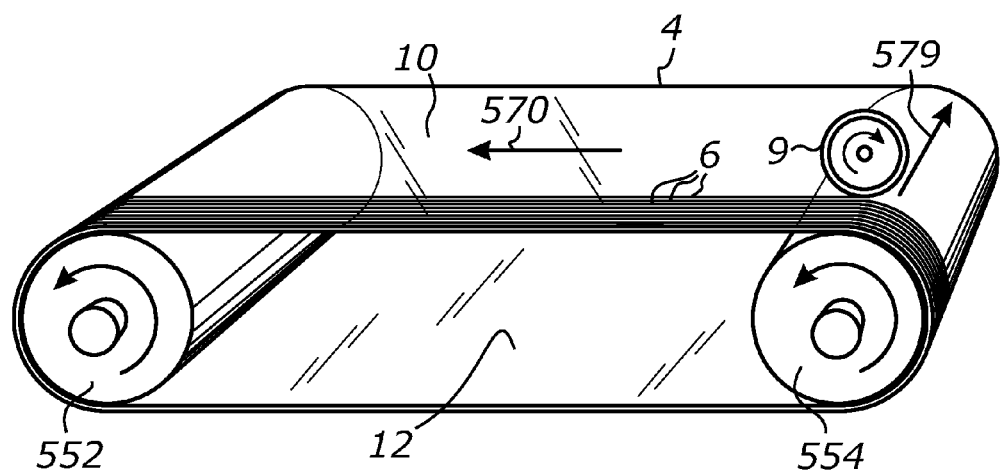
FIG. 16 is a schematic perspective view illustrating a variation of an apparatus and method of making a daylighting fabric, showing a continuous slitting of a flexible sheet, according to at least one embodiment of the present invention.

FIG. 16 schematically illustrates a variation in the apparatus and method of making daylighting fabric 2. In FIG. 16, an array of parallel slits 6 in surface 10 of sheet 4 is formed by making a continuous spiral cut in the material of the sheet. Sheet 4 is formed into a loop and stretched between opposing rollers 552 and 554 similarly to FIG. 14(*a*). The stretch tension should be sufficient to maintain a good traction between the rollers and sheet 4 and preventing sheet slippage. Rotary blade 9 is positioned above roller 554 so that the planar surface of the blade is perpendicular to the axis of roller 554 and parallel to the stretch direction. Blade 9 is also attached to a linear motion mechanism so that it can be moved along direction 579 which is parallel to the axis of roller 554.

Either one of the rollers 552 or 554 can be provided with a driving motor which should rotate the respective roller at a constant angular rate. Such rotation of the driving roller causes a constant-rate motion of the surface of sheet 4 with respect to blade 9. For slitting operation, blade 9 is initially positioned at one side of sheet 4 and lowered into the material of the sheet without touching the surface of roller 554, according to the desired depth of slits 6 and according to the desired remaining thickness of the material in the area of the slit. After blade 9 is lowered to the appropriate slitting depth, it is moved along direction 579 at a slow, constant speed. As blade 9 reaches the opposing side of sheet 4, a continuous spiral slit will be formed covering the entire surface 10 of the sheet. It will be appreciated that, when the loop of sheet 4 is subsequently cut along direction 579, the continuous spiral slit will be transformed into a linear array of parallel slits 6.

The subsequent steps of making the daylighting fabric 2 may include stretching sheet 4 in a direction perpendicular to slits 6 and applying heat to permanently separate the opposing walls each slit from one another by means of plastic deformation in areas 23 and/or by thermal annealing, as explained above in reference to FIG. 11 and FIG. 12.

The method of making the daylighting fabric 2 is not limited to using a single blade. For example, multiple straight or rotary blades may be assembled into a pack which can cut multiple slits 6 in a single pass. Additionally, the method of making the daylighting fabric is not limited to processing individual large-format rectangular sheets and may be adapted to process a continuous sheet 4 from a web on a roll-to-roll basis.

Figure 17:
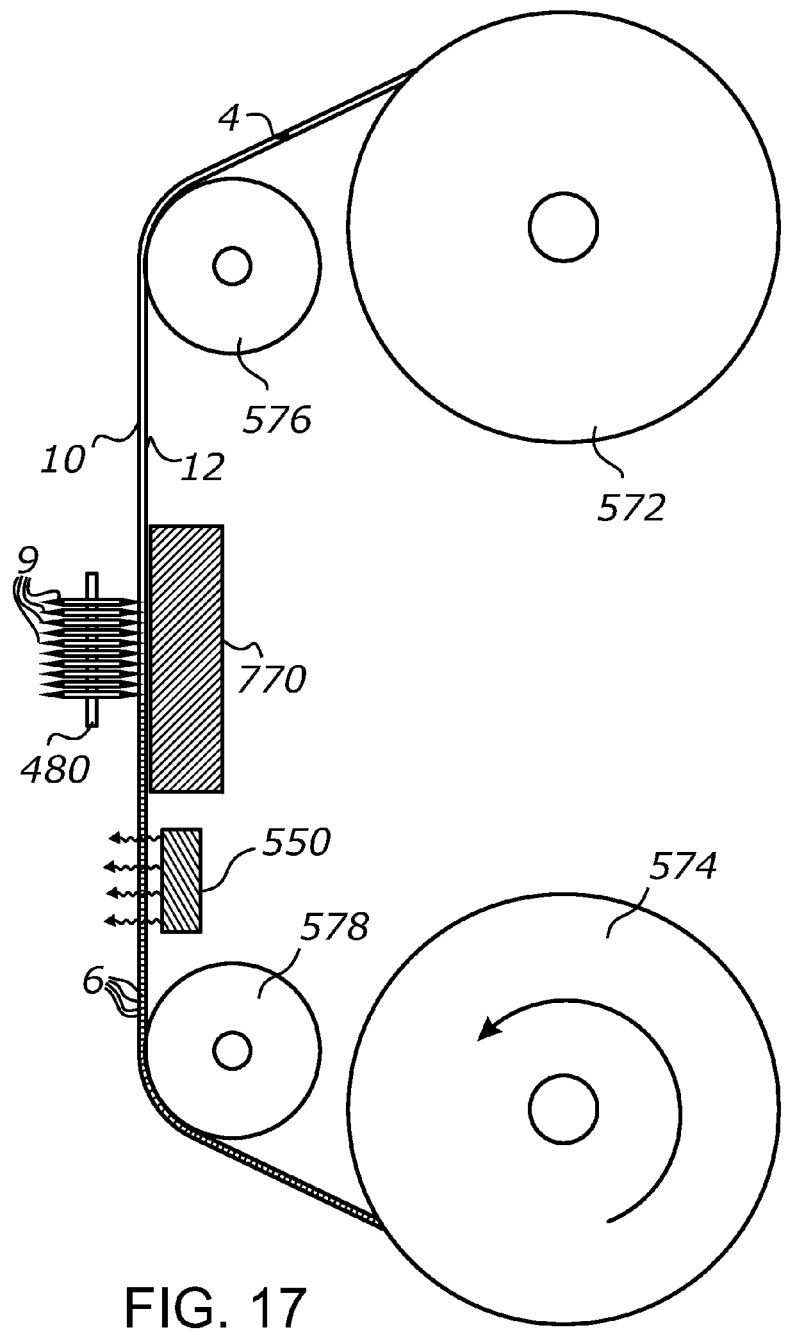
FIG. 17 is a schematic view illustrating an apparatus and a method for making a daylighting fabric using a plurality of blades, according to at least one embodiment of the present invention.

FIG. 17 shows an exemplary apparatus for processing sheet 4 in which slits 6 are formed using a dense pack of ten rotary blades 9 assembled on a common axis 480. Sheet 4 is supplied on a roll 572 and is fed through support rollers 576 and 578 onto a receiving roll 574.

The supply roll 572 may be provided with a controlled tensioning mechanism, such as an unwind brake commonly used for rolls tensioning in the film processing industry. Such mechanism may be configured to provide a constant slip tension so that sheet 4 can be unwound from the roll under a constant stretch tension.

Roll 574 may be provided with a torque drive mechanism configured to rewind sheet 4 from roll 572 to roll 574 in predefined, stepped increments. A support member 770 is positioned at a small distance from sheet 4 parallel to its surface on the opposite side from the pack of blades 9. Its function is to provide a solid guiding surface for slitting and prevent excessive sheet sagging under blade pressure.

The pack of blades 9 and support member 770 form a slitting block of the apparatus shown in FIG. 17. Heat source 550 is positioned on the exit side from the slitting block and is configured to heat a portion of the slit area of sheet 4 to a temperature sufficient to convert at least some of the elastic elongation of the sheet into plastic (irreversible) elongation.

In operation, the pack of blades 9 makes a reciprocal motion perpendicularly to the feed direction so that each blade 9 penetrates through surface 10 into sheet 4 and forms a deep and narrow slit 6 which results in creating a parallel array of ten slits in a single pass. While being slit, sheet 4 may be pressed by blades 9 against support member 770 to ensure an even slitting pressure and a constant depth of the cut.

After each pass of blades 9 through sheet 4, roll 574 rewinds the sheet by a predetermined increment to expose the next uncut portion of the sheet. It may be appreciated that, the use of multiple blades may be advantageous compared to using a single blade in terms of speed of sheet 4 processing and may be preferred in the mass production environment.

Figure 18:
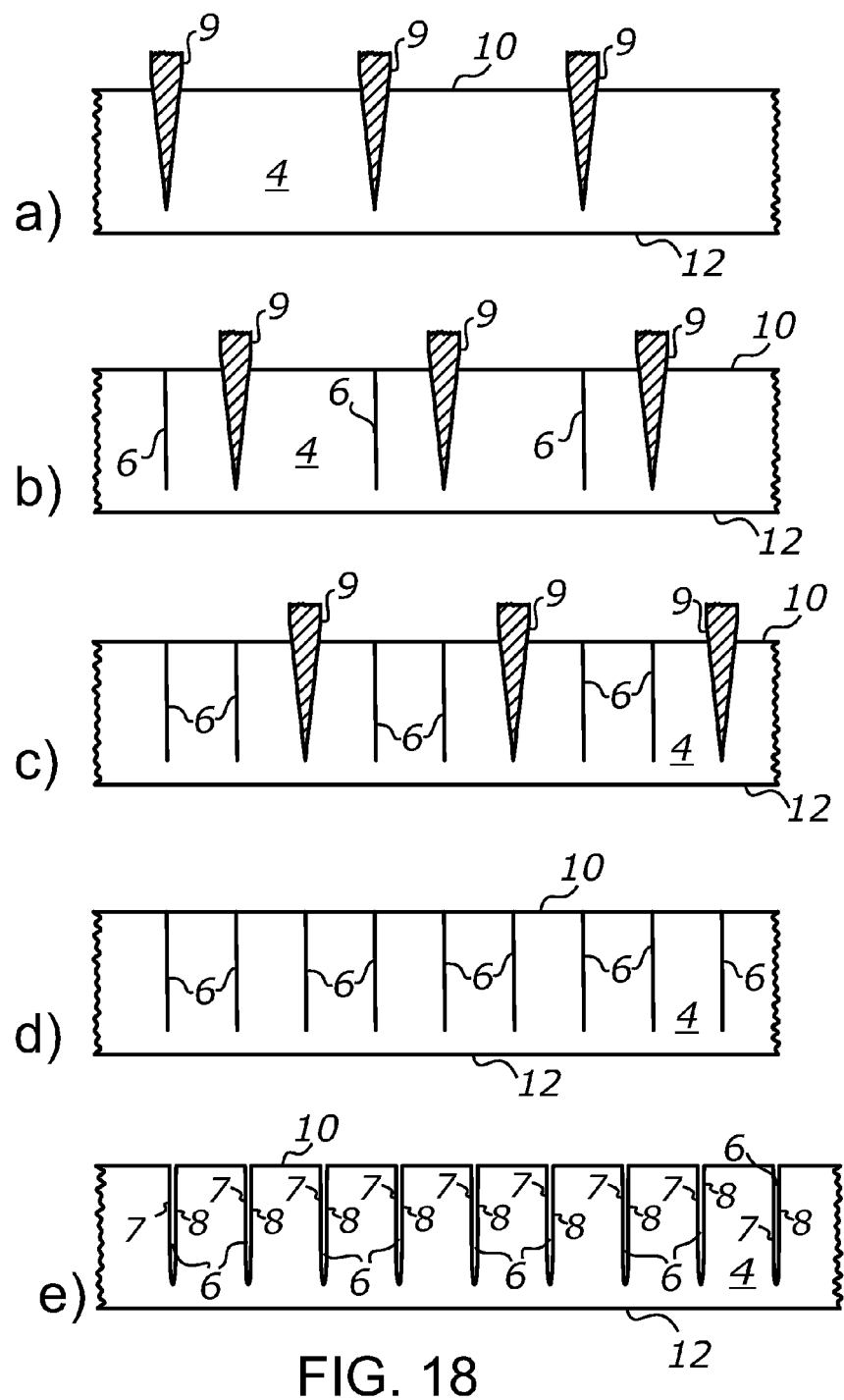
FIG. 18 is a schematic view illustrating different steps of a method of making a portion of a daylighting fabric using a plurality of spaced-apart blades, according to at least one embodiment of the present invention.

Blades 9 may be spaced apart from each other by a constant or variable distance which may be selected depending on various factors including the properties of the material of sheet 4, the thickness of each blade and other considerations. Such blade spacing will, in turn, affect the increments at which sheet 4 needs to be rewound after each pass. This is illustrated in FIG. 18 which shows forming an array of slits 9 using three blades that are spaced apart by approximately three nominal spacing distanced of the slits.

Referring to FIG. 18*a*, blades 9 initially form three slits in surface 10 with the spacing areas being three times the intended width. Since the slitting process does not generally involve material removal from sheet 4, a more tight packing of blades 9 may prevent or make it difficult to penetrate into the sheet material and perform the clean cuts, depending on the thickness of the blades, the thickness of sheet 4 and the slit spacing. Therefore, the use of such sparsely spaced blades may have an advantage over the case where the blades are disposed very close to each other according to the spacing between slits 6.

As illustrated in FIG. 18*b*, after cutting the first series of slits 6 is complete, the pack of blades 9 is moved transversally with respect to the longitudinal axis of the slits by a distance approximating the intended pitch of slits 6. As explained above, this relative motion may be performed, for example, by an incremental feed of sheet 4 in response to the incremental rotation of roll 574 of FIG. 17. In a reverse-direction slitting motion, blades 9 cut three more slits 9 in manner similar to FIG. 18*a*. The process of feeding sheet 4 and the reciprocal motion of blades 9 is then repeated again to form three more slits 9 in the remaining spacing areas (FIG. 18*c*).

FIG. 18*d* shows the results of the slitting operation of the sparsely populated pack of blades 9. At the following slitting step, sheet 4 may be fed by a larger increment which will expose the next uncut area of its surface 10.

FIG. 18*e* shows sheet 4 with the fully formed slits 6 after the previously discussed thermal annealing or plastic stretch-elongation of the sheet. The controlled plastic deformation at the tips of slits 6 results in a permanent separation of the opposing walls 7 and 8 of the slits and filling the respective openings with ambient air, thus providing permanent TIR interfaces for light redirecting operation.

It is noted that the number of blades 9 which may be included in the array for simultaneous making of a series of slits 6 in sheet 4 can be any other than those shown in FIG. 17 and FIG. 18. In one embodiment, the pack of blades may have as many blades 9 as needed to cover a significant portion or the entire area of sheet 4 and to slit the respective sheet in just a few passes or even a single pass. Multiple blades 9 may also be arranged in any other suitable configuration. For example, blades 9 may be positioned at different angles with respect to surface 10 of sheet 4. In another example, blades may also be disposed in a staggered arrangement. Blades 9 may also be spread over multiple cutting blocks and each block may be configured to slit a different area of sheet 4 in a simultaneous or sequential operation.

It is further noted that suitable means for stretching sheet 4 along a direction perpendicular to linear slits 6 is not limited to rollers or rolls such as those shown in FIG. 14 and FIG. 17 and may include other conventional elements, such as clamps, actuators, air cylinders, and the like. Sheet 4 is also not limited to be formed into a loop for stretching or to be supplied from a roll. For instance, a pair of clamping bars may be provided. Sheet 4 may clamped to such bars at its edges and stretched between the clamping bars. Sheet 4 may be either moved relatively to a stationary cutting head comprising one or more blades 9 or, alternatively, the sheet may be positioned stationary and the slitting operation may be performed by a moving head.

The foregoing embodiments are described upon the case where surface 12, which is generally smooth and uninterrupted by the slits, is configured for light input and the opposing surface 10 comprising slits 6 is configured for light output. However, this invention is not limited to this and can be applied to the case when surface 10 is configured for light input and surface 12 is configured for light output. It will be appreciated that, when both surfaces 10 and 12 are generally smooth, slits 6 are perpendicular to the prevailing plane of sheet 4 and the opposing walls of each slit are parallel to each other, the light redirecting operation of the daylighting fabric may be substantially the same regardless of which surface is facing inside or outside of the building interior. In other words, daylighting fabric 2 may be configured to be bifacial and fully operational in both orientations.

Figure 19:
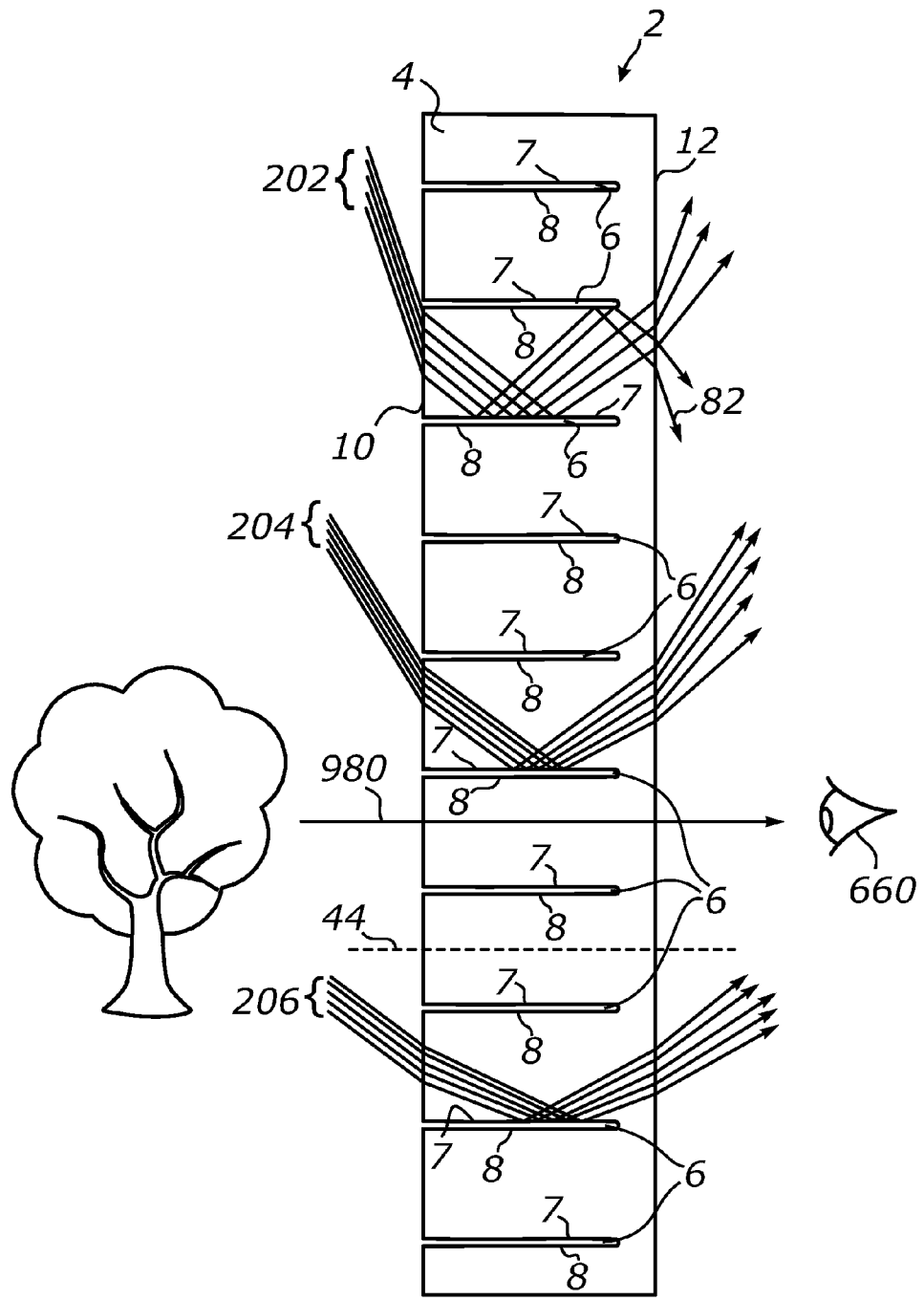
FIG. 19 is a schematic cross section view and raytracing of a portion of a daylighting fabric, showing a plurality of parallel slits formed in a light input surface of an optically clear sheet material, according to at least one embodiment of the present invention.

FIG. 19 shows an embodiment of daylighting fabric 2 which is similar to that of FIG. 6 but in which the slit surface 10 is configured for light input and the opposing uninterrupted surface 12 is configured for light output. Additionally, walls 7 and 8 of FIG. 19 are configured to have a more substantial surface roughness compared to the case illustrated in FIG. 6 which provides the respective slits with some beam-spreading function.

The operation of the embodiment of FIG. 19 may be better understood referring to the illustration of light reflection from an optically rough surface of individual slit 6 of FIG. 8. Similarly, while surface roughness of walls 7 and 8 in FIG. 19 may be non-negligible, the character of such roughness may be controlled so that each wall of slits 6 reflects light in near-specular regime with a very narrow angular spread of the reflected beam.

Accordingly, parallel light beams represented by ray bundles 202, 204 and 205 in FIG. 19 are redirected and admitted into the building interior with some notable divergence at least in the reflection plane. Such divergence may be advantageous for making the daylight distribution more uniform and/or propagating the daylight into deeper areas of the building interior. The respective surface relief features 5 (not shown in FIG. 19) may also be configured to cause beam divergence in a plane perpendicular to the plane of reflection thus even further reducing glare and improving lighting uniformity.

It will be appreciated that the surface relief features 5 which may be present on the surfaces of slits 6 and configured for beam spreading will not necessarily affect the transparency and see-through appearance of sheet 4 along a surface normal. Therefore, daylighting fabric 2 employing light-diffusing slits 6 may still be used in a manner which allows for viewing objects behind it, as indicated by the path of ray 980 in FIG. 19.

Figure 20:
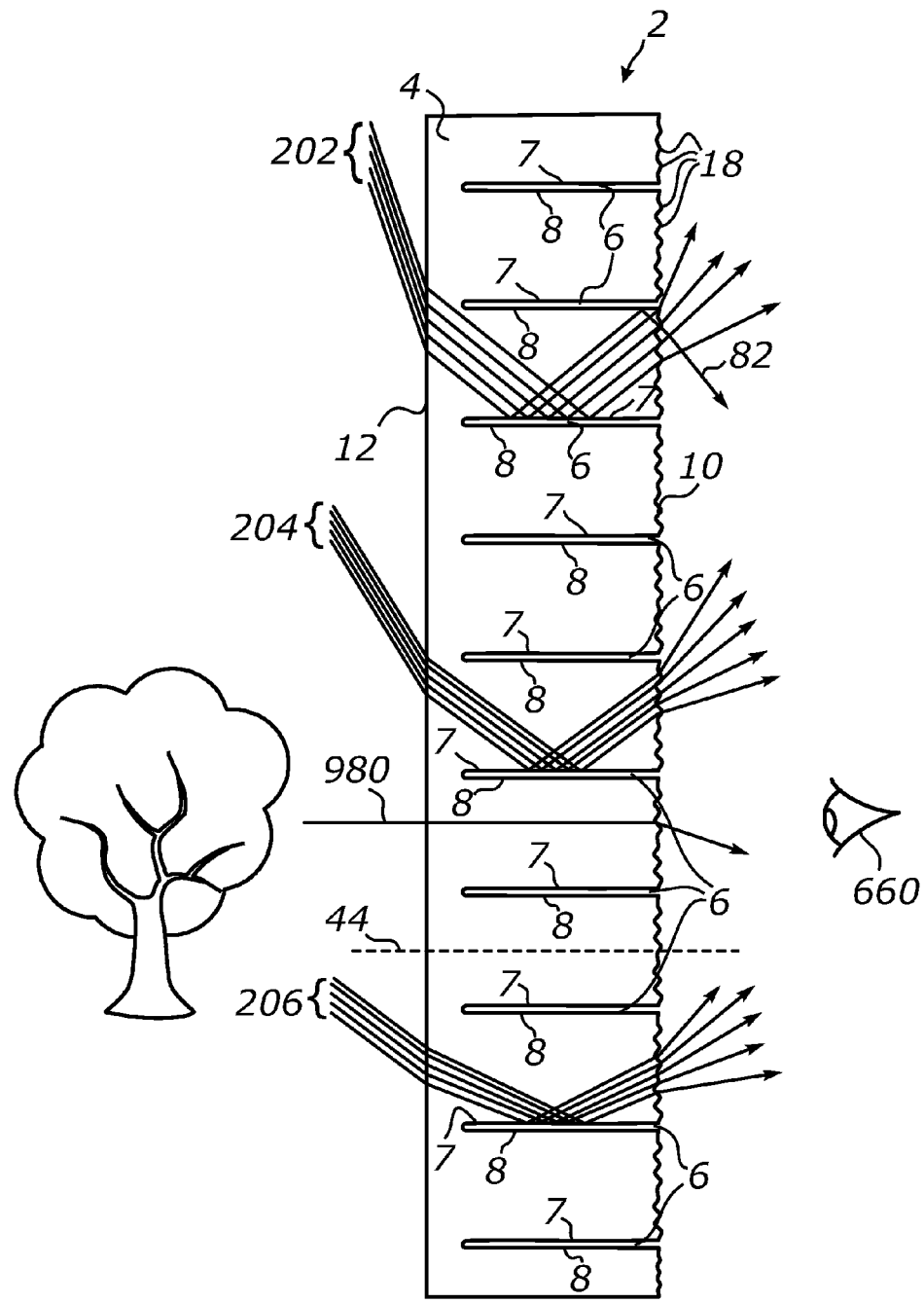
FIG. 20 is a schematic cross section view and raytracing of a portion of a daylighting fabric, showing a textured light output surface, according to at least one embodiment of the present invention.

FIG. 20 shows an embodiment similar to FIG. 6 except that the light output surface 10 is patterned with light diffusing microstructure. The microstructured pattern of surface 10 may be formed by an array or random or ordered surface relief features 18 which can have any 2-dimensional or 3-dimensional geometry configured for dispersing or scattering a parallel beam of light by means of refracting its rays towards different directions. Suitable optical micrustructures may include but are not limited to prism arrays, arrays of prisms, prismatic grooves, lens arrays, engineered surfaces, various surface relief types commonly referred to as "frosted-glass", "prismatic", "sanded", "pebble", "ice", "matte", "microprism", "microlens", and the like. Alternatively or in addition to that, surface 10 may have any decorative or ornamental microstructured features such as, for example, those found in window privacy films or screens.

Any conventional means used to pattern the surface of plastic sheets or films may be used to form the textured surface 10. Surface patterning is commonly incorporated in the processes of making sheets of films of a flexible material and may involve techniques such as extrusion, casting, molding, imprinting, calendaring, etching and the like. It is preferred, particularly for the case when sheet 4 is made from clear plasticized PVC, that the microstructured surface 10 is formed at the time of making sheet 4 so that slits 6 can be cut in the already patterned surface.

In operation, referring further to FIG. 20, ray bundles 202, 204 and 206, representing parallel beams of direct sunlight at different solar elevation angles and entering sheet 4 through light input surface 12, are redirected by slits 6 using TIR and are further dispersed over a broad angular range by surface relief features 18 of surface 10. At least a large fraction of each of the divergent beams emerging from surface 10 is generally directed towards the upper portions of the building interior, such as the ceiling or tops of the walls and may thus be further redistributed due to secondary reflections or scattering. Since daylight emerging from sheet 4 is at least partially diffused and propagates in the form of a divergent beam, it may reach different areas of the building interior including locations at a considerable distance from the respective window while producing a relatively low level of glare.

Due to the presence of surface texture in sheet 4, the transparency of such embodiment of daylighting fabric 2 may be substantially reduced compared to the case when sheet 4 has generally smooth surfaces 10 and 12. This is illustrated by example of the path of ray 980 in FIG. 20. It is seen that such ray 980 initially propagating from a distant outdoor object along a perpendicular to surfaces 12 and 10 is deflected from its initial propagation path by microstructured surface 10 and does not therefore reach the observer's eye 660 disposed on the line of sight. Accordingly, it will be appreciated that such implementation of daylighting fabric 2 may be advantageously used for the applications requiring enhanced levels of privacy.

Either one of the surfaces 10 and 12 may be textured in order to enhance the light diffusing properties of daylighting fabric 2 and/or enhance its privacy functions. However, when such textured surface is configured for a broad-angle scattering, sheet 4 should preferably be used in an orientation where the textured surface is facing away from the source of daylight and towards the building interior. Such preference may be understood considering that the too high scattering angles may suppress TIR at slits 6 or otherwise cause unwanted TIR at the light output surface of sheet 4 (see, e.g., the discussion in reference to rays 226 and 228 of FIG. 8).

It is noted that, when one of the surfaces of sheet 4 is textured and such textured surface is properly facing away from the source of daylight, the respective surface microstructure may be used to enhance the light throughput of daylighting fabric 2, especially in the case where the surfaces of slits 6 have some excessive roughness or waviness.

Figure 21:
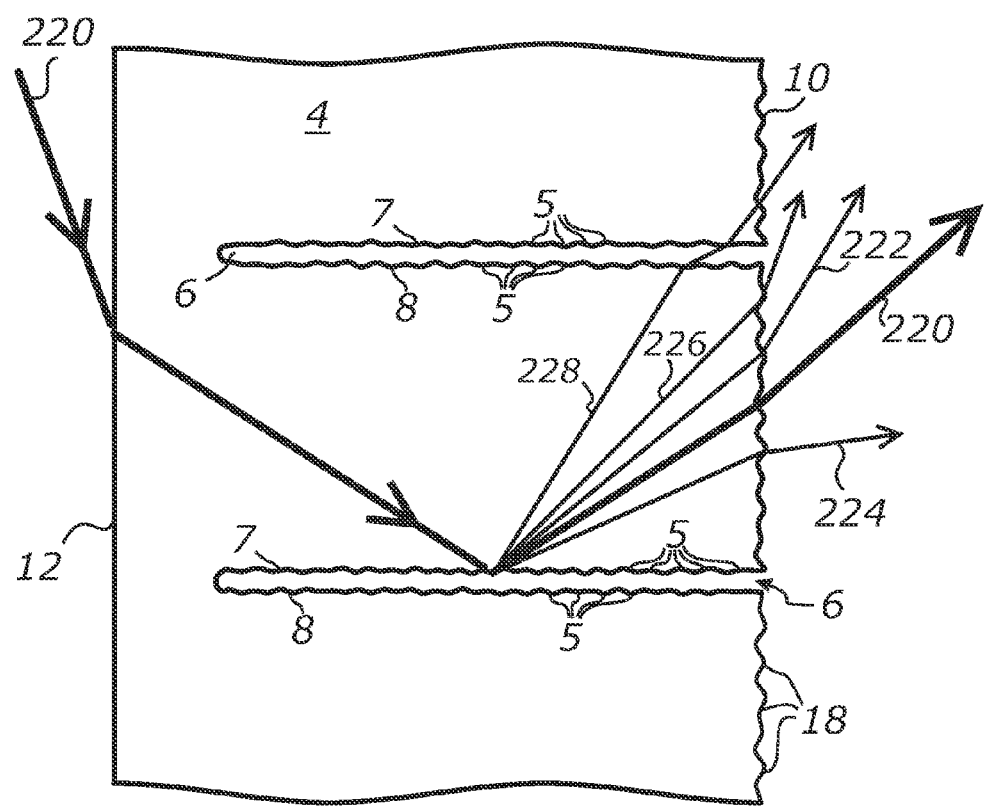
FIG. 21 is a schematic view and detailed raytracing of a portion of a daylighting fabric, showing a textured light output surface of an optically transmissive body and further showing slits formed in a surface of the sheet and having surface relief features, according to at least one embodiment of the present invention.

This is further illustrated in FIG. 21 which shows a portion of sheet 4 and incident ray paths similar to FIG. 8 except that the light output surface 10 includes surface relief features 18 of FIG. 20. The added relief of surface 10 causes scattering of rays 220, 222 and 224 in random directions within a certain angular range. It will be appreciated by those skilled in the art that such surface relief may also suppress the total reflection for at least some rays striking surface 10 at angles with respect to a surface normal greater than the critical TIR angle. For instance, referring to FIG. 21, rays 226 and 228 are now transmitted and scattered by surface 10 in a forward direction rather than being reflected by means of TIR as in the case of FIG. 8. As a result, rays 226 and 228 are also directed into the building interior despite their high deflection angles resulting from the surface roughness of the respective slit 6.

Thus, as the example of FIG. 21 illustrates, the microstructured surface 10 may be configured to at least partially compensate the negative effect of the excess roughness that may be present in walls 7 and/or 8 of slits 6. It may be appreciated that providing a suitable micro-relief for the light output surface of sheet 4 can be particularly useful for enhancing the light transmittance of daylighting fabric 2 at relatively high incidence angles. For example, referring back to FIG. 8 it may be shown that, at high incidence angles of light rays onto sheet 4, even relatively small deviations of rays from the "ideal" reflection path of ray 220 upon interacting with wall 7 may result in greater-than-TIR incidence angles onto surface 10. Therefore, according to one embodiment, the light output surface of sheet 4 may include surface relief features 18 configured to suppress TIR at such surface and broaden the acceptance angle of daylighting fabric 2.

Referring further to FIG. 21, the optical structure formed by sheet 4 and a plurality of slits 6 also generally illustrates a method for redirecting light using a sheet of optically transmissive material. Such method includes (a) propagating the light in sheet 4 in response to the optical transmission; (b) reflecting light by a total internal reflection of at a plurality of slits 6 distributed within the material of the sheet; and (c) extracting the reflected light from light output surface 10. The surfaces of slits 6 may particularly include surface irregularities which are considered significant by optical standards. Particularly, walls 7 and/or 8 may include areas characterized by the RMS surface profile roughness parameter in the range from 10 nanometers to 100 nanometers at a sampling length between 20 and 100 micrometers.

Daylighting fabric 2 may comprise any number of additional internal or external layers that can have various functions. For instance, referring to FIG. 22, a layer 40 of an optically transmissive material may be provided on at least one surface of sheet 4. By way of example and not limitation, such layer 40 may be applied to surface 10 and used to provide protective encapsulation of slits 6 and prevent dust, dirt and/or moisture accumulating in slits 6. In a further example, layer 40 may be formed by an optically clear adhesive which can be used for laminating sheet 4 to other surfaces.

Figure 22:
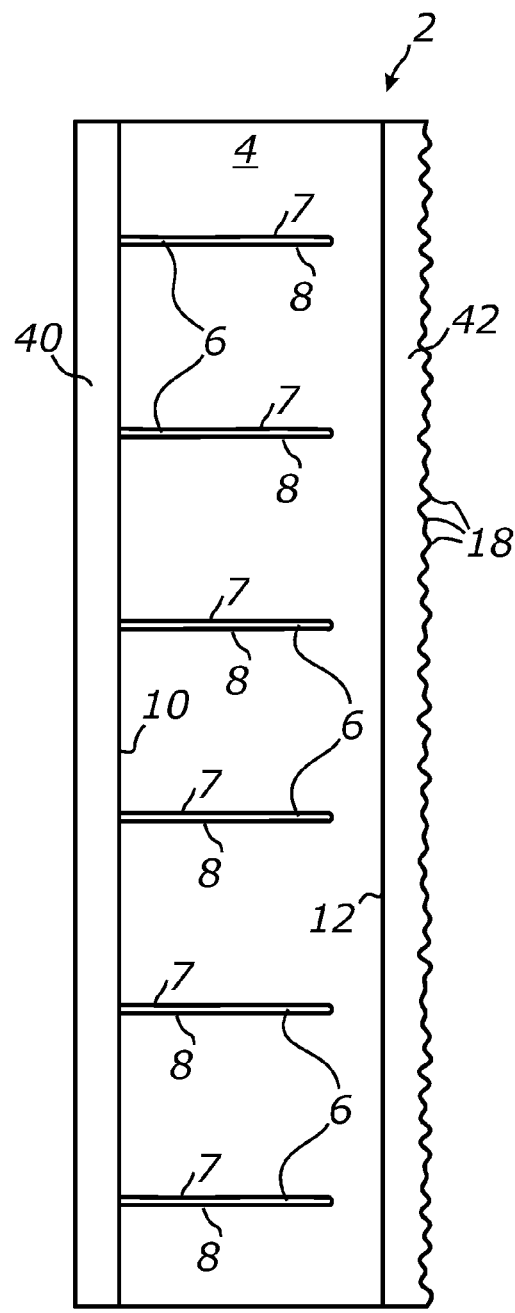
FIG. 22 is a schematic cross section view of a daylighting fabric portion comprising additional layers of optically transmissive materials, according to at least one embodiment of the present invention.

FIG. 22 also shows an external layer 42 that may be attached to a light output surface of sheet 4. Such layer may include surface relief features 18 configured for diffusing light emerging from sheet 4 and/or broadening the acceptance angle of daylighting fabric 2. Layer 42 and its surface relief features 18 may be formed separately from sheet 4 and then laminated to its surface. Any layer in a multilayered structure of sheet 4 may also be provided with UV- or IR-blocking properties. Alternatively, or in addition to that, either layer may be provided with color filtering properties or tint.

Suitable configurations of sheet 4 are not limited to the perpendicular orientation of slits 6 with respect to the sheet surface. In one embodiment, one or more slits 6 may be formed at an angle with respect to a surface normal.

Figure 23:
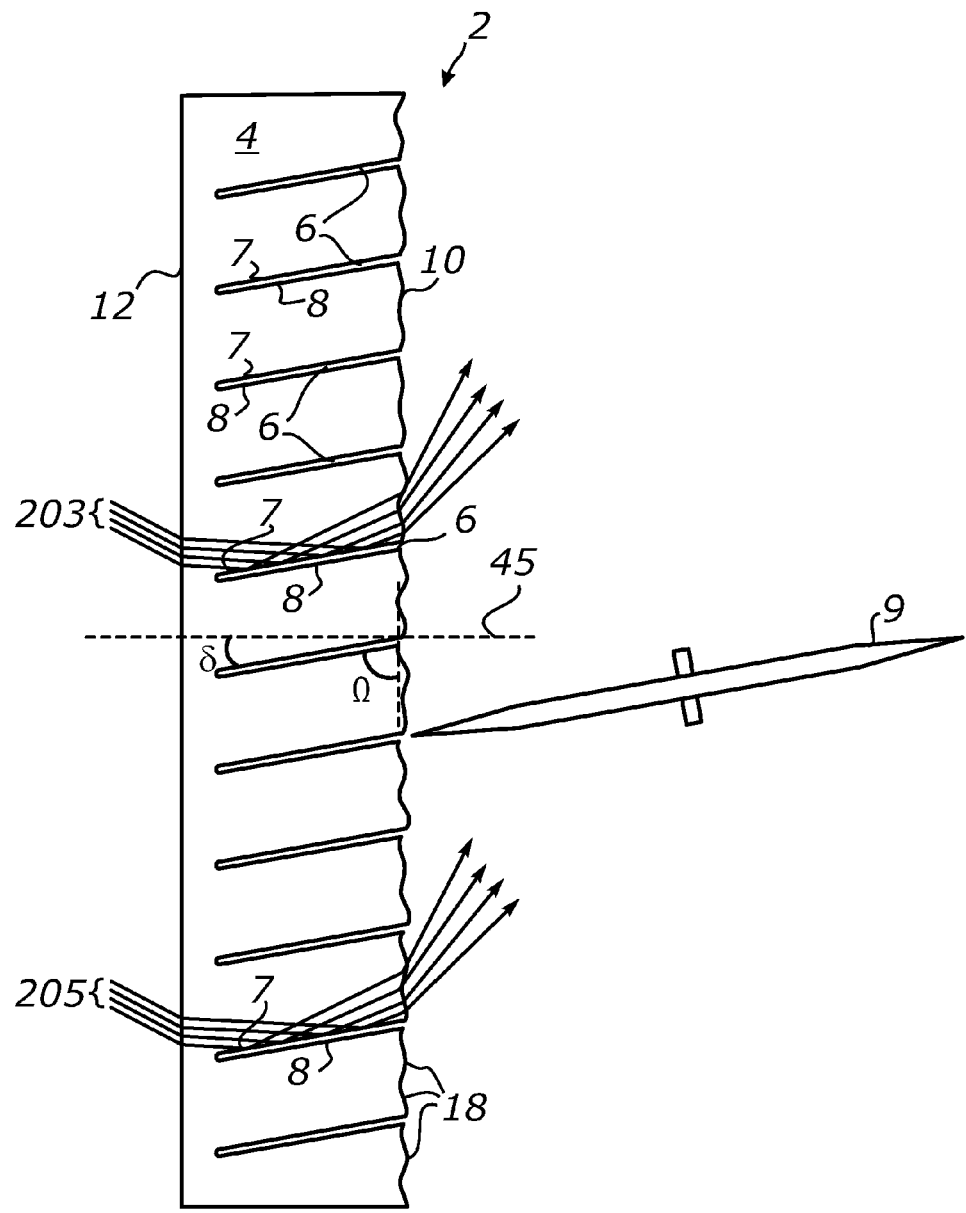
FIG. 23 is a schematic view of a portion of a sheet of daylighintg fabric, showing a plurality of slits formed at a constant angle with respect to a perpendicular to the sheet surface, according to at least one embodiment of the present invention.

FIG. 23 depicts a portion of vertically positioned sheet 4 in which surface 12 is configured for light input and the opposing surface 10 is configured for light output. Slits 6 are formed in surface 10 at a constant non-zero slope angle δ with respect to a normal 45 to said surface. As further illustrated in FIG. 23, such sloped slits 6 may be formed by blade 9 which is tilted at such angle δ with respect to normal 45 during the slitting process. As a result of a non-zero tilt angle of blade 9, each of the planar walls 7 and 8 will form a certain dihedral angle Ω with the prevailing plane of surface 10 which will be less than 90°. More particularly, due to the general parallelism of walls 7 and 8, dihedral angle Ω of each of the walls will generally be complementary to slope angle δ, that is Ω=90°−δ.

Surface 10 of FIG. 23 further includes random surface relief features 18 which may be configured for diffusing the transmitted light and/or suppressing TIR at such surface.

In operation, ray bundles 203 and 205 exemplifying a quasi-parallel beam of the direct sunlight strike surface 12 which refracts the respective light rays and admits them into the optically transmissive material of sheet 4. The spacing between slits 6 and the dihedral angle Ω of each slit are such that all rays of ray bundles 203 and 205 are intercepted by the respective walls 7. At least a substantial portion of the surface of walls 7 has the RMS surface roughness generally below 50 nm, and more preferably, below 30 nm. As a result, at least 85% of light incident onto walls 7 may be reflected in a specular regime by means of TIR.

Since each slit 6 is disposed at an angle with respect to the horizontal plane, the deflection angle of each ray is such that the respective light beams are reflected and redirected at greater angles with respect to such plane. Surface relief features 18 further scatter or diffuse the near-parallel beams of ray bundles 203 and 205 and result in surface 10 emitting generally divergent light beams towards the ceiling area. Features 18 may be configured to disperse light over a relatively broad angle so that the individual light beams reflected by respective slits 6 may superimpose on each other resulting in a uniform, diffuse beam of daylight distributed over the entire area of the building's interior.

Figure 25:
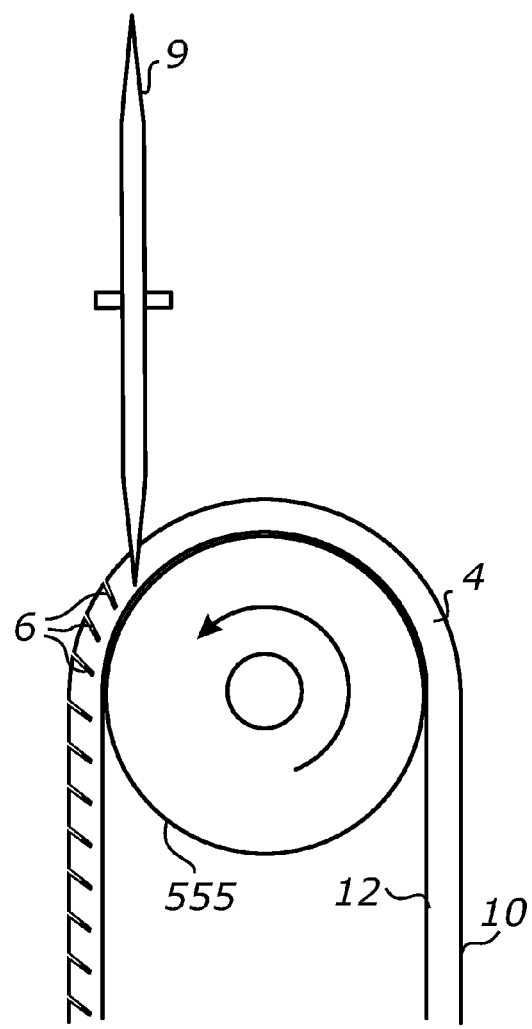
FIG. 25 is a schematic view illustrating a step of a method of making daylighting fabric, showing a slitting blade disposed in an offset position with respect to a roller, according to at least one embodiment of the present invention.

FIG. 25 schematically depicts an exemplary method of making sloped slits 6 in sheet 4. In one embodiment, such method may be incorporated as a step in the method of making the daylighting fabric 2. In FIG. 25, sheet 4 is stretched over a roller 555 which rotates in small periodic angular increments alternating with the reciprocal movements of blade 9 in a direction parallel to the axis of roller 555. The suitable tilt of blade 9 with respect to a normal to surface 10 is obtained by offsetting the point of entry of blade 9 into the material of sheet 4 by a predetermined distance from a radial position with respect to roller 555. As the slitting process ensues, slits 6 having a constant slope with respect to a surface normal are formed.

Figure 24:
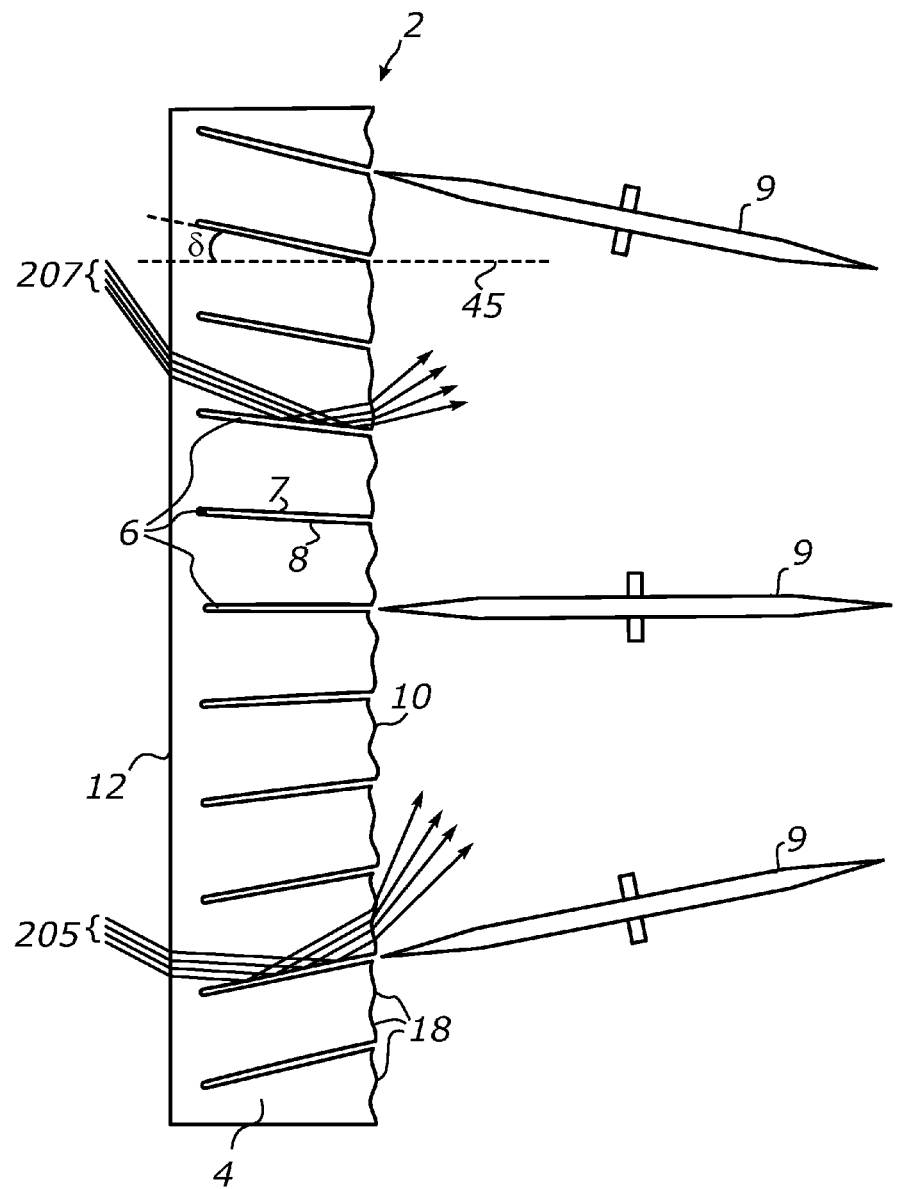
FIG. 24 is a schematic view of a portion of a sheet of daylighintg fabric, showing a plurality of slits formed at a variable angle with respect to a perpendicular to the sheet surface, according to at least one embodiment of the present invention.

FIG. 24 shows an embodiment similar to FIG. 23 except that the slope angle δ of slits 6 is variable. Such variable slope may be obtained by varying the tilt angle of blade(s) 9 with respect to the surface normal. For instance, referring to FIG. 25, by varying the offset of blade 9 from the symmetrical radial position, the slope of slits 6 with respect to the surface normal may also be varied.

Referring yet further to FIG. 25, it may also be appreciated that, when the diameter of roller 555 is sufficiently small, slitting sheet 4 over its cylindrical surface with an offset may also produce slightly curved walls of slits 6. Accordingly, in one embodiment, the TIR surfaces of slits 6 may be configured to have a curvilinear shape. For example, such slits 6 having curvilinear walls may be employed for light diffusing purposes.

In one embodiment, slope angle δ of slits 6 may be chosen randomly in a predetermined angular range. When sheet 4 is illuminated by a parallel beam of light, such as direct sunlight, the random orientation of slits 6 may result in a random orientation of the redirected light rays thus also providing additional light diffusing function.

Figure 26:
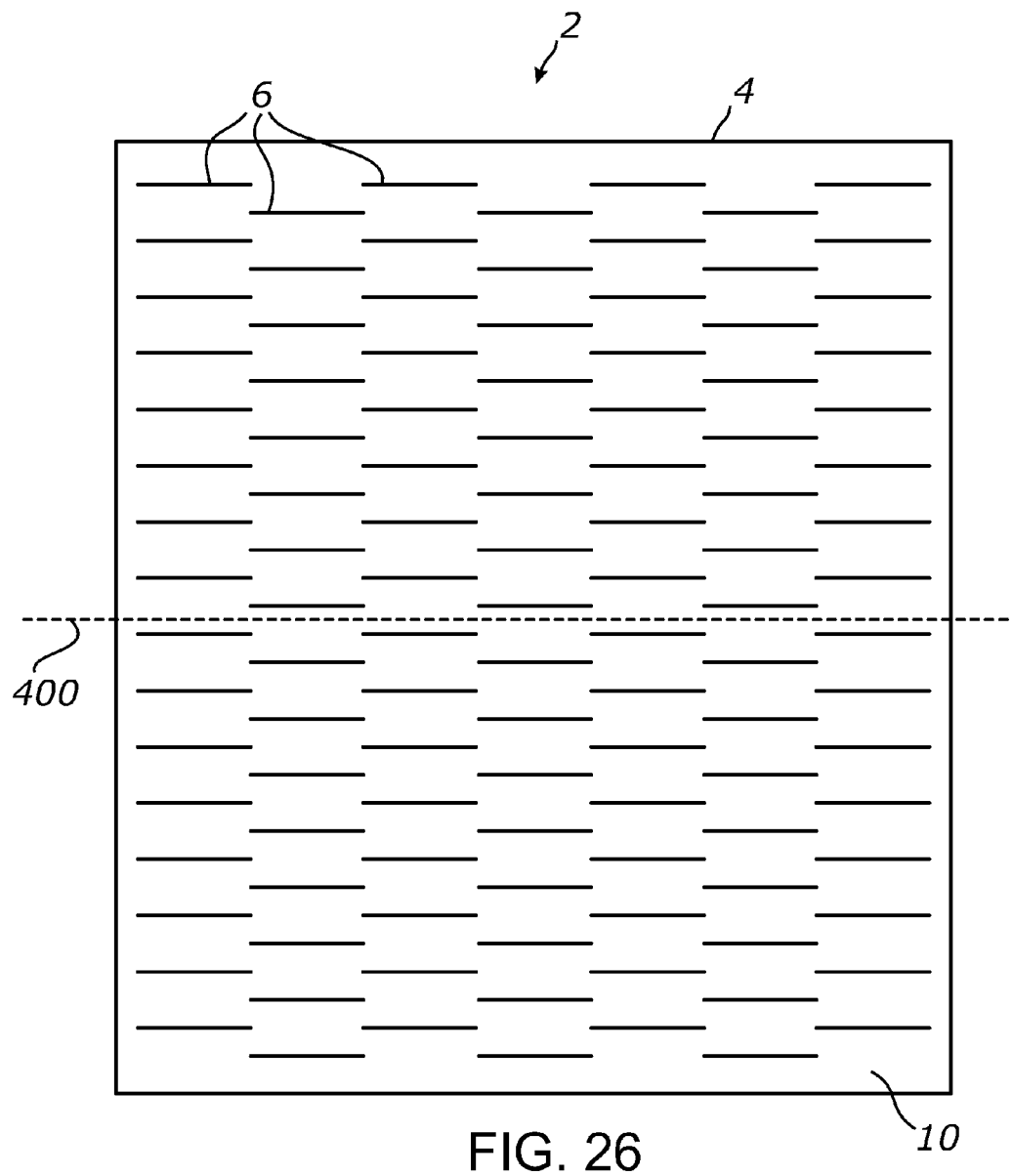
FIG. 26 is a schematic top view of a rectangular sheet of a daylighting fabric, showing a staggered arrangement of slits in a surface, according to at least one embodiment of the present invention.

FIG. 26 shows an embodiment of daylighting fabric 2 having an alternative arrangement of parallel slits 6 in surface 10 compared to the case when slits 6 are a formed in continuous parallel rows extending from one edge of sheet 4 to the other. Referring to FIG. 26, each linear slit 6 has a length which is considerably shorter than the width of sheet 4 along axis 400. The plurality of slits 6 is arranged in staggered rows and columns where each row is shifted relatively to the adjacent rows. In each row, the adjacent slits 6 are separated by a spacing area of the uncut bulk sheet material. Such arrangement of slits 6 may be useful, for example, for the case when the remaining thickness of the material under the slits would be insufficient to support the integrity of sheet 4 if each slit is continuously extending end-to-end.

It will also be appreciated that such staggered arrangement of slits 6 may also allow for each slit to extend through the entire thickness of the material of sheet 4 without losing the integrity of the sheet as a whole. The thickness of the material of sheet 4, the length of each slit 6 and the spacing distance between the slits may be selected so that the material in the spacing areas can support the shape of sheet 4.

It is noted that the arrangement of slits 6 of FIG. 26 also illustrates an exemplary implementation of daylighting fabric 2 in which an uncut border area is preserved along a perimeter of sheet 4. Leaving uncut areas at one or more edges of sheet 4 may be advantageous, for example for enhancing the tear resistance of daylighting fabric 2.

Suitable implementations of daylighting fabric 2 are not limited to arranging slits 6 into a single array in which all such slits extend parallel to one particular reference line. Slits 6 may also be arranged in two or more arrays which may be adjacent to each other, spaced apart, overlapping or disposed in any angular position with respect of each other. In one embodiment, different arrays of slits 6 may be formed in the same surface of sheet 4. In one embodiment, different arrays of slits 6 may be formed in the opposing surface of sheet 4.

Figure 27:
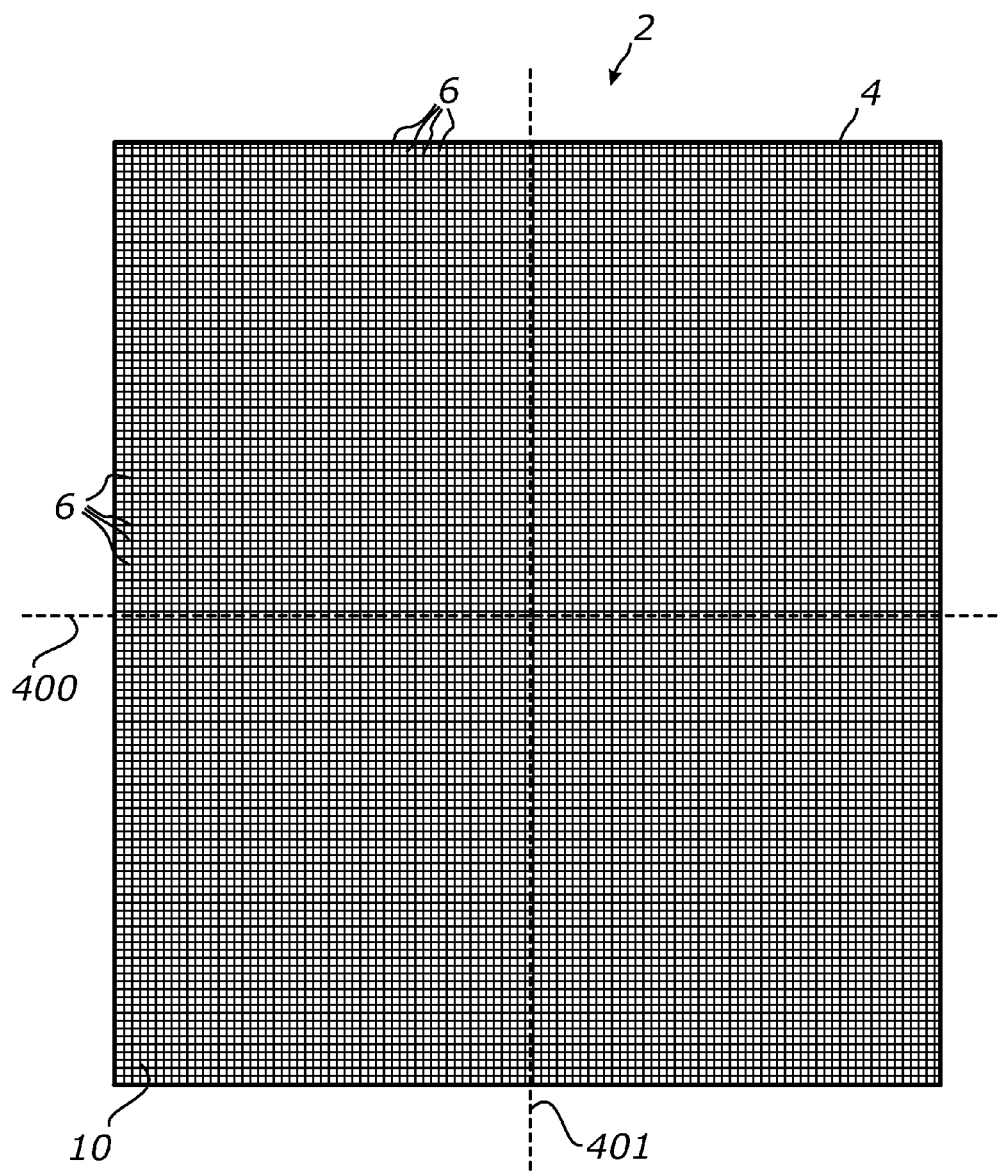
FIG. 27 is a schematic top view of a rectangular sheet of a daylighting fabric including a plurality of slits arranged in two perpendicular arrays, according to at least one embodiment of the present invention.

FIG. 27 shows an embodiment in which slits 6 are formed in two different arrays and said arrays are crossed at a right angle to each other. Referring to FIG. 27, a first array of slits 6 extends parallel to reference line 400 and a second array of slits 6 extends parallel to another reference line 401 which is perpendicular to line 400.

Since the walls of slits 6 of the respective arrays are separated from each other by a thin layer of air in both dimensions and can be configured to reflect light in a specular or near-specular TIR regime, the intersecting slits may thus form two-dimensional light-channeling cells. Such light-channeling cells may be configured to split an off-axis parallel beam into two or more beams propagating into opposing directions with respect to a normal to the light input surface of sheet 4.

Figure 28:
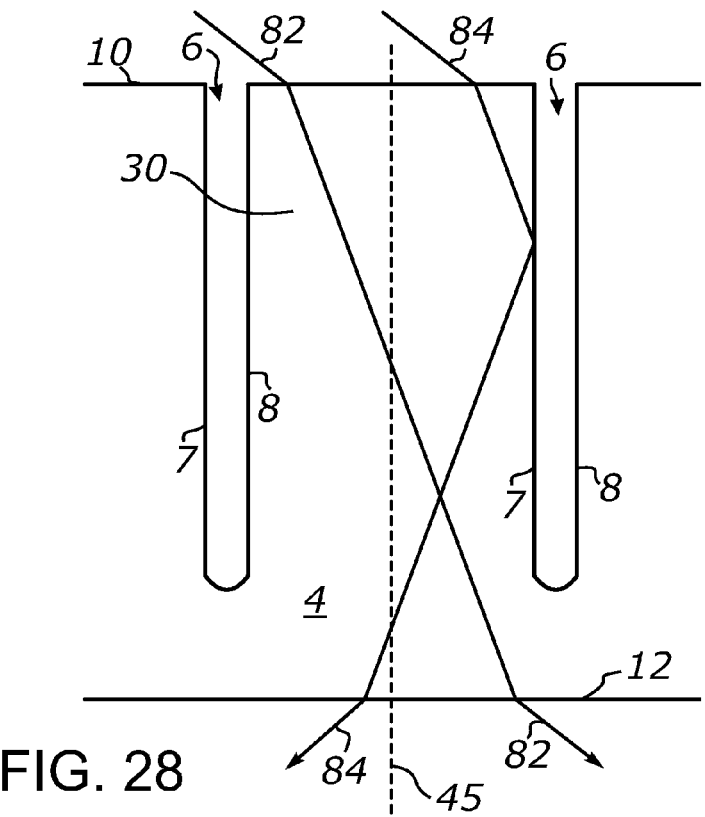
FIG. 28 is a schematic view and raytracing of a portion of a daylighting fabric including a light-channeling cell, showing various ray paths through such cell, according to at least one embodiment of the present invention.

This is illustrated in FIG. 28 in which a light channeling cell 30 is formed, in a cross-section, by wall 7 of one slit 6 and wall 8 of an adjacent slit 6. An exemplary off-axis ray 82 passes through sheet 4 without interacting with any of the walls of the respective light channeling cell 30 and therefore maintains its original propagation direction upon exiting from surface 12. A different off-axis ray 84 enters sheet 4 from the same direction but strikes the entrance aperture of cell 30 at a different location than ray 82. Ray 84 undergoes reflection from wall 7 by means of TIR and exits from sheet 4 towards a different direction which mirrors the direction of ray 82 with respect to normal 45.

Rays 82 and 84 of FIG. 28 may particularly exemplify a parallel beam of direct sunlight at a low or moderate solar elevation angle when sheet 4 is disposed in a horizontal orientation. Although rays 82 and 84 are incident from a single direction, the difference in their propagation paths results in such rays being deflected symmetrically away from normal 45 resulting in a highly divergent light beam. As a matter of optics, the angle between the propagation directions of divergent rays 82 and 84 can be about twice the incidence angle of such rays onto surface 10. Accordingly, the resulting divergence angle of a parallel beam passing onto such cell 30 strongly depends on the angle that the incident beam makes with respect to normal 45. Particularly, when the incidence angle is 45° or more, the full angle of the divergent beam may exceed 90° even in the absence of any appreciable scattering at TIR walls of slits 6 or surfaces 10 and 12 of sheet 4.

It will be appreciated that the relative dimensions of cells 30 may be controlled by varying the density and/or depth of slits 6. Cells 30 may be particularly configured to have a relatively high aspect ratio by making slits 6 with the appropriately high density and depth, in which case at least some rays may even undergo multiple reflections from the opposing walls 7 and 8 of cells 30. Such kaleidoscopic reflections may result in a further randomization of the paths of off-axis rays thus improving the uniformity of beam splitting.

Figure 29:
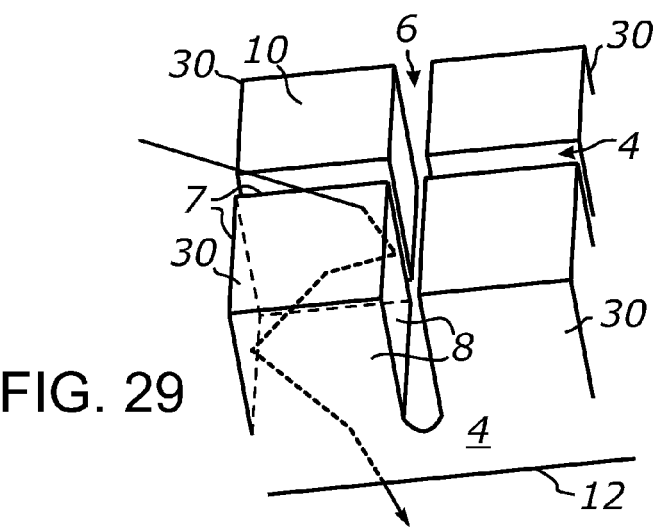
FIG. 29 is a schematic perspective view and raytracing of a portion of a daylighting fabric, showing an exemplary path of a ray reflecting from multiple walls of a light-channeling cell, according to at least one embodiment of the present invention.

It should be noted that the operation of individual cells 30 is not limited to reflecting light from the opposing parallel TIR walls 7 and 8 in a single plane. For example, FIG. 29 illustrates a ray path through an individual cell 30 where the light ray enters surface 10 from a random off-axis direction. As it is seen, such ray can be sequentially reflected from one or more of the four walls of light-channeling cell 30 thus obtaining a random emergence angle in both angular dimensions.

It will be appreciated that, when cell 30 is configured accordingly and exposed to a beam of light which can be represented by a large number of parallel off-axis rays evenly distributed over the entrance aperture of the cell, such rays may randomly mix within cell 30 and emerge from surface 12 at random orientations. Accordingly, each cell 30 may be configured to operate similarly to a short-length kaleidoscopic light pipe and provide light diffusing functions by dispersing a parallel beam of light into different directions spanning across a broad angular range. Particularly, daylighting fabric 2 employing perpendicular arrays of slits 6 may be used to improve the diffusion and distribution of daylight incident from different angles due to the diurnal and/or seasonal motion of the sun.

Daylighting fabric 2 may also be configured to combine the beam splitting or kaleidoscopic function of cells 30 with light diffusing functions of various surfaces of sheet 4 and/or slits 6. For example, walls 7 and 8 may be configured to include light-diffusing surface relief features 5 of FIG. 8. Alternatively, or in addition to that, the designated light output surface of sheet 4 may be configured to include surface relief features 18 of FIG. 20.

By way of example and not limitation, such configuration of daylighting fabric 2 may be incorporated into a skylight in a roof or ceiling of a building. This is illustrated in reference to FIG. 30 and FIG. 31 in which a ray 280 represents a beam of direct sunlight passing through horizontal opening 500 in the ceiling of room 366 at an angle to a vertical direction. Such opening 500 may represent the exit aperture of a skylight configured to illuminate room 366 with daylight.

Figure 30:
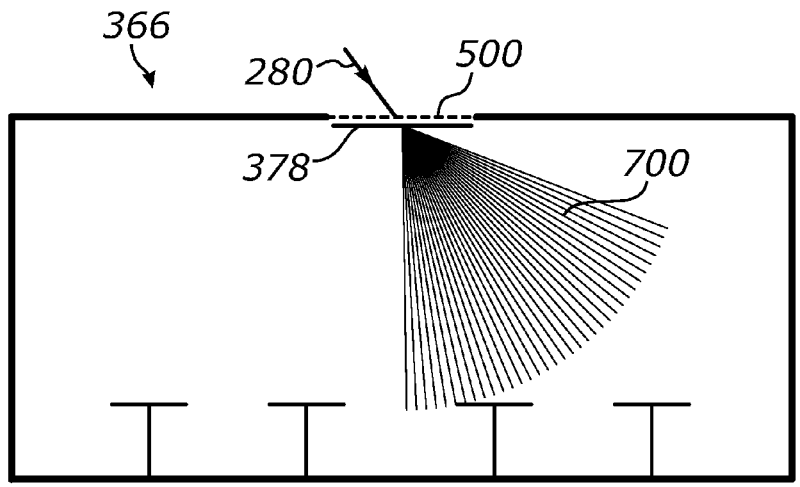
FIG. 30 is a schematic view and raytracing diagram illustrating the operation of a conventional diffuser in a skylight.

In order to be able to compare and contrast the present invention with typical light diffusing optical elements used in daylighting systems, FIG. 30 is shown to illustrate the operation of conventional light diffusing panel 378 positioned on the path of ray 280. Light diffusing panel 378 typically employs a molded sheet of optically clear or translucent polymeric material which includes light diffusing microstructures such as a lens arrays, prism arrays, and the like.

Due to the refractive nature of light redirection by microstructured surfaces, the bend angle provided by light diffusing panel 378 is limited to 30-45° or so. As a result, the full angular width of the diffuse beam is usually less than 90°. This is illustrated by a fan of rays 700 which represents the diffuse beam produced by panel 378 when illuminated by ray 280. Additionally, the intensity of such diffuse beam usually peaks along the continuation direction of the incident direct beam (corresponding to zero deflection angle) and fades considerably at larger deflection angles. The diffuse beam of panel 378 also tends to propagate generally towards the same direction as ray 280. All this results in the fan of rays 700 of FIG. 30 having a sharply asymmetric propagation direction and an angular width which is insufficient to directly illuminate the entire room. More particularly, such fan of rays 700 directly illuminates only a portion of room 366 located on the side opposite to the incidence direction of ray 280. Thus, the respective portion of room 366 may become over-illuminated and even include "hot" spots of extreme light intensity while the illumination level of the opposing side of the room may remain too low.

Figure 31:
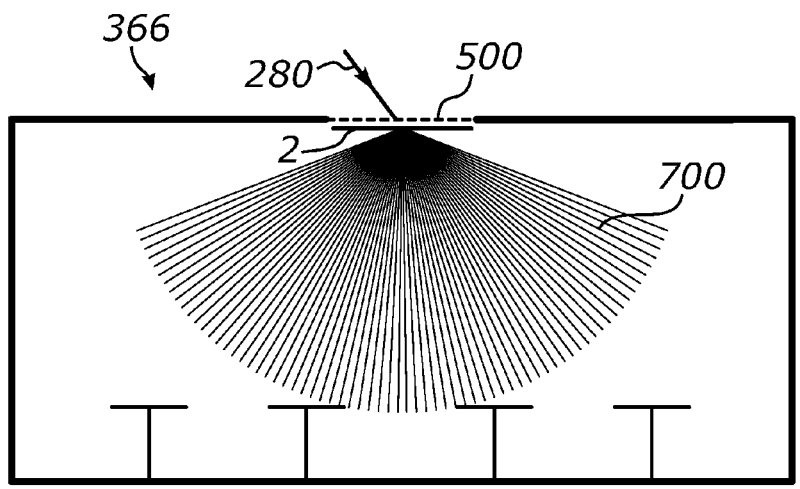
FIG. 31 is a schematic view and raytracing diagram showing a daylighting fabric incorporated into a skylight, according to at least one embodiment of the present invention.

In contrast, referring now to FIG. 31, daylighting fabric 2 may be configured to diffuse and spread the direct beam of ray 280 over a much broader angular cone and provide more even illumination of the entire room interior. A sheet of such daylighting fabric 32 may be similarly positioned in a horizontal orientation on the path of ray 280 as the panel 378 of FIG. 30. Since the sheet of daylighting fabric 2 can be quite flexible and prone to sagging if not supported properly, it may be, for example, stretched between suitable frame members (not shown), laid down on a light transmitting grid or laminated onto a transparent plate or panel. Slits 6 of sheet 4 may be arranged in two perpendicular arrays so as to form a plurality of light channeling cells 30, such as those discussed in reference to FIG. 28 and FIG. 29. Daylighting fabric 2 of FIG. 31 may additionally include light diffusing means. Such light diffusing means may particularly employ light-diffusing surface relief features 5 of the walls of the respective slits 6 and/or light-diffusing pattern of surface relief features 18 of the light output surface of sheet 4.

In operation, daylighting fabric 2 of FIG. 31 distributes the light energy of ray 280 over a broad angular range and illuminates room 366 with a relatively uniform diffuse beam. In one embodiment, daylighting fabric 2 may be configured to produce a generally symmetric beam with respect to a normal to its surface. In one embodiment, daylighting fabric 2 may also be configured so that the respective fan of rays 700 has the angular span of more than 90° for at least for some elevation angles of the sun so that the opposing portions of room 366 may be adequately illuminated. Accordingly, it will be appreciated that such configuration of daylighting fabric 2 of FIG. 31 may provide daylighting conditions within room 366 which are far superior to those provided by conventional light diffusing panel of FIG. 30.

Figure 32:
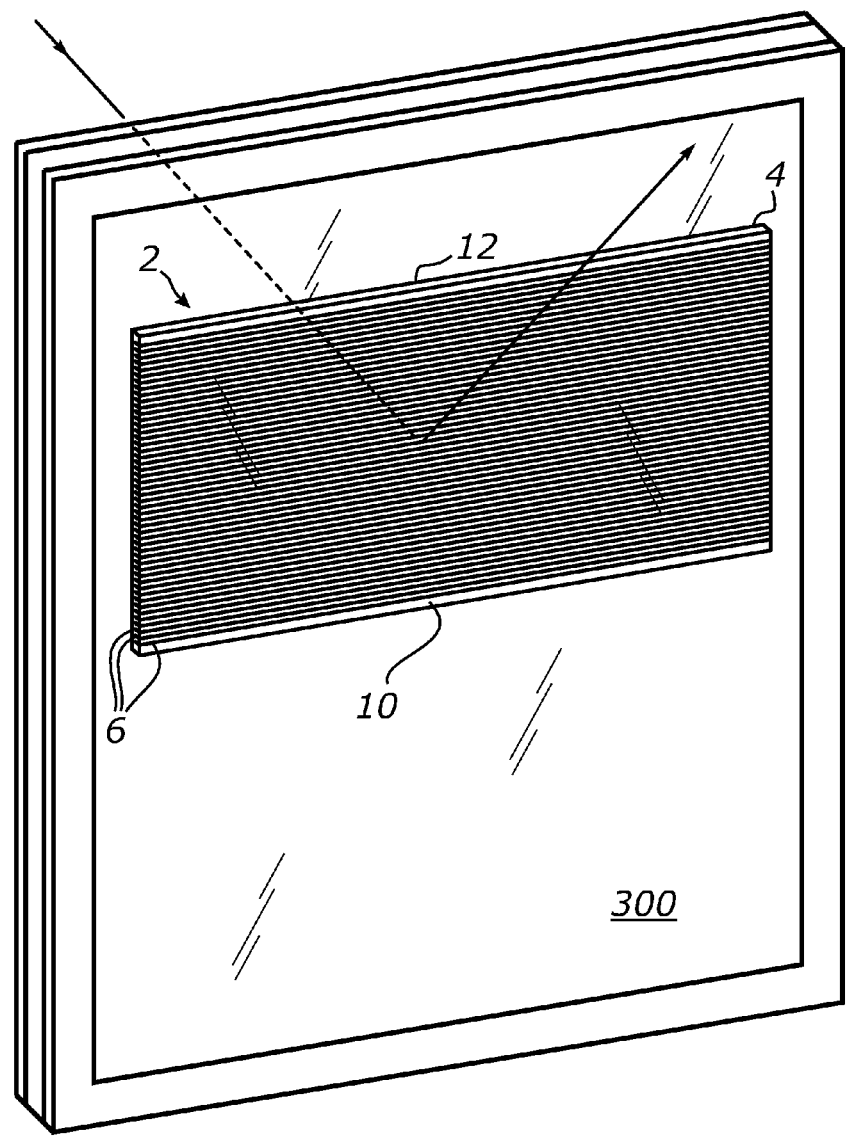
FIG. 32 is a schematic perspective view of a window, showing daylighting fabric laminated onto a window pane, according to at least one embodiment of the present invention.

FIG. 32 depicts a further example of employing daylighting fabric 2, according to one embodiment of the present invention. Referring to FIG. 32, rectangular sheet 4 of daylighting fabric 2 is laminated onto a surface of a window pane 300. Window pane 300 may represent, for example, a planar glass pane in a window of a building façade. More generally, it may also represent the surface of an optically transmissive glazing found in daylighting elements of a building such as a wall window, door window, roof window, and the like.

Sheet 4 is made from a soft, flexible and optically transmissive material, preferably clear plasticized PVC with the thickness between 0.5 mm to 1.5 mm. Surface 12 of sheet 4 should preferably be made smooth and suitable for lamination onto another surface with a good physical and optical contact. Particularly, surface 12 may be configured to make sheet 4 attachable to a smooth glass surface by means of lamination. For this purpose, surface 12 may be optionally calendered using is a series of hard pressure rollers to enhance its smoothness. In order to further enhance the lamination efficiency and/or adhesion to glass, surface 12 may be specially treated for high surface energy or static cling properties. In order to further enhance the adhesion to a glass surface, a layer of optically-clear adhesive may be provided between surface 12 and the respective surface of pane 300. A low-tack adhesive may be selected to provide for a durable lamination and yet relatively easy removability of sheet 4 from pane 300. A moderate- to high-tack adhesive may be used if more permanent adhesion of sheet 4 to pane 300 is required by the specific application.

The size of sheet 4 may be selected to cover only a portion or the entire surface of pane 300. When the size of sheet 4 is selected to cover only a portion of the area of pane 300, such sheet may be laminated onto any suitable part of the window pane. Various considerations for positioning sheet 4 may include but are not limited to the exposure of the respective part of pane 300 to the direct sunlight, the desirability of view obstruction, privacy, ease of access, various environmental factors, etc. In one embodiment, sheet 4 may be positioned on the surface of window pane 300 so that it is generally above the eye height of the building occupants.

Surface 12 of sheet 4 in FIG. 32 is configured for light input and surface 10 configured for light output from the sheet. The orientation of sheet 4 is such that slits 6 formed in surface 10 extend generally parallel to the horizontal plane. Slits 6 are configured to redirect and redistribute sunlight incident onto the respective portion of pane 300 at least from relatively high solar elevation angles. Particularly, slits 6 are configured to redirect at least a portion of such sunlight onto a ceiling of the respective building interior according to the principles of above-discussed embodiments.

In one embodiment, daylighting fabric 2 of FIG. 32 may be configured with both surfaces 10 and 12 being smooth and free of any surface relief features. In one embodiment, suitable micro-relief may be provided on surface 10 in the form of surface relief features 18 in order to enhance the light diffusing function of sheet 4, as further illustrated in FIG. 33.

Figure 33:
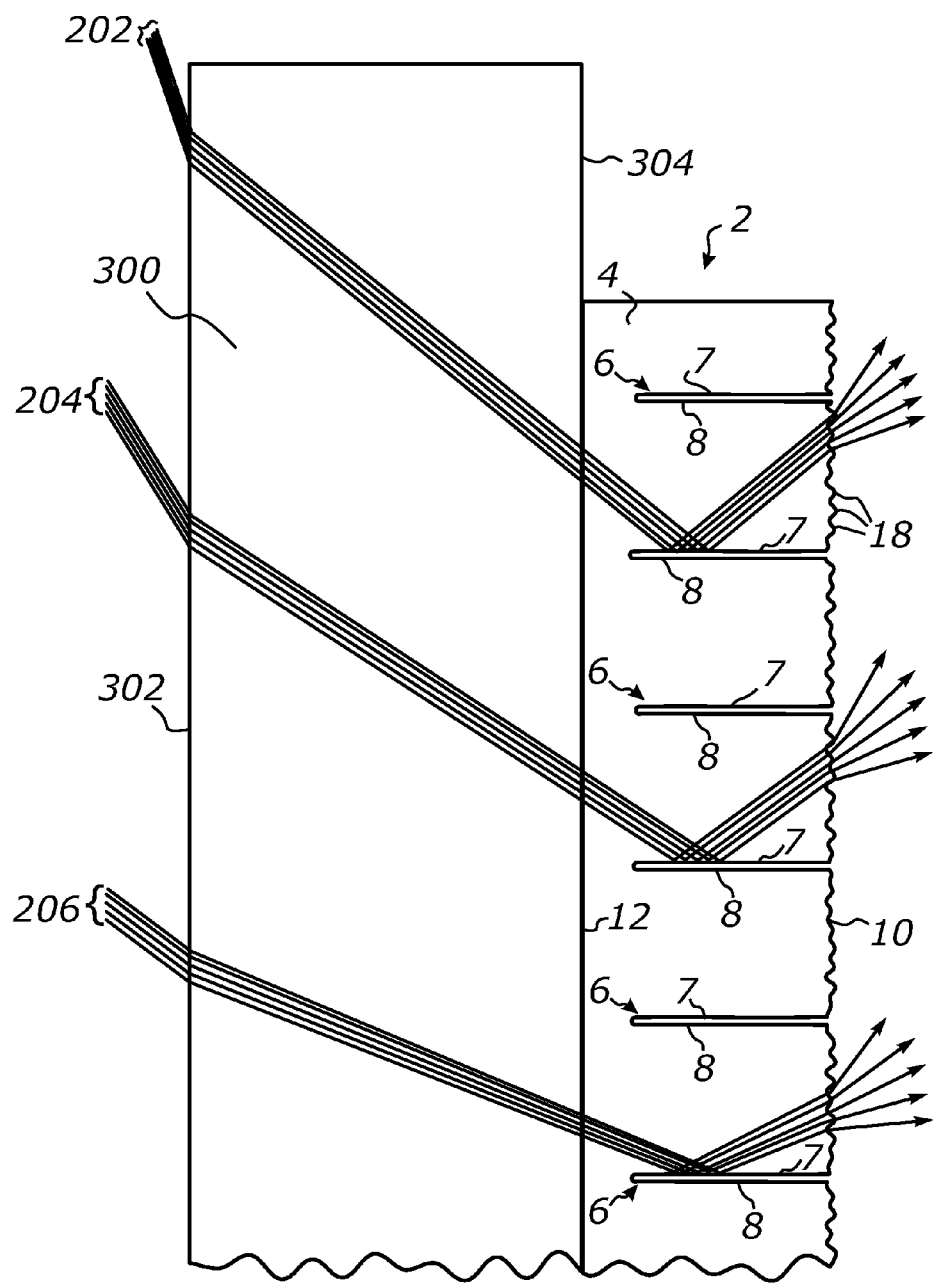
FIG. 33 is a schematic cross section view of a portion of a daylighting fabric laminated onto a window pane, according to at least one embodiment of the present invention.

Referring to FIG. 33, vertically-oriented glass window pane 300 has an outer broad-area surface 302 and an opposing inner broad-area surface 304 which is parallel to surface 302. Surface 302 is facing the outside of the building and is exposed to the incident sunlight, while surface 304 is facing the building interior. Sheet 4 of daylighting fabric 2 is laminated onto the inner surface 304 so that its surface 12 forms a good physical and optical contact with surface 304. Surface 12 of sheet 4 is configured for light input and is made smooth and preferably calendered in order to promote such contact with surface 304 and reduce forming air bubbles or wrinkles. A layer of optically clear adhesive may be used to promote long-lasting adhesion.

Referring further to FIG. 33, the opposing light output surface 10 includes a plurality of deep and narrow slits 6 formed perpendicularly to the prevailing plane of sheet 4 and arranged in a parallel array. Sheet 4 is oriented in such a way that the longitudinal axis of slits 6 is aligned parallel to the horizontal plane. It will be appreciated that, at such orientation, the respective planes of walls 7 and 8 of slits 6 will also be disposed generally parallel to the horizontal plane. Each slit 6 has a relatively smooth surface and is configured to include a thin layer of air between the respective pair of walls 7 and 8 thus enabling wall reflectivity by means of TIR. The surfaces of at least walls 7 are sufficiently smooth to reflect light by means of TIR in a specular or near-specular regime. The surfaces of the opposing walls 8 are also preferably smooth and configured for TIR in a specular or near-specular regime. However, since the illustrated orientation of sheet 4 provides for daylight redirection mostly by walls 7, walls 8 may have more uneven or even rough surface without impairing the functionality of daylighting fabric 2. Surface 10 of sheet 4 further includes a plurality of light diffusing surface relief features 18 which are configured to extract light from sheet 4 and disperse such light within a building interior in the form of a diffuse beam.

In operation, referring yet further to FIG. 33, ray bundles 202, 204 and 206 illustratively represent direct beams of sunlight striking the outer surface 302 of window pane 300 at different incidence angles. Window pane 300 may be conventionally made of glass which has a relatively high transmittance of sunlight. When sheet 4 is made of plasticized PVC, its refractive index may be closely approximating that of glass, in which case the Fresnel reflection at the optical interface between pane 300 and sheet 4 will be virtually eliminated resulting in a high efficiency of light passage from window pane 300 to sheet 4. TIR at walls 7 of slits 6 is practically lossless and the transmittance of clear PVC at a millimeter thickness can be quite high at the targeted wavelengths. Furthermore, surface relief features 18 of surface 10 may be configured to include a microlens pattern which has a relatively high optical throughput in a broad range of incidence angles. Accordingly, the daylighting device formed by sheet 4 of daylighting fabric 2 laminated onto window pane 300 may have a relatively high light transmittance and optical efficiency. Therefore, each of the ray bundles illustrated in FIG. 33 may be transmitted through sheet 4 with minimum losses and redirected towards the ceiling of the respective building interior.

It is noted that the lamination of sheet 4 onto window pane 300 may be implemented in various alternative ways. For example, in one embodiment, sheet 4 may be applied to the outside surface 302 of pane 300. In one embodiment, sheet 4 may be laminated onto pane 300 with its surface 10 facing towards the pane. It will be appreciated that in such a case, slits 6 made in surface 10 can be fully or partially encapsulated by the contact of surfaces 304 and 10 and may at least partially be isolated from the environment. Such configuration may be advantageously selected, for example, in a situation where the contamination of slits 6 with dust and/or unwanted residues or moisture can be a concern.

Furthermore, sheet 4 may be laminated onto pane 300 as a secondary layer. For instance, a window film may be laminated onto a surface of pane 300 first and then sheet 4 may be laminated onto such window film. In one embodiment, the window film may be additionally configured for suitable light filtering properties, such as blocking the infra-red or ultraviolet rays, etc. In one embodiment, such window film may also be configured to provide a certain tint to the sunlight admitted into the building interior. It will be appreciated that many window panes include some form of coatings, such as those found in low-emissivity windows. Accordingly, sheet 4 may be laminated onto such coated windows either directly or by means of any number of intermediate layers while maintaining the same basic configuration and operation principles.

It is also noted that the embodiment shown in FIG. 33 is not limited to any particular type of windows in a building and can be applied to many forms of building glazing used for admitting daylight into the interior. Such types of glazing may include but are not limited to single-pane windows, dual-pane and multi-pane windows, glass doors, light-transmitting window coverings, transparent walls or ceilings, and the like. In dual-pane or multi-pane glazing, sheet 4 may also be incorporated between the panes in order to provide a better protection of the daylighting fabric from the environment. It is further noted that one or more sheets daylighting fabric 2 may be laminated to a planar or curved surface of a glazing element disposed in any suitable orientation with respect to the horizontal plane, including parallel, perpendicular or sloped orientations. For surfaces having two-dimensional curvature, daylighting fabric 2 may also be cut into a suitable template that will conform to the shape of the surface, stretched over such shape or applied in the form of a mosaic of multiple smaller sheets, patches or strips.

Further details of the structure and operation of the daylighting fabric 2 and the method and apparatus for making the same, as shown in the drawing figures, as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A daylighting fabric for illuminating a building interior with sunlight, comprising:
    a flexible sheet of optically transmissive plasticized polyvinyl chloride;
    a first plurality of parallel slits formed in a surface of said sheet, each of said slits including a first wall and an opposing second wall extending generally parallel to said first wall;
    wherein said first wall is spaced apart from said second wall by a predetermined distance and at least one of said first and second walls is configured for reflecting light by means of a total internal reflection.

2. A daylighting fabric as recited in claim 1, wherein said first wall and said second wall are separated from each other by a layer of air.

3. A daylighting fabric as recited in claim 1, wherein at least one of said first and second walls is configured to reflect light by a total internal reflection in a specular or near-specular regime.

4. A daylighting fabric as recited in claim 1, wherein at least a portion of a surface of said slits has a root-mean-square surface roughness generally between 10 nanometers and 100 nanometers.

5. A daylighting fabric as recited in claim 1, wherein the depth of each said slit is more than half of the thickness of said sheet.

6. A daylighting fabric as recited in claim 1, wherein each of said slits extends generally perpendicular to said surface.

7. A daylighting fabric as recited in claim 1, wherein at least some of said slits are formed at a constant angle with respect to a normal to said surface.

8. A daylighting fabric as recited in claim 1, wherein at least some of said slits are formed at a variable angle with respect to a normal to said surface.

9. A daylighting fabric as recited in claim 1, wherein said sheet has a thickness between 0.5 mm and 3.2 mm.

10. A daylighting fabric as recited in claim 1, wherein said sheet has a square or rectangular shape.

11. A daylighting fabric as recited in claim 1, wherein said sheet is configured for a generally unimpeded light passage along at least a direction which is perpendicular or near-perpendicular to said surface.

12. A daylighting fabric as recited in claim 1, further comprising a second plurality of parallel slits formed in a surface of said sheet and extending generally perpendicular to said first plurality of parallel slits.

13. A daylighting fabric as recited in claim 12, wherein said second plurality of parallel slits in formed in the same surface as said first plurality of parallel slits.

14. A daylighting fabric as recited in claim 1, wherein at least one surface of said sheet includes a plurality of light-diffusing surface relief features.

15. A daylighting fabric as recited in claim 1, wherein at least one surface of said sheet includes an image print or image-carrying pattern.

* * * * *